(12) United States Patent
Donnelly et al.

(10) Patent No.: US 7,940,016 B2
(45) Date of Patent: May 10, 2011

(54) REGENERATIVE BRAKING METHODS FOR A HYBRID LOCOMOTIVE

(75) Inventors: Frank Wegner Donnelly, North Vancouver (CA); John David Watson, Evergreen, CO (US); Ronald B. Bailey, North East, PA (US); Andrew C. Tarnow, Cambridge Springs, PA (US)

(73) Assignee: RailPower, LLC, Nicholasville, KY (US)

( * ) Notice: Subject to any disclaimer, the term of this patent is extended or adjusted under 35 U.S.C. 154(b) by 1674 days.

(21) Appl. No.: 11/200,879

(22) Filed: Aug. 9, 2005

(65) Prior Publication Data

US 2006/0076171 A1    Apr. 13, 2006

Related U.S. Application Data

(60) Provisional application No. 60/600,330, filed on Aug. 9, 2004, provisional application No. 60/616,173, filed on Oct. 4, 2004, provisional application No. 60/618,631, filed on Oct. 13, 2004.

(51) Int. Cl.
*H02P 1/00* (2006.01)

(52) U.S. Cl. ........ 318/139; 318/371; 318/370; 318/375; 318/376

(58) Field of Classification Search ............... 318/139, 318/371, 370, 375, 376
See application file for complete search history.

(56) References Cited

U.S. PATENT DOCUMENTS

| | | | |
|---|---|---|---|
| 384,580 A | 6/1888 | Julien |
| 744,187 A | 11/1903 | Gibbs |
| 1,199,752 A | 10/1916 | Baker |
| 1,377,087 A | 5/1921 | Manns |
| 1,535,175 A | 4/1925 | Mancha |
| 2,403,933 A | 4/1946 | Lillquist |
| 2,472,924 A | 6/1949 | Schwendner |
| 2,510,753 A | 6/1950 | Multhaup |
| 2,704,813 A | 3/1955 | Stamm |
| 3,169,733 A | 2/1965 | Barrett, Jr. |
| 3,443,115 A | 5/1969 | Timmerman, Jr. |
| 3,569,810 A | 3/1971 | Thiele |
| 3,596,154 A | 7/1971 | Gurwicz et al. |
| 3,668,418 A | 6/1972 | Godard |
| 3,728,596 A | 4/1973 | Hermansson et al. |
| 3,737,745 A | 6/1973 | Chevaugeon et al. |
| 3,792,327 A | 2/1974 | Waldorf |

(Continued)

FOREIGN PATENT DOCUMENTS

CA    1283472    10/1987

(Continued)

OTHER PUBLICATIONS

Perreault, David J. et al, "A New Design For Automotive Alternators", Massachusetts Institute of Technology, 12 pages, Jan. 2000.

(Continued)

*Primary Examiner* — Walter Benson
*Assistant Examiner* — David S Luo
(74) *Attorney, Agent, or Firm* — King & Schickli, PLLC

(57) ABSTRACT

The present invention relates generally to regenerative braking methods for a hybrid vehicle such as a hybrid locomotive, which are compatible with optimum management of a large battery pack energy storage system. Four methods for recovering energy from regenerative braking and for transferring this energy to an energy storage systems are disclosed. These methods may also be used with battery operated vehicles.

51 Claims, 27 Drawing Sheets

U.S. PATENT DOCUMENTS

| | | | |
|---|---|---|---|
| 3,832,625 A | 8/1974 | Gyugyi | |
| 3,898,937 A | 8/1975 | Johnson | |
| 3,919,948 A | 11/1975 | Kademann | |
| 3,930,189 A | 12/1975 | Smith | |
| 3,970,160 A | 7/1976 | Nowick | |
| 3,982,164 A | 9/1976 | de Buhr | |
| 3,997,822 A | 12/1976 | Logston et al. | |
| 4,035,698 A | 7/1977 | Soderberg | |
| 4,070,562 A | 1/1978 | Kuno et al. | |
| 4,075,538 A | 2/1978 | Plunkett | |
| 4,090,577 A | 5/1978 | Moore | |
| 4,093,900 A * | 6/1978 | Plunkett | 318/370 |
| 4,095,147 A | 6/1978 | Mountz | |
| 4,096,423 A | 6/1978 | Bailey et al. | |
| 4,107,402 A | 8/1978 | Dougherty et al. | |
| 4,152,758 A | 5/1979 | Bailey et al. | |
| 4,199,037 A | 4/1980 | White | |
| 4,204,143 A | 5/1980 | Coleman | |
| 4,217,527 A | 8/1980 | Bourke et al. | |
| 4,284,936 A | 8/1981 | Bailey et al. | |
| 4,309,645 A | 1/1982 | De Villeneuve | |
| 4,344,139 A | 8/1982 | Miller et al. | |
| 4,347,569 A | 8/1982 | Allen, Jr. et al. | |
| 4,363,999 A * | 12/1982 | Preikschat | 318/53 |
| 4,369,397 A | 1/1983 | Read | |
| 4,417,194 A | 11/1983 | Curtiss et al. | |
| 4,423,362 A | 12/1983 | Konrad et al. | |
| 4,471,276 A | 9/1984 | Cudlitz | |
| 4,471,421 A | 9/1984 | Brown et al. | |
| 4,495,449 A | 1/1985 | Black et al. | |
| 4,498,016 A | 2/1985 | Earleson et al. | |
| 4,523,134 A | 6/1985 | Kinoshita et al. | |
| 4,644,232 A | 2/1987 | Nojiri et al. | |
| 4,700,283 A | 10/1987 | Tsutsui et al. | |
| 4,701,682 A | 10/1987 | Hirotsu et al. | |
| 4,719,861 A | 1/1988 | Savage et al. | |
| 4,799,161 A | 1/1989 | Hirotsu et al. | |
| 4,896,090 A | 1/1990 | Balch et al. | |
| 4,900,944 A | 2/1990 | Donnelly | |
| 4,936,610 A | 6/1990 | Kumar et al. | |
| 4,941,099 A | 7/1990 | Wood et al. | |
| 4,944,539 A | 7/1990 | Kumar et al. | |
| 4,950,964 A | 8/1990 | Evans | |
| 4,961,151 A | 10/1990 | Early et al. | |
| 5,129,328 A | 7/1992 | Donnelly | |
| 5,172,006 A * | 12/1992 | Suzuki et al. | 290/45 |
| 5,212,431 A | 5/1993 | Origuchi et al. | |
| 5,264,764 A | 11/1993 | Kuang | |
| 5,281,900 A | 1/1994 | Park | |
| 5,289,093 A | 2/1994 | Jobard | |
| 5,306,972 A | 4/1994 | Hokanson et al. | |
| 5,317,669 A | 5/1994 | Anderson et al. | |
| 5,331,261 A | 7/1994 | Brown et al. | |
| 5,332,630 A | 7/1994 | Hsu | |
| 5,343,970 A | 9/1994 | Severinsky | |
| 5,359,228 A | 10/1994 | Yoshida | |
| 5,376,868 A | 12/1994 | Toyoda et al. | |
| 5,392,716 A | 2/1995 | Orschek et al. | |
| 5,424,948 A | 6/1995 | Jordan, Jr. | |
| 5,428,538 A | 6/1995 | Ferri | |
| 5,436,538 A | 7/1995 | Garvey et al. | |
| 5,436,540 A | 7/1995 | Kumar | |
| 5,436,548 A | 7/1995 | Thomas | |
| 5,453,672 A | 9/1995 | Avitan | |
| 5,480,220 A | 1/1996 | Kumar | |
| 5,508,924 A | 4/1996 | Yamashita | |
| 5,510,203 A | 4/1996 | Hamada et al. | |
| 5,510,693 A | 4/1996 | Theobald | |
| 5,511,749 A | 4/1996 | Horst et al. | |
| 5,528,148 A | 6/1996 | Rogers | |
| 5,564,795 A | 10/1996 | Engle | |
| 5,568,023 A | 10/1996 | Grayer et al. | |
| 5,580,677 A | 12/1996 | Morishita et al. | |
| 5,580,685 A | 12/1996 | Shenk | |
| 5,585,706 A | 12/1996 | Avitan | |
| 5,589,743 A | 12/1996 | King | |
| 5,610,499 A | 3/1997 | Rogers | |
| 5,610,819 A | 3/1997 | Mann et al. | |
| 5,629,567 A | 5/1997 | Kumar | |
| 5,629,596 A | 5/1997 | Iijima et al. | |
| 5,629,601 A | 5/1997 | Feldstein | |
| 5,631,532 A | 5/1997 | Azuma et al. | |
| 5,646,510 A | 7/1997 | Kumar | |
| 5,659,240 A | 8/1997 | King | |
| 5,661,378 A | 8/1997 | Hapeman | |
| 5,677,610 A | 10/1997 | Tanamachi et al. | |
| 5,685,507 A | 11/1997 | Horst et al. | |
| 5,696,438 A | 12/1997 | Hamilton | |
| 5,698,955 A | 12/1997 | Nii | |
| 5,710,699 A | 1/1998 | King et al. | |
| 5,735,215 A | 4/1998 | Tegeler | |
| 5,751,137 A | 5/1998 | Kiuchi et al. | |
| 5,765,656 A | 6/1998 | Weaver | |
| 5,820,172 A | 10/1998 | Brigham et al. | |
| 5,856,037 A | 1/1999 | Casale et al. | |
| 5,898,281 A | 4/1999 | Bossoney et al. | |
| 5,898,282 A | 4/1999 | Drozdz et al. | |
| 5,939,861 A | 8/1999 | Joko et al. | |
| 5,964,309 A | 10/1999 | Kimura et al. | |
| 5,992,950 A | 11/1999 | Kumar et al. | |
| 5,998,880 A | 12/1999 | Kumar | |
| 6,012,011 A | 1/2000 | Johnson | |
| 6,021,251 A | 2/2000 | Hammer et al. | |
| 6,023,137 A | 2/2000 | Kumar et al. | |
| 6,025,086 A | 2/2000 | Ching | |
| 6,027,181 A | 2/2000 | Lewis et al. | |
| 6,082,834 A | 7/2000 | Kolbe et al. | |
| 6,104,148 A | 8/2000 | Kumar et al. | |
| 6,175,272 B1 | 1/2001 | Takita | |
| 6,208,097 B1 | 3/2001 | Reddy et al. | |
| 6,211,646 B1 | 4/2001 | Kouzu et al. | |
| 6,218,807 B1 | 4/2001 | Sakaue et al. | |
| 6,274,998 B1 | 8/2001 | Kaneko et al. | |
| 6,308,639 B1 | 10/2001 | Donnelly et al. | |
| 6,331,365 B1 | 12/2001 | King | |
| 6,359,346 B1 | 3/2002 | Kumar | |
| 6,367,891 B1 | 4/2002 | Smith et al. | |
| 6,371,573 B1 | 4/2002 | Goebels et al. | |
| 6,384,489 B1 | 5/2002 | Bluemel et al. | |
| 6,405,705 B1 | 6/2002 | Dunsworth et al. | |
| 6,408,766 B1 | 6/2002 | McLaughlin et al. | |
| 6,417,646 B1 | 7/2002 | Huykman et al. | |
| 6,421,618 B1 | 7/2002 | Kliman et al. | |
| 6,441,581 B1 * | 8/2002 | King et al. | 320/101 |
| 6,449,536 B1 | 9/2002 | Brousseau et al. | |
| 6,456,674 B1 | 9/2002 | Horst et al. | |
| 6,456,908 B1 | 9/2002 | Kumar | |
| D464,622 S | 10/2002 | Donnelly | |
| 6,470,245 B1 | 10/2002 | Proulx | |
| 6,486,568 B1 | 11/2002 | King et al. | |
| 6,497,182 B2 | 12/2002 | Melpolder et al. | |
| 6,507,506 B1 | 1/2003 | Piñas et al. | |
| 6,532,405 B1 | 3/2003 | Kumar et al. | |
| 6,537,694 B1 | 3/2003 | Sugiura et al. | |
| 6,564,172 B1 | 5/2003 | Till | |
| 6,581,464 B1 | 6/2003 | Anderson et al. | |
| 6,591,758 B2 | 7/2003 | Kumar | |
| 6,608,396 B2 | 8/2003 | Downer et al. | |
| 6,611,116 B2 | 8/2003 | Bachman et al. | |
| 6,612,245 B2 | 9/2003 | Kumar et al. | |
| 6,612,246 B2 * | 9/2003 | Kumar | 105/34.2 |
| 6,615,118 B2 | 9/2003 | Kumar | |
| 6,618,662 B2 | 9/2003 | Schmitt et al. | |
| 6,627,345 B1 | 9/2003 | Zemlok et al. | |
| 6,634,303 B1 | 10/2003 | Madsen et al. | |
| 6,653,002 B1 | 11/2003 | Parise | |
| 6,658,331 B2 | 12/2003 | Horst et al. | |
| 6,678,972 B2 | 1/2004 | Naruse et al. | |
| 6,688,481 B1 | 2/2004 | Adner et al. | |
| 6,691,005 B2 | 2/2004 | Proulx | |
| 6,697,716 B2 | 2/2004 | Horst | |
| 6,725,134 B2 | 4/2004 | Dillen et al. | |
| 6,728,606 B2 | 4/2004 | Kumar | |
| 6,737,822 B2 | 5/2004 | King | |
| 6,765,315 B2 | 7/2004 | Hammerstrom et al. | |
| 6,812,656 B2 | 11/2004 | Donnelly et al. | |
| 6,823,835 B2 | 11/2004 | Dunsworth et al. | |

| | | | |
|---|---|---|---|
| 6,829,529 B2 | 12/2004 | Trefzer et al. | |
| 6,829,556 B2 | 12/2004 | Kumar | |
| 6,879,054 B2 | 4/2005 | Gosselin | |
| 6,885,920 B2 | 4/2005 | Yakes et al. | |
| 6,909,200 B2 | 6/2005 | Bouchon | |
| 6,909,201 B2 | 6/2005 | Murty et al. | |
| 6,909,959 B2 | 6/2005 | Hallowell | |
| 6,941,218 B2 | 9/2005 | Wolf et al. | |
| 6,973,880 B2 | 12/2005 | Kumar | |
| 7,064,507 B2 | 6/2006 | Donnelly et al. | |
| 7,102,313 B2 | 9/2006 | Kadota et al. | |
| 7,190,133 B2 * | 3/2007 | King et al. | 318/375 |
| 2002/0190525 A1 | 12/2002 | Worden et al. | |
| 2003/0150352 A1 | 8/2003 | Kumar | |
| 2003/0151387 A1 | 8/2003 | Kumar | |
| 2003/0233959 A1 | 12/2003 | Kumar | |
| 2004/0133315 A1 | 7/2004 | Kumar et al. | |
| 2005/0024001 A1 | 2/2005 | Donnelly et al. | |
| 2005/0045058 A1 | 3/2005 | Donnelly et al. | |
| 2005/0206230 A1 | 9/2005 | Donnelly | |
| 2005/0206331 A1 | 9/2005 | Donnelly | |
| 2005/0279243 A1 | 12/2005 | Bendig et al. | |
| 2006/0001399 A1 | 1/2006 | Salasoo et al. | |

FOREIGN PATENT DOCUMENTS

| | | |
|---|---|---|
| CA | 2411132 | 11/2002 |
| EP | 0 348 938 | 1/1990 |
| GB | 873167 | 3/1960 |
| GB | 1129709 | 11/1966 |
| GB | 1 312 699 | 10/1970 |
| GB | 2 005 205 A | 9/1977 |
| WO | WO 03/072388 | 9/2003 |
| WO | WO 2004/042890 | 5/2004 |
| WO | WO 2005/030550 | 4/2005 |
| WO | WO 2005/079504 | 9/2005 |
| WO | WO 2005/084335 | 9/2005 |
| WO | WO 2005/086910 | 9/2005 |
| WO | WO 2005/097573 | 10/2005 |
| WO | WO 2005/114811 | 12/2005 |

OTHER PUBLICATIONS

Railway Age, "Switchers, the Gen-Set generation", Simmons-Boardman Publishing Corporation, vol. 207 No. 3, copyright 2006, 1 page, Mar. 1, 2006.
"The Car and Locomotive Encyclopedia" by Kalmbach Publishing Company, 1980, 3 pages.
"Motor Control Electronics Handbook" edited by Richard Valentine, McGraw Hill 1998, ISBN 0-07-066810-8, 1998, 31 pages.
"Progress in Overcoming the Failure Modes Peculiar to VRLA Batteries", A. Cooper, P.T. Moseley, Journal of Power Sources 113 (2003) 200-208.
"Research Results from the Advanced Lead-Acid Battery Consortium Point the Way to Longer Life and Higher Specific Energy for Lead/Acid Electric-vehicle Batteries", P.T. Moseley, Journal of Power Sources 73 (1998) 122-126.
"Improving the Valve-Regulated Lead Acid Battery", P.T. Moseley, Journal of Power Sources 88 (2000) 71-77.
"Keeping Up the Pressure-Strategies to Maintain Plate-Group Pressure and Extend the Cycle Life of VRLA Batteries", M.J. Weighall, Journal of Power Sources 95 (2001) 209-217.
"VRLA Traction", First International Symposium on the Use of VRLA Batteries in Traction Application, Honolulu, Jun. 2005.
Supplemental Declaration of Frank Donnelly Under 37 CFR § 1.98; dated Jan. 25, 2007 for U.S. Appl. No. 11/070,848, 2 pages.
U.S. Appl. No. 11/060,087, filed Feb. 17, 2004, Donnelly.
U.S. Appl. No. 11/060,221, filed Feb. 17, 2004, Donnelly.
U.S. Appl. No. 11/060,223, filed Feb. 17, 2004, Donnelly et al.
U.S. Appl. No. 11/070,848, filed Mar. 1, 2005, Maier.
U.S. Appl. No. 11/075,550, filed Mar. 8, 2005, Donnelly.
U.S. Appl. No. 11/095,036, filed Mar. 30, 2005, Donnelly.
U.S. Appl. No. 60/600,330, filed Aug. 9, 2004, Donnelly.
U.S. Appl. No. 60/607,194, filed Sep. 3, 2004, Donnelly.
U.S. Appl. No. 60/616,173, filed Oct. 4, 2004, Donnelly.
U.S. Appl. No. 60/618,631, filed Oct. 13, 2004, Donnelly.
U.S. Appl. No. 60/618,632, filed Oct. 13, 2004, Donnelly.
U.S. Appl. No. 60/674,837, filed Apr. 25, 2005, Donnelly.
Thompson, "Electric Transportation," International Textbook Co., Scranton, Pa; (1st Ed., 1940), pp. 254-262.
Mendler, "The Technological Opportunities of Hybrid Electric Vehicles," Society of Automotive Engineers, Inc. (1996), pp. 1-16.
Mercer, "Innovative Use of Horsepower—Hybrid Bus Powered by Gas Turbine," *Diesel Progress* (Dec. 1997), pp. 56-57.
Nene, "Advanced Propulsion Systems for Urban Rail Vehicles: Chapter 2: DC Drives with a Chopper Controller," Prentice-Hall, Inc. (1985), pp. 18-45.
Kostic et al., "An Analytic Solution of the Choppers Ripple Currents," Proceedings of the 1993 IEEE/ASME Joint Railroad Conference, Apr. 1993, pp. 103-107.
Hassan Moghbelli et al., "Chopper Design for NICTD Locomotives," Proceedings of the 1993 IEEE/ASME Joint Railroad Conference, Apr. 1993, pp. 67-75.
C.E. Band et al., "Development of and Operational Experience with a High Powered D.C. Chopper for 1500 Volt D.C. Railway Equipment," Institution of Electrical Engineers Conference Publication 53 on Power Thyristors and Their Applications, Part 1 (May 1969), 1-page.
M.J. Hapeman et al., "Diesel Electric Locomotive Propulsion Systems—A Look into the Future," IEEE Technical Papers Presented at the 1985 Joint ASME/IEEE Railroad Conference, New York City, NY, Apr. 16-18, 1985, pp. 108-115.
"Locomotive Energy Storage System," Advanced Railway Technology, Inc. (Dec. 1985), 22 pages.
Declaration of Ronald Bailey under 37 CFR § 1.98 dated Dec. 3, 2004 for U.S. Appl. No. 10/650,011, 3 pages.
"Lead-Acid Battery State of Charge vs. Voltage", Richard Perez, Home Power #36, Aug./Sep. 1993, 5 pages.
"Thermal Evaluation of the Honda Insight Battery Pack" M.D. Zolot et. al. National Renewable Energy Laboratory, Presented at the 36th Intersociety Energy Conversion Engineering Conference, Savannah Georgia, Jul. 29 to Aug. 2, 2001, 9 pages.
"Development of a New Battery System for Hybrid Vehicle", Tomokazu Yamauchi et al, Toyota, presented at the EVS 17 in Montreal, Oct. 2000, 7 pages.
"Supercapacitive Energy Storage for Diesel-Electric Locomotives", Destraz, Barrade and Rufer, Swiss Federal Institute of Technology, paper presented at Speedam 2004, Jun. 16, Capri, Italy, 6 pages.
Press Release: "French Railway Company Voies Ferees Legeres et Industielles (VFLI) Puts Its Trust in Deutch Engines", Jun. 2003, 2 pages.
"LNG as a Fuel for Railroads: Assessment of Technology Status and Economics", Pera and Moyer, Acurex Corporation, 1993, Gas Research Institute contract No. 5091-292-2153, 122 pages.
"Comparative Economic Assessment of a Natural Gas Fueled Locomotive with On-Board CNG Storage to Diesel and LNG Variants", Donnelly et al, IEEE/ASME Joint Railroad Conference, Baltimore, Apr. 1995, 30 pages.
"Linear/Switchmode Voltage Regulator Handbook" Motorola, Inc. 1982, 3 pages.
Design of Switched Reluctance Motors and Development of a Universal Controller for Switched Reluctance and Permanent Magnet Brushless DC Motors', Phd Dissertation, Virginia Polytechnic Institute and State University, Prahveen Vijayraghavan, Blacksburg, VA, Nov. 2001, 215 pages.
"Li-Ion Battery-Powered Buck-Boost Regulator Minimizes Portable Product Size", Chen, IIC-China/ESC-China Conference Proceedings, 2002, 5 pages.
U.S. Appl. No. 11/131,917, filed May 17, 2005, Donnelly.
U.S. Appl. No. 11/143,252, filed Jun. 1, 2005, Donnelly.
International Search Report for counterpart International Patent Application No. PCT/US05/28178 dated Oct. 10, 2006.
International Written Opinion for counterpart International Patent Application No. PCT/US05/28178 dated Oct. 10, 2006.

* cited by examiner

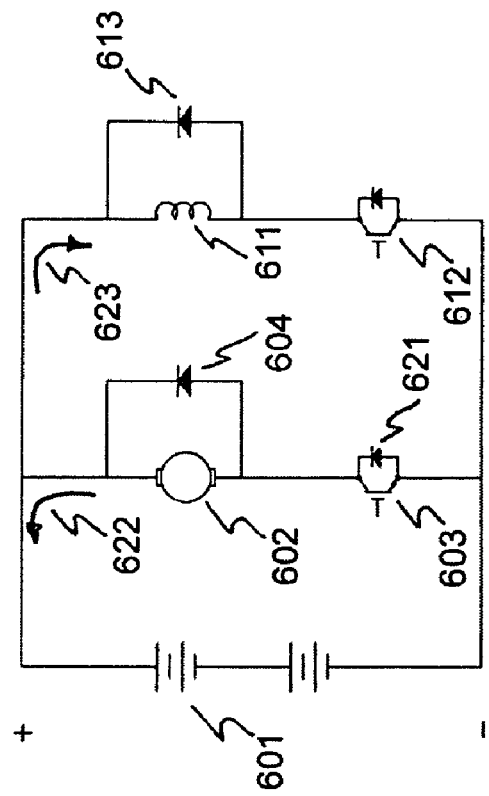
Fig. 6b
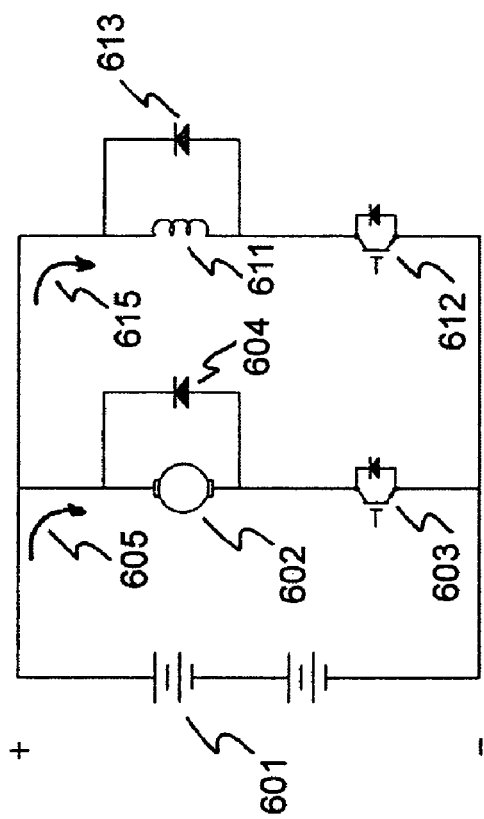
Fig. 6a
Figure 6

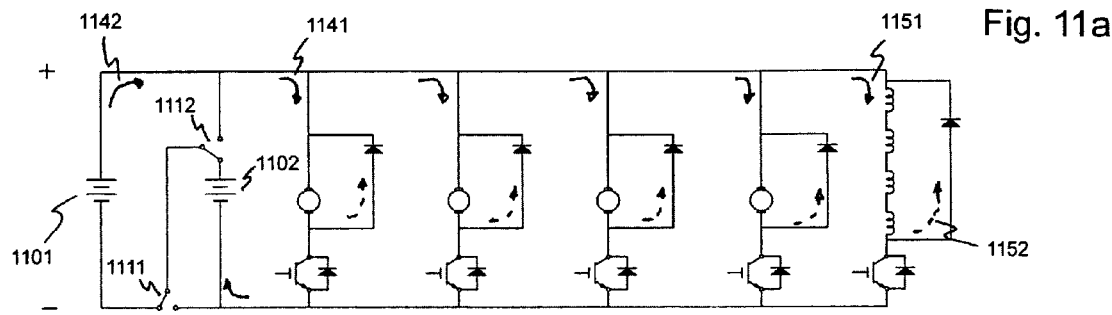
Fig. 11a
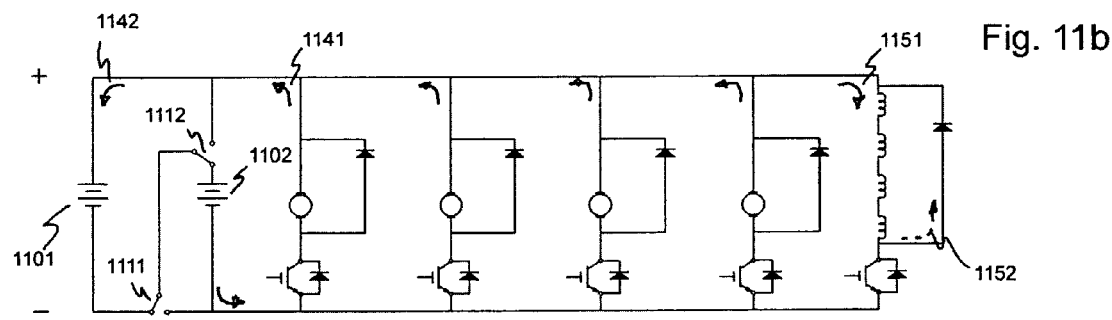
Fig. 11b
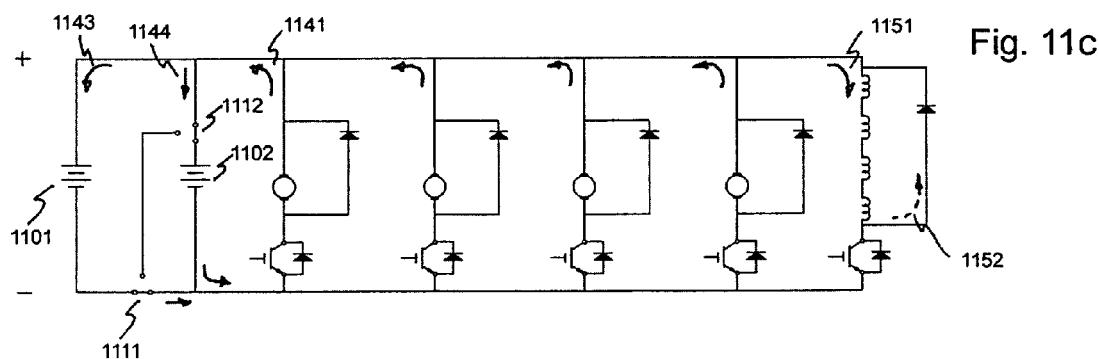
Fig. 11c
Figure 11

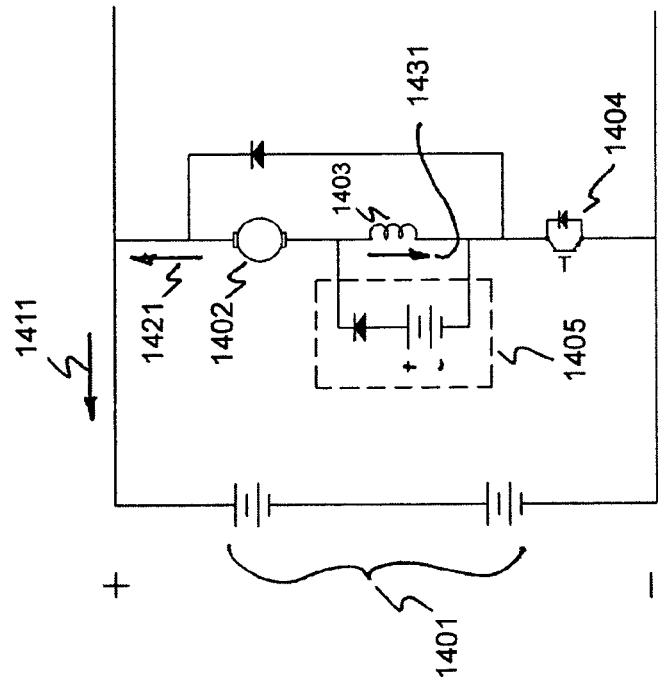
Fig. 14b
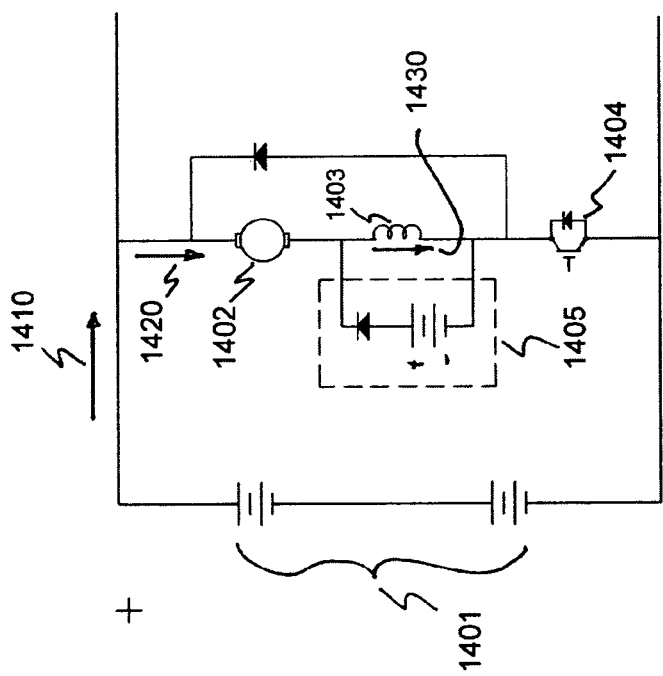
Fig. 14a
Figure 14

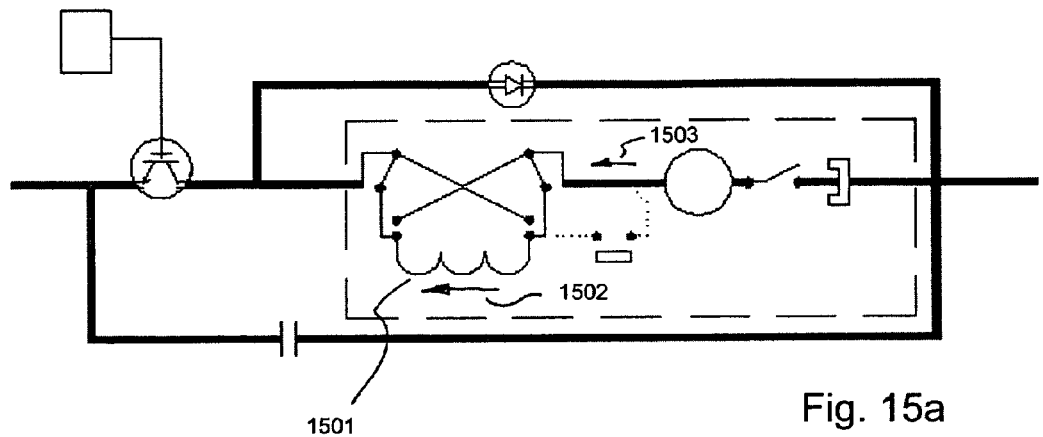
Fig. 15a
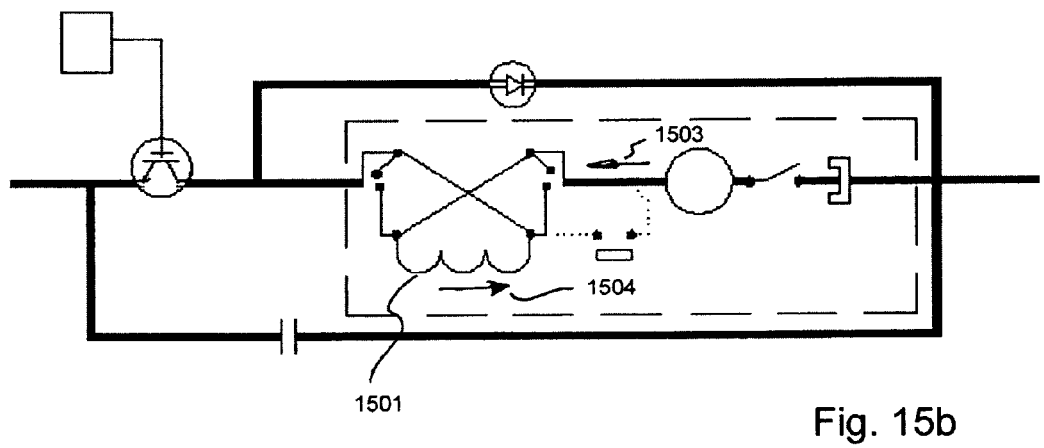
Fig. 15b
Figure 15

Figure 17

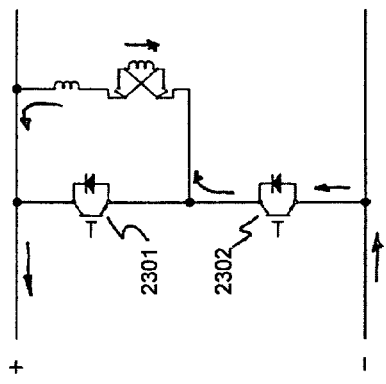
Fig. 23a
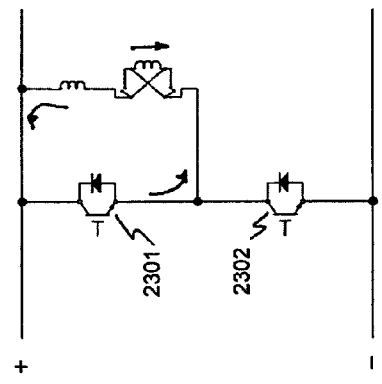
Fig. 23b
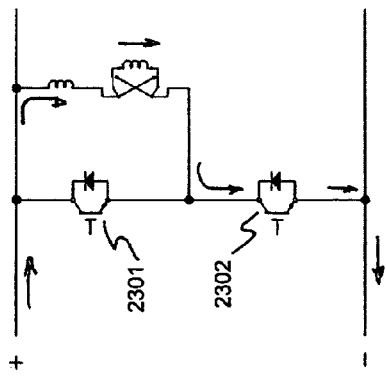
Fig. 23c
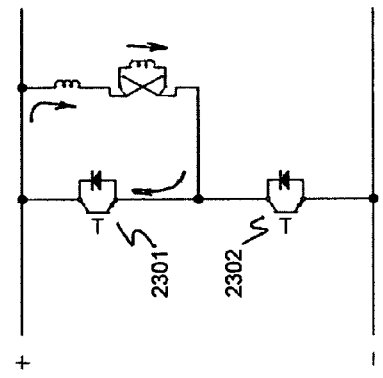
Fig. 23d
Figure 23

REGENERATIVE BRAKING METHODS FOR A HYBRID LOCOMOTIVE

CROSS REFERENCE TO RELATED APPLICATION

The present application claims the benefits, under 35 U.S.C. §119(e), of U.S. Provisional Application Ser. Nos. 60/600,330, filed Aug. 9, 2004, of the same title to Donnelly, et al., 60/616,173, filed Oct. 4, 2004, and 60/618,631, filed Oct. 13, 2004, of the same title to Donnelly, et al., each of which is incorporated herein by this

FIELD

The present invention relates generally to regenerative braking methods for a hybrid vehicle such as a hybrid locomotive, which are compatible with proper use of traction motors during braking and with good management of a large battery pack energy storage system. Some of these methods may also be used with battery operated vehicles.

BACKGROUND

Railroads are under increasing pressure to reduce emissions and fuel consumption. In the search for efficient engine and fuel strategies, many different power plant and power delivery strategies have been investigated. Some of these strategies have involved locomotives using multiple engines. For application to locomotives with two or more engines to reduce emissions and fuel consumption, Donnelly et al have disclosed a versatile multiple engine control strategy in U.S. Provisional Application 60/674,837 and a high-power density engine packaging method in U.S. Provisional Application entitled "Multiple Engine Locomotive Configuration" filed Jun. 20, 2005. These applications are also incorporated herein by reference.

Another response in the search for efficient engine and fuel strategies has been the development of hybrid locomotives. Donnelly has disclosed the use of a battery-dominant hybrid locomotive in U.S. Pat. No. 6,308,639 which is incorporated herein by reference. Other strategies to reduce emissions and fuel consumption involve combinations of conventional and hybrid locomotives in a consist.

A key component of the strategy to use hybrid locomotives to reduce fuel consumption and emissions is the use of regenerative braking systems which can recover a significant portion of the kinetic energy of a train during braking. Especially in a hybrid locomotive, a successful regenerative braking system requires proper management of a large energy storage system and a specific control strategy for utilizing traction motors as generators during braking.

U.S. Pat. No. 6,615,118 entitled "Hybrid Energy Power Management System and Method" discloses a tender car containing an energy storage apparatus used to capture and store energy that is otherwise not used. The energy storage unit may be charged by the adjacent conventional locomotive when it is not being fully utilized or by a regenerative braking system. The energy stored in the tender car may be used to augment or boost the power supplied by the locomotive to the traction motors on the locomotive or on the tender car itself. U.S. Pat. No. 6,615,118 does not, however, describe specific methods of efficiently recovering regenerative braking energy and managing its transfer to an energy storage system.

U.S. Pat. No. 6,737,822 discloses a power system for an electric motor drive that incorporates a combination of high power density and high energy density batteries to provide a hybrid battery system which prevents electrical recharge energy from being applied to the high energy density battery while capturing regenerative energy in the high power density battery so as to increase an electric vehicle's range for a given amount of stored energy. U.S. Pat. No. 6,737,822 does not, however, describe specific methods of efficiently recovering regenerative braking energy and managing its transfer to an energy storage system.

U.S. Pat. No. 6,441,581 describes an energy management and storage system comprising flywheels and batteries and an energy storage system controller adapted to store energy during load-supplying periods and to supply energy during load-receiving periods. U.S. Pat. No. 6,441,581 does not, however, describe specific methods of efficiently recovering regenerative braking energy and managing its transfer to an energy storage system.

Donnelly et al. have disclosed a method of allocating energy amongst members of a consist in copending U.S. patent application Ser. No. 11/070,848, filed Mar. 1, 2005; and have disclosed a method for monitoring, controlling and/or optimizing the emission profile for a hybrid locomotive or consist of hybrid locomotives in copending U.S. patent application Ser. No. 11/095,036, filed Mar. 28, 2005, all of which are also incorporated herein by reference.

In U.S. Provisional Applications 60/607,194 and 60/618,632, Donnelly et al. have further disclosed a general electrical architecture for locomotives based on plurality of power sources, fuel and drive train combinations. The power sources may be any combination of engines, energy storage and regenerative braking. These provisional applications are also incorporated herein by reference.

Large energy storage battery systems are known, for example, from diesel submarines. Submarine battery packs are designed to provide high energy storage capacity for extended underwater operations during which the battery pack cannot be recharged. Battery pack cost and lifetime are generally not major concerns.

In the late 1990s, a large stationary lead acid battery system was installed at the island village of Metlakatla, Ala. The 1.4 MW-hr, 756 volt battery system was designed to stabilize the island's power grid providing instantaneous power into the grid when demand was high and absorbing excess power from the grid to allow its hydroelectric generating units to operate under steady-state conditions. Because the battery is required to randomly accept and deliver power on demand to the utility grid, it is continuously operated at between 70 and 90% state-of-charge.

It has long been thought that to achieve optimum life and performance from a lead-acid battery, it is necessary to float the battery under rigid voltage conditions to overcome self-discharge reactions while minimizing overcharge and corrosion of the cell's positive grid. This has resulted in batteries being used primarily in a standby mode. As used in hybrid vehicles including hybrid locomotives, however, the battery is rapidly and continuously cycled between discharge and charge over a relatively broad range of total charge.

Systems involving prime movers such as for example internal combustion engines, energy storage systems such as for example battery packs and regenerative braking systems under the control of a computer or controller are well-known. The Prius automobile is such an example. Such a system applied to locomotives is described in U.S. Pat. No. 6,615,118. The latter does not describe how a regenerative braking system can be managed for a hybrid locomotive that includes multiple engines or large energy storage systems connected to propulsion motors by a DC bus nor does it describe how a regenerative braking system can be utilized to optimize battery lifetime in a large battery pack.

There therefore remains a need for specific operating and control strategies to recover energy from regenerative braking, compatible with the use of traction motors and with proper management of large battery pack energy storage systems, so as to provide a system that is economically competitive with or superior to conventional locomotives.

SUMMARY

These and other needs are addressed by the various embodiments and configurations of the present invention which are directed generally to incorporating regenerative braking methods for a hybrid vehicle such as a hybrid locomotive while remaining compatible with controlled management of a large battery pack energy storage system. The inventions disclosed herein are also applicable to a battery-only powered vehicles.

The present invention can be applied to a battery-only locomotive, a parallel hybrid locomotive and/or a series hybrid locomotive. In its most preferable embodiments, the present invention is preferably directed at dual mode hybrid locomotives and a subset of dual-mode locomotives referred to as battery-dominant hybrid locomotives.

An objective of the present invention is to show how a dual-mode hybrid locomotive can be configured with multiple traction motors with independent control of the field windings that can be used in control of motoring power and regenerative braking energy recovery. In another more preferred embodiment of the present invention, a method is disclosed that utilizes the temporary inductive storage of braking energy in the traction motor windings. In addition, this preferred method is compatible with a locomotive that has a separate power control apparatus for each traction motor during motoring which allows the time sequenced release of braking energy from individual motors. During regenerative braking, the various embodiments of the present invention disclose how the motoring circuit can be readily converted principally by voltage regulation and minimal switching to provide an energy storage charging current that can be controlled in accordance with the most desirable charging practices.

In various embodiments of the present invention, at least one of five methods is used for controlling voltage levels while charging an energy storage and/or dissipating energy in an energy dissipating system during regenerative braking over different locomotive speed ranges. These are:

1. Switching traction motors between parallel and series configurations to maintain sufficiently high voltage to increase the voltage on a DC bus to charge an energy storage system and/or dissipate energy in an energy dissipating system;
2. Boosting the output voltage of the motor circuit when the motors are acting as generators to maintain sufficiently high voltage on a DC bus to charge an energy storage system and/or dissipate energy in an energy dissipating system;
3. Switching battery modules between series and parallel configurations to maintain an energy storage and/or energy dissipating system at a lower voltage level than the voltage on a DC bus;
4. Boosting the input voltage from a DC bus to an energy storage system and/or energy dissipating system to provide a sufficiently high voltage to charge the energy storage system and/or dissipate energy in the energy dissipating system; and 5. Temporarily storing inductive energy in the traction motors until voltage levels are sufficiently high enough to charge an energy storage system and/or dissipate energy in an energy dissipating system.

The latter method is the preferred embodiment.

In the various embodiments described below, several traction motors are shown connected in parallel across a large battery pack. The battery pack may serve as a power source for an electric locomotive or as an energy storage system on a hybrid locomotive. The battery pack may be replaced by a capacitor bank or another type of energy storage system such as a flywheel system, or by a combination of energy storage systems. As can be appreciated, the traction motor circuits and energy storage system can be connected to a DC bus on which other apparatuses such as engines, auxiliary power supplies, energy dissipating systems and the like can also be connected electrically in parallel as shown for example in FIG. 2.

Switching Traction Motors Between Parallel and Series Configurations

In a first embodiment of the present invention, each traction motor is shown having its own power control apparatus for Pulse Width Modulation ("PWM") control during motoring. Motors are normally deemed connected in series when the voltages across their armatures are additive. Motors are normally deemed connected in parallel when the currents developed by their armatures are additive. In this embodiment, the field windings for each motor are controlled independently of their armatures by yet another power control apparatus circuit. During regenerative braking, the traction motors are connected in parallel or in series or in combinations of parallel and series depending on locomotive speed range so as to cause the motors, now acting as generators, to have a higher voltage than the energy storage system. When the output voltage(s) of the motors is higher than that of the energy storage system, the traction motors, acting as generators will charge the energy storage system via a DC bus. Control of the charge level, charging voltage and charging current of the energy storage system is effected by varying the field current to the traction motors as controlled by the field power control circuit and/or by switching motors or groups of motors from parallel to series configurations.

Boosting Voltage from the Traction Motor Circuit

In a second embodiment, each traction motor is shown having its own power control apparatus for PWM control during motoring. The field windings for each motor are all controlled independently of their armatures by yet another power control apparatus circuit. During regenerative braking, the traction motors remain connected in parallel but a boost or step-up circuit is engaged so that the motor circuit has a higher output voltage, thereby increasing the voltage on the DC bus above that of the energy storage system, thereby causing the traction motor circuit to charge the energy storage system. Control of the charge level, charging voltage and charging current of the energy storage system is effected by varying the field current to the traction motors as controlled by the field power control circuit and/or by controlling the motor boost circuit.

Switching Battery Modules Between Series and Parallel Configurations

In a third embodiment, each traction motor is shown having its own power control apparatus for PWM control during motoring. The field windings for each motor are all controlled independently of their armatures by yet another power control apparatus circuit. During regenerative braking, the traction motors remain connected in parallel but some groups of batteries in the battery pack are switched from series to parallel so that the motor circuit has a higher output voltage than the energy storage system, thereby causing the motor circuit to charge the energy storage system. Control of the charge level, charging voltage and charging current of the energy storage system is effected by varying the field current to the traction motors as controlled by the field power control apparatus circuit and/or by switching energy storage modules from series to parallel configurations.

Boosting Voltage to the Energy Storage System

In a fourth embodiment, each traction motor is shown having its own power control apparatus for PWM control during motoring. The field windings for each motor are all controlled independently of their armatures by yet another power control apparatus circuit. During regenerative braking, the traction motors remain connected in parallel but a boost or step-up circuit across the energy storage system is engaged so that the energy storage system sees a higher charging voltage than produced on the DC bus by the output of the traction motor circuit. Control of the charge level, charging voltage and charging current of the energy storage system is effected by varying the field current to the traction motors as controlled by the field power control circuit and/or by controlling the energy storage boost circuit.

Inductively Storing Energy in the Traction Motors

In a fifth and preferred embodiment, each traction motor is shown having its own power control apparatus for PWM control during motoring. In this embodiment, the field windings and armatures of each motor are connected electrically in series. During regenerative braking, a switch is opened, another is closed and a reverser is activated across the motor armature or field winding. In this mode, the power control apparatus for each traction motor causes energy to be alternately stored in the motor windings and discharged back into the energy storage system. Control of the charge level, charging voltage and charging current of the energy storage system is effected by varying the field current to the traction motors. If the motors have individual power flow control apparatuses, the flow of regenerative energy returned to the energy storage system will be more evenly distributed by time sequencing the various motors, further optimizing the control of braking energy returned to the energy storage system. In a variant of this embodiment, switches are replaced by IGBTs.

In another aspect of the present invention, the field windings described in the first three embodiments are shown as electrically isolated from the other field windings as well as from the motor armatures.

In another aspect of the present invention, the field windings associated with each motor armature are shown in series with the armature windings but controlled independently by utilizing an electrically isolated auxiliary power supply to provide a controlling excitation current.

In another embodiment related to the present invention, the rectifying circuit associated with the alternators on the locomotive engines can be replaced by an inverter circuit that can be controlled to allow power flow back to the engines when desired in certain circumstances. In motoring mode, when at least one other electrical power source is in operation supplying power to the DC bus, this would allow power from the DC bus to be used to start or restart an engine that is turned off. In braking mode, the inverter circuit can be controlled to allow power to flow back to the alternator so that the alternator will turn the crankshaft of the engine and dissipate energy. Thus, during braking, the engines can be used as additional means of energy dissipation for example when the energy storage system can no longer absorb regenerative energy or when the dissipating resistive grid becomes overheated. Alternately, the engines can be used to dissipate excess braking energy in place of a dissipating resistive grid. As can be appreciated, the use of the engine or engines to dissipate braking energy can be used for dynamic braking in a conventional locomotive, replacing the dissipating resistive grid apparatus.

The present invention is directed principally at providing means of properly charging a large energy storage battery pack in which the current in the field windings of the traction motors are independently controlled for implementing various regenerative braking strategies. This independently controlled motor field excitation has an additional advantage for motoring mode in that it eliminates the need for a field shunt resistance for increasing motor output power at high speeds. The benefit formerly provided by the shunt resistance can be gained by appropriately varying the field current to overcome the motor back emf at high locomotive speeds.

The use of well-known control methods ensures that the battery pack is: maintained within a desired range of state-of-charge ("SOC") typically between about 20% and 100% of full charge; charged at or below the maximum desired rate of charge for the batteries; charged by the optimized charging algorithms; and not overcharged beyond the maximum desired charge voltage and charge capacity of the batteries in the battery pack.

An objective of the various embodiments of the present invention is to utilize the energy available from braking during train deceleration and/or descending grade, to charge the energy storage batteries while operating the battery pack so as to maximize its lifetime as commonly measured by its total useful ampere-hour throughput. Since the cost of energy delivered by a battery system is essentially the capital cost of the battery system divided by its lifetime expressed in total ampere-hour throughput, optimizing battery lifetime by applying proper battery design and management practices is an important objective when utilizing energy recovered by a regenerative braking system.

These and other advantages will be apparent from the disclosure of the invention(s) contained herein.

The above-described embodiments and configurations are neither complete nor exhaustive. As will be appreciated, other embodiments of the invention are possible utilizing, alone or in combination, one or more of the features set forth above or described in detail below.

The following definitions are used herein:

A locomotive is generally a self-propelled railroad prime mover which is powered either by a steam engine, diesel engine or externally such as from an overhead electrical catenary or an electrical third rail.

A diesel-electric locomotive is commonly a diesel powered railroad prime mover which includes an engine, generator, and traction motors on each propulsion axle.

A diesel-hydraulic locomotive is commonly a diesel powered railroad prime mover which includes an engine, a transmission and a drive system connecting one or more propelling axles. Less commonly, a diesel-hydraulic locomotive includes an engine, an electric motor and pumps which operate hydraulic motors on one or more propelling axles.

A cabless locomotive is a locomotive not having a functional operator's enclosure or cab. In a functional operator's cab, the locomotive may be operated with protection from outside weather, noise and fumes. In a functional operator's cab, the operator has available at least throttle controls, braking controls and locomotive status displays. A cabless locomotive may not have an operator's cab or it may have the cab windows blacked out and the door locked to render the cab unuseable.

A motor refers to a device that produces or imparts motion.

A traction motor is a motor used primarily for propulsion such as commonly used in a locomotive. Examples are an AC or DC induction motor, a permanent magnet motor and a switched reluctance motor.

An engine refers to any device that uses energy to develop mechanical power, such as motion in some other machine. Examples are diesel engines, gas turbine engines, microturbines, Stirling engines and spark ignition engines A prime power source refers to any device that uses energy to develop mechanical or electrical power, such as motion in some other machine. Examples are diesel engines, gas turbine engines, microturbines, Stirling engines, spark ignition engines and fuel cells.

An energy storage system refers to any apparatus that acquires, stores and distributes mechanical or electrical energy which is produced from another energy source such as a prime energy source, a regenerative braking system, a third rail and a catenary and any external source of electrical energy. Examples are a battery pack, a bank of capacitors, a compressed air storage system and a bank of flywheels or a combination of storage systems.

Dynamic braking is implemented when the electric propulsion motors are switched to generator mode during braking to augment the braking force. The electrical energy generated is typically dissipated in a resistance grid system.

Regenerative braking is the same as dynamic braking except the electrical energy generated is recaptured and stored in an energy storage system for future use.

An electrical energy converter refers to an apparatus that converts mechanical energy to electrical energy. Examples include an alternator, an alternator-rectifier and a generator. The alternators may be synchronous or non-synchronous.

A power control apparatus refers to an electrical apparatus that regulates, modulates or modifies AC or DC electrical power. Examples are an inverter, a chopper circuit, a boost circuit, a buck circuit or a buck/boost circuit.

Power density as used herein is power per unit volume (watts per cubic meter).

Specific power as used herein is power per unit mass (watts per kilogram).

A hybrid vehicle combines an energy storage system, a prime power unit, and a vehicle propulsion system. A parallel hybrid vehicle is configured so that propulsive power can be provided by the prime power source only, the energy storage source only, or both. In a series hybrid vehicle, propulsive power is provided by the energy storage unit only and the prime power source is used to supply energy to the energy storage unit.

When the energy storage capacity is small and the prime power source is large, the hybrid may be referred to as a power-assist hybrid. For example, an electric drive may be used primarily for starting and power assist while an internal combustion engine used primarily for propulsion. These vehicles are typically parallel hybrids.

In a dual-mode hybrid, the energy storage and prime power are approximately balanced. For example, a dual-mode hybrid can operate on electric drive only, on engine power only, or on a combination of both. These vehicles are typically parallel hybrids.

A range-extended hybrid has a large energy storage capacity and a small prime power source. An example would be an electric drive vehicle with a small engine used for charging an electrical energy storage unit. These vehicles are typically series hybrids.

A battery-dominant hybrid locomotive is a dual-mode hybrid locomotive where the energy storage apparatus is a battery pack and the battery pack is capable of supplying approximately as much or more instantaneous power than the prime power source when both are engaged with the propulsion system.

As used herein, "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

BRIEF DESCRIPTION OF THE DRAWINGS

FIGS. 6a and b are schematic circuit diagrams showing current flow in motoring and braking mode.

FIGS. 11a, b and c are schematic circuit diagrams showing 4 traction motors with a switching battery pack.

FIGS. 14a and b are schematic diagrams showing independently controlled field windings in series with their armature windings.

FIGS. 15a and b shows how the polarity of field windings may be reversed to allow traction motors to reverse rotation.

FIG. 23 illustrates the four modes of operation of the an alternate configuration of circuit shown in FIG. 16.

DETAILED DESCRIPTION

The basis of the present invention is the use of a DC bus which allows power to flow from one or more power sources to the traction and other motors when the voltage level of any of the power sources is higher than the operating voltage of the traction and other motors. The power sources in a hybrid locomotive may be one or more engines and one or more energy storage systems. The traction and other motors may be AC or DC motors or both. When braking, the traction motors can be operated as generators and will supply power to the DC bus if the output voltage of the traction motors operated as generators is higher than the voltage across all the power sources. Typically, engines will not accept power because of blocking diodes in their alternator/rectifier apparatuses. The regenerative braking power however, can flow to a resistive grid to be dissipated (this is the main sink for braking energy in dynamic braking). In a hybrid locomotive, regenerative braking power can also flow into the energy storage system as long as the voltage across the energy storage system is less than the voltage on the DC bus which is established by the output voltage of the traction motors operating as generators. If the traction motors are AC traction motors, the inverter or inverters act as rectifiers when the traction motors are operated as generators. The various embodiments of the present invention will be described primarily with reference to DC traction motors. However it will be obvious that each of the embodiments can also be applied to locomotives with AC traction motors in the same way as applied to locomotives with DC traction motors.

Figure 1:
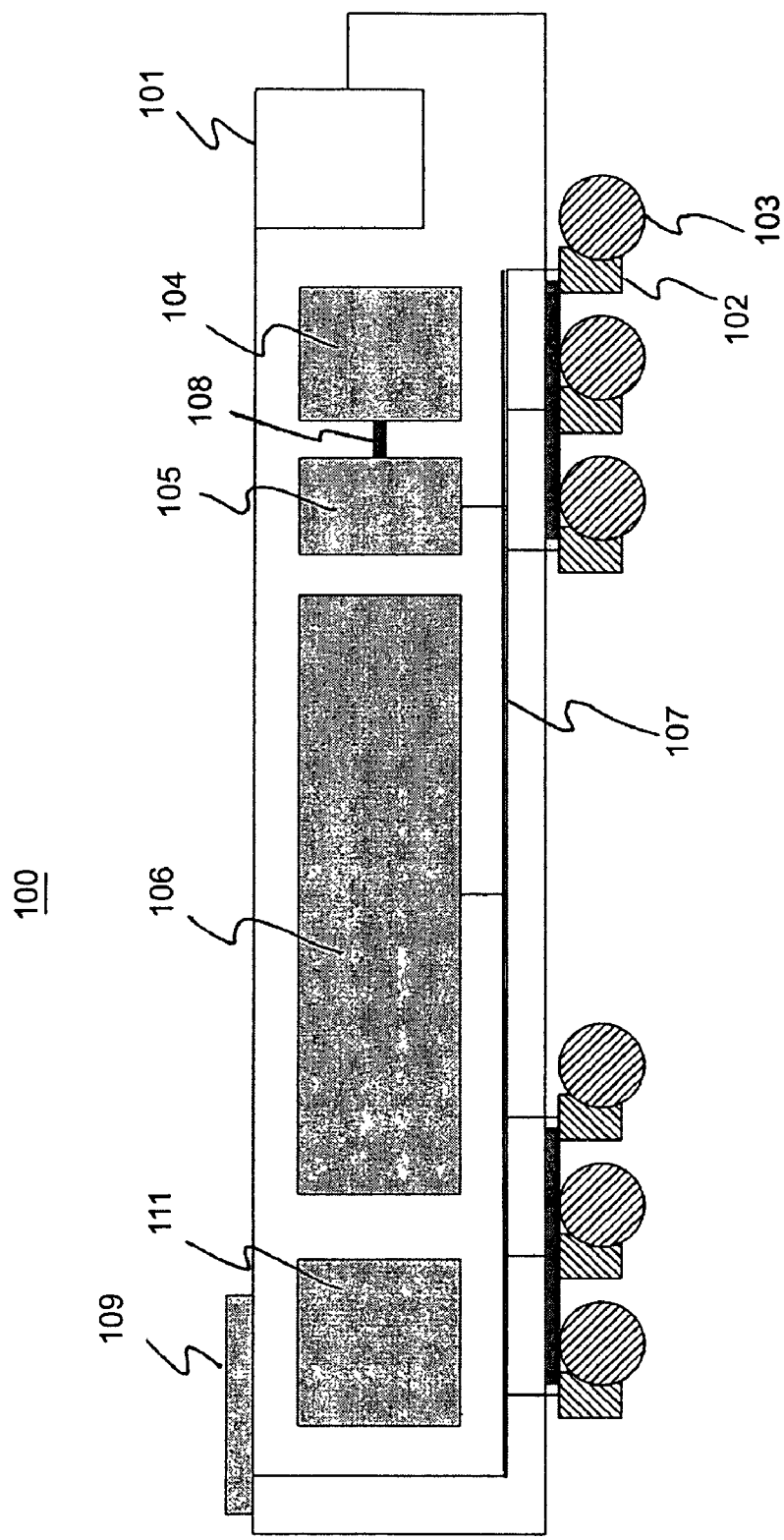
FIG. 1 is a schematic side view of the principal components of a hybrid locomotive configuration with a regenerative braking capability.

FIG. 1 is a schematic side view of a hybrid locomotive configuration 100 with a control cab 101. Prime power is provided by an engine 104 which is used to supply power to a DC bus 107 through an electrical energy converter 105. Mechanical energy generated by the engine 104 is supplied to the electrical energy converter 105 typically via a connection 108. For a diesel engine and alternator combination the connection 108 is mechanical. For a fuel cell and power conditioning unit the connection is electrical. Electrical energy is stored in an energy storage system 106 which is also connected to the DC bus 107. The wheels 103 of the locomotive 100 are driven by traction motors 102 which are powered by the electrical output of the energy storage unit 106 or the electrical energy converter 105 of engine 104 or both, by means of a DC bus 107 which is connected to the traction motors 102 through one or more chopper circuits or inverter circuits (not shown). Fuel for the engine(s) 104 is obtained from a large fuel tank 111. This embodiment includes a dynamic and regenerative braking system. During braking, the traction motors 102 of the locomotive 100 can be switched to function as electrical generators to convert kinetic energy of braking to electric energy which is then transferred via the DC bus 107 for storage in the energy storage unit 106. Any excess energy that cannot be stored is transferred via the DC bus 107 to be dissipated by resistance grids 109. In this embodiment, energy may be delivered to the energy storage unit 106 either by the engine 104 or by the regenerative braking system. Power may be delivered to the traction motors 102 from the energy storage unit 106 or the engine 104 or both. The power rating of the engine 104 is preferably in the range of about 100 to about 2,000 kW. The storage capacity of the energy storage unit 106 is preferably in the range of about 500 to about 2,000 kW-hrs. The capacity of the fuel tank 111 is preferably in the range of about 500 to about 6,000 gallons.

Figure 2:
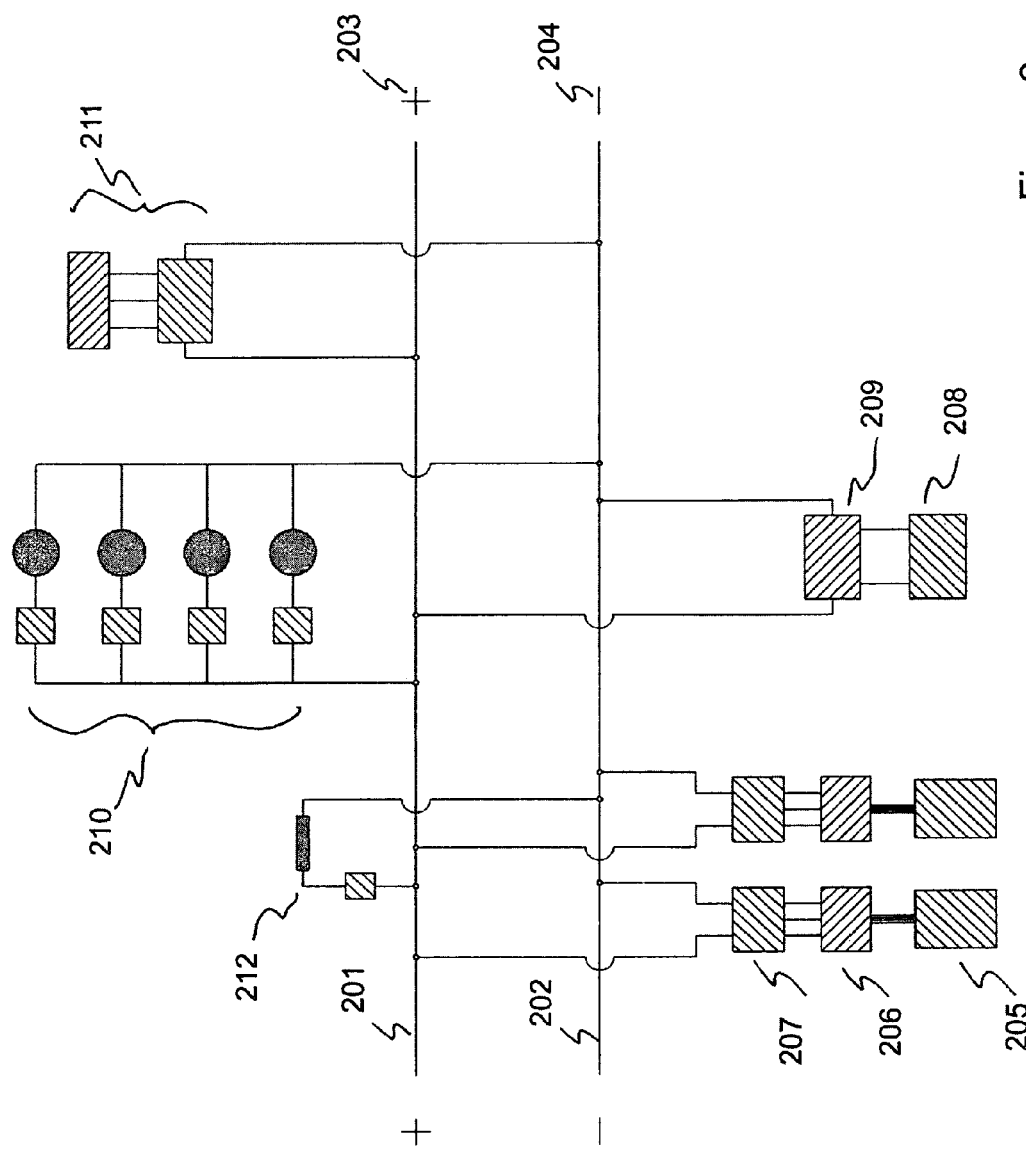
FIG. 2 is a schematic diagram of a general electrical architecture for a typical hybrid locomotive with regenerative braking.

FIG. 2 is a schematic diagram of a general electrical architecture and typical components for a typical hybrid locomotive with regenerative braking. In this figure, the power sources are two engines 205 with their individual alternators 206 and rectifier systems 207. The engines 205 are mechanically coupled to their alternators which are supply an AC input to their rectifier systems 207. An energy storage system 208 is shown connected to the DC bus through a power conditioning circuit 209. The power conditioning circuit may be a buck/boost circuit or it may be a simple switch. During motoring, power can be provided to a DC bus (represented by a positive 203 bus bar 201 and a negative 204 bus bar 202) by any combination of engines and storage system as will be discussed in subsequent figures. In motoring mode, the DC bus can provide power to one of more traction motors shown for example by a circuit 210 illustrating four parallel traction motors. The DC bus can also provide power to auxiliary power circuits 210. In braking mode, power can be returned to the DC bus when the traction motors 210 are operated as generators. In this latter case, energy can be stored in the energy storage system 208; or dissipated a resistive grid 212; or dissipated in the engines 205 (as discussed below); or a combination of all of these methods. As can be seen, all the power sources, motors, power supplies and power consumers are connected electrically in parallel to a common DC bus. For simplicity, switches and power regulating devices are not shown but will be discussed in subsequent specific examples. As will be discussed below, there are five basic methods by which this locomotive system can operate in braking mode to provide controlled power for charging an energy storage system. As can be appreciated, there can be one or more engines, the energy storage system can be a battery pack, a capacitor bank, a flywheel system or a combination of these. In general, the rectifier systems 207 include blocking diodes to prevent power from flowing back to the engines. However, if the rectifier systems 207 are replaced by inverters such as illustrated below in FIG. 3, then, when desired, power can be allowed to flow back to the engines for (1) starting engines that are turned off or (2) using the engines to dissipate braking energy in certain circumstances.

Figure 3:
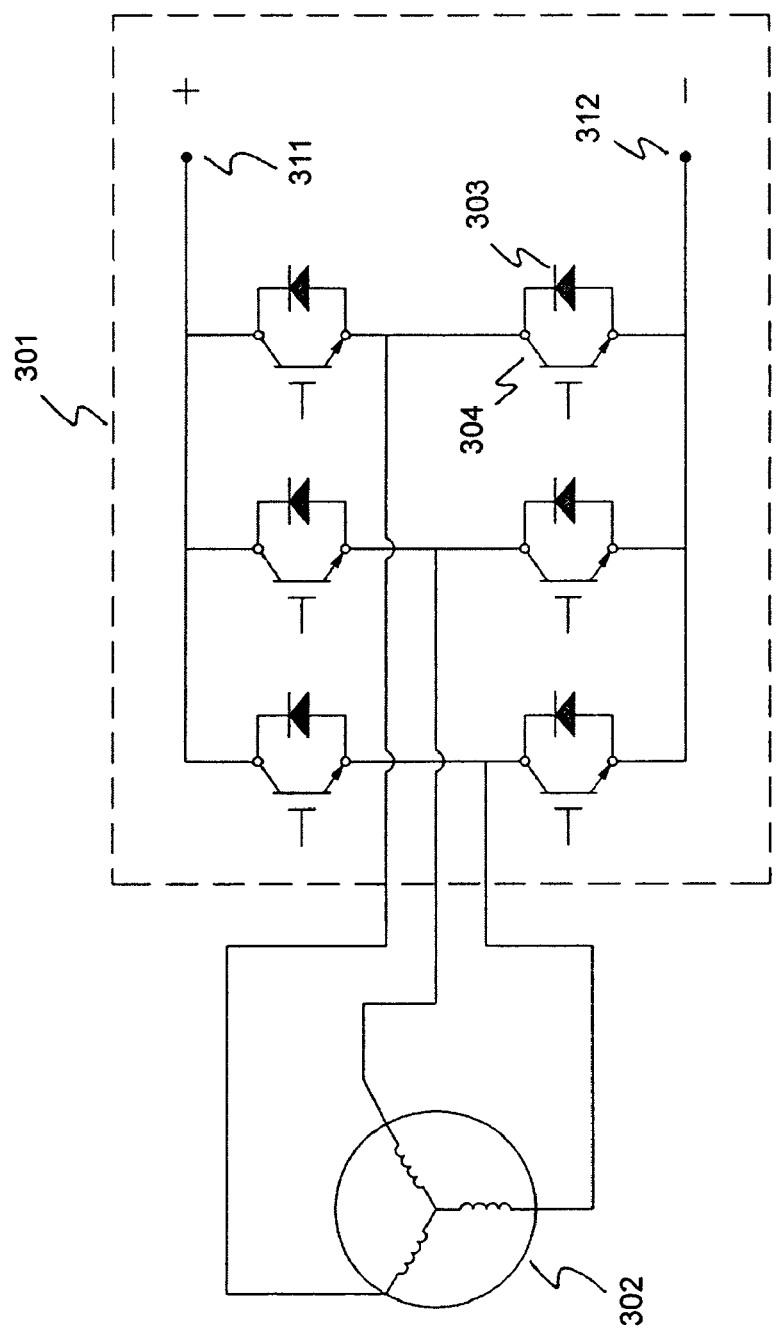
FIG. 3 is a circuit diagram of an inverter for forward or reverse power flow. This is prior art.

FIG. 3 is a circuit diagram of an induction alternator/rectifier for forward or reverse power flow. The circuit described in FIG. 3 is prior art and is a generalization of the rectifying circuit described for example in FIG. 2. In generating mode, a stator 302 generates an alternating current which is rectified by six power diodes 304 which are the internal diodes of IGBTs 303. In generating mode, the six IGBTs 303 are turned off and their internal diodes 304 form a rectifying circuit. Power flows from the stator 301 to the output terminals 311 and 312. The output terminals are for example the positive and negative bus bars of a DC bus such as described previously. In motoring mode, DC power from the terminals 311 and 312 flows to the stator 301 which in turn provides shaft power to the rotor (not shown). In motoring mode, the six IGBTs 303 provide pulse width modulation and form an inverter circuit, providing AC power to the stator. The amount of excitation for an induction generator is controlled by the frequency of the inverter. When the frequency of the inverter is higher than the motor/generator synchronous speed frequency, the motor/generator will produce a positive torque (motoring). When the inverter frequency is lower than the synchronous speed-frequency, the motor/generator will produce a negative torque (generating). Typically, a difference of 3% to 5% between the power frequency being fed the motor/generator and the machine's synchronous speed-frequency will produce full loading for both motoring and generating modes. The use of an induction alternator in motoring mode, when at least one electrical power source (for example, a diesel and its alternator, a turbine and its high-speed alternator, or an energy storage apparatus and its buck/boost circuit) is in operation supplying power to the DC bus, would allow power from the DC bus to be used to start or restart an engine that is turned off. This method of starting engines is known and is used to provide high starting power without the need of a separate starter motor. A pre-lubrication pump can also be operated directly from the DC bus or from an auxiliary power supply to lubricate a diesel engine just prior to starting it so as to extend its operational lifetime. While the above diesel engine start-up procedures are well-known, they can be applied more readily utilizing the voltage control and DC bus architecture of the present invention. In braking mode, the inverter circuit can be controlled to allow power to flow back to the alternator in asynchronous mode so that the alternator will turn the crankshaft of the engine and dissipate energy. Thus, during braking, the engines can be used as additional means of energy dissipation for example when the energy storage system can no longer absorb regenerative energy and/or when the dissipating resistive grid becomes overheated. Alternately, the engines can be used to dissipate excess braking energy in place of a dissipating resistive grid. As can be appreciated, the use of the engine or engines to dissipate braking energy can be used for dynamic braking in a conventional locomotive, replacing the dissipating resistive grid apparatus.

Figure 4:
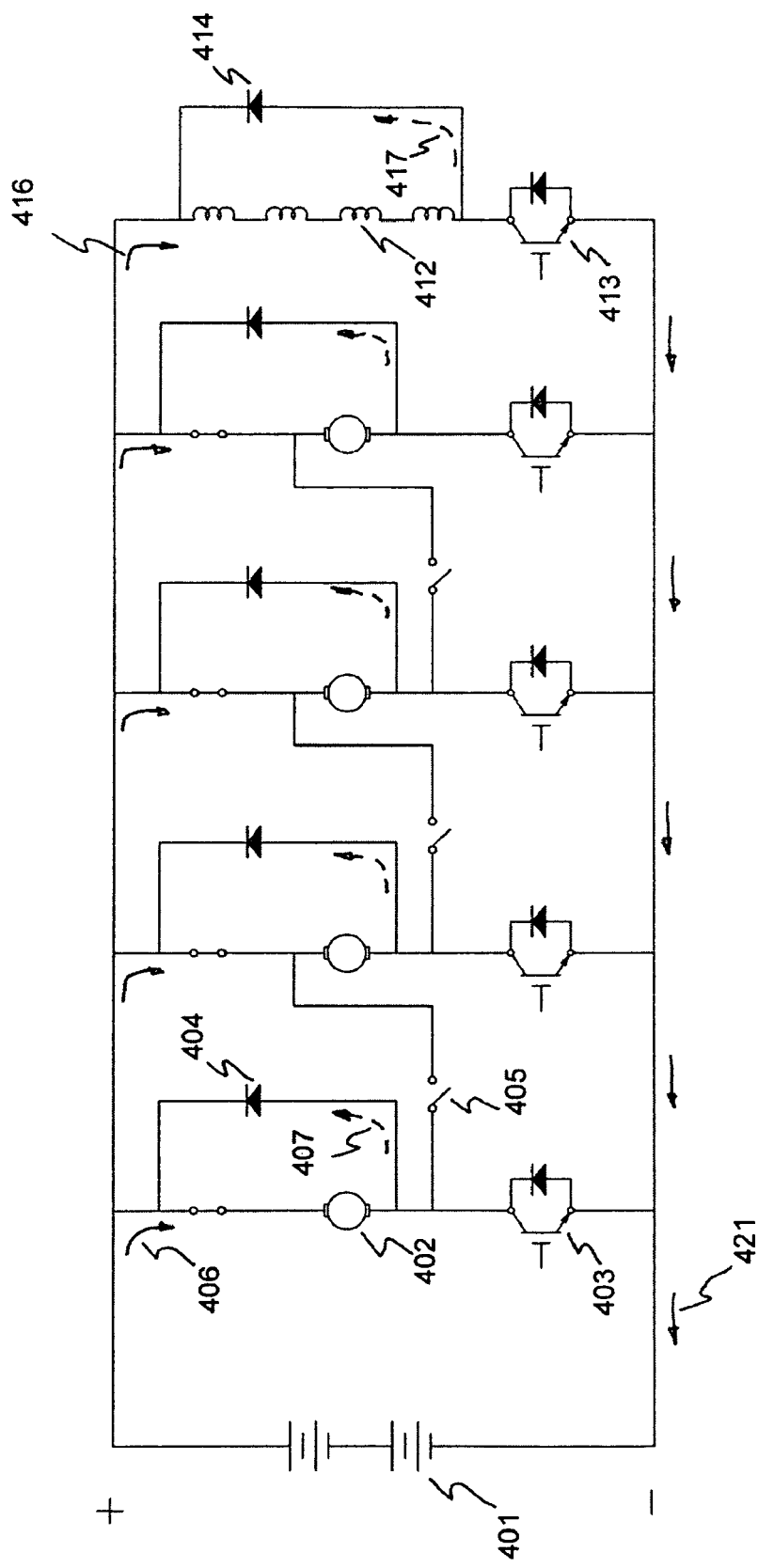
FIG. 4 is schematic circuit diagram showing 4 traction motors in motoring mode.

FIG. 4 is schematic circuit diagram showing an embodiment of the present invention with four DC traction motors 402 operating in motoring mode. As can be appreciated, the invention could also be illustrated by four AC motors with power control by inverters in place of choppers. The number of traction motors can be typically from two to about eight in a large locomotive. A battery pack 401 provides power as indicated by current flow 406 to all four motor circuits 402 with the current level controlled in part by individual IGBTs 403 for each motor 402. The IGBTs 403 and free-wheeling diodes 404 comprise a well known chopper circuit with the free wheeling current path shown by 407. Switches 405 are open during motoring. A separate chopper circuit comprised of IGBT 413 and free wheeling diode 414 is shown controlling the current to field windings 412. Four field coils 412 are shown corresponding to the field coils for each motor 402. The current path to the field coil circuit is shown by 416 and the free wheeling current path for the field coils is shown by 417. In motoring mode, current flows out of the positive terminal of the battery pack 401 and returns to the negative terminal of the battery pack 401 as shown by current path 421. It is noted that, while the current flow convention of positive current flowing from the positive battery terminal to negative terminal is used, the flow of electrons is from the negative terminal of the battery to the positive terminal. An important feature of the present invention is the use of a separate chopper circuit to simultaneously control the current to the field windings of all the DC traction motors. The power output of each traction motor 402 can still be controlled independently by its own armature chopper circuit. The circuit shown in FIG. 4 shows only a battery pack 401 driving the motors 402 and field coils 412. As can be appreciated, a prime mover such as for example a diesel engine and alternator/rectifier can also be connected in parallel with the battery pack to provide additional DC power to the circuit.

Figure 5:
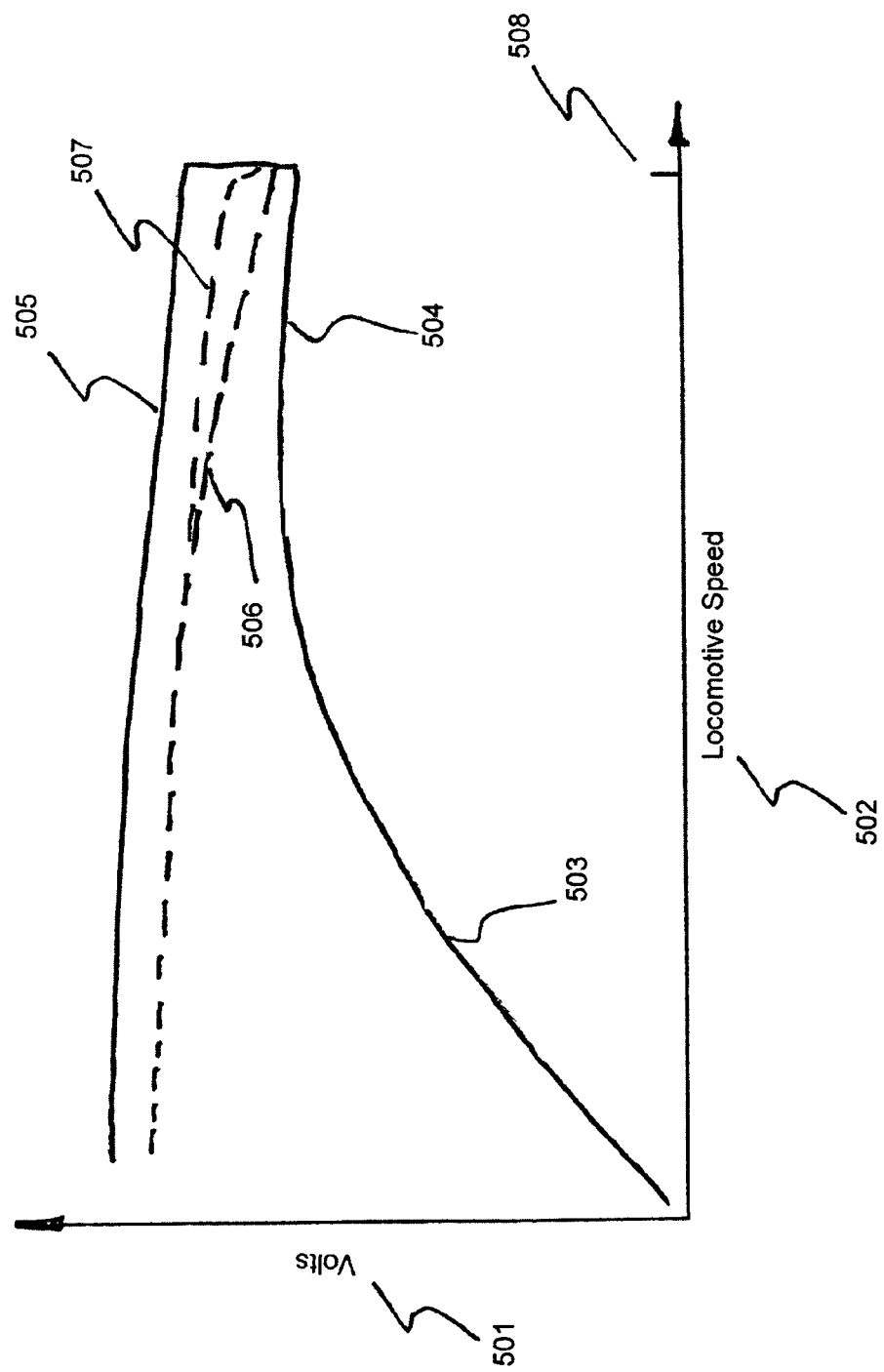
FIG. 5 is a graph of voltage across a DC traction motor as a function of locomotive speed.

FIG. 5 is an idealized graph of voltage 501 measured across a DC traction motor as a function of locomotive speed 502. The curve 503, 504 and 505 shows the voltage across the DC traction motor as measured across the output of the power supply system which may be comprised of a prime power source, an energy storage unit or both. The curve 506 and 507 shows the voltage associated with a energy storage battery pack as measured across its terminals. As an example, consider a locomotive that accelerates from rest to a high speed 508 and then brakes from the high speed 508 to a lower speed. As the locomotive accelerates from rest to a low speed, the motor volts typically increase monotonically with increasing locomotive speed as shown by the portion 503 of the motor voltage curve. This is because the RPMs of the armature shaft increase with locomotive speed which in turn increases the back emf on the motor armature by the motor field windings. The voltage across the motor is, to a first order, the sum of the back emf and the resistive voltage drop across the coils. In the present invention, the field current for the motor is controlled by an independent chopper circuit and, using computer control, the field current are generated so as to cause the motor volts to approximate a series wound DC traction motor. This is preferable at low speeds in order to maximize low speed tractive effort. At higher locomotive speeds, the motor voltage increases and approaches the level of the battery output volts. As this occurs, the field current is reduced so as to maintain the battery driving voltage at a higher value than the motor volts as shown by portion 504 of the motor voltage curve and the portion 506 of the battery voltage curve. This allows the motor current to be maintained in the motoring direction and therefore the motor continues to provide a positive torque. Thus the locomotive can be operated at a high velocity 508 or continue to accelerate to a higher velocity. When braking is implemented and it is desirable to activate regenerative braking, the field current is increased so as to raise the motor voltage to a higher value than the battery voltage as shown by portion 505 of the motor voltage curve and the portion 507 of the battery voltage curve. Over this portion 505 of the motor voltage curve, the motor acts as a generator and the direction of the motor current reverses and acts to charge the battery pack along path 507 of the battery voltage curve. The field current is used to control the level of the motor voltage so as to maintain battery charging as dictated by appropriate battery charging algorithms. A example of such an battery charging algorithm is given in Reference 1 entitled "Examination of VRLA Battery Cells Sampled From The Metlakatla Battery Energy Storage System" which is incorporated herein by reference. As locomotive speed decreases during braking, the locomotive speed can reach a value where the control of motor voltage to continue charging the battery pack is no longer possible using the field current control method by itself. It is the objective of the present invention to disclose several different methods by which the motor and/or power circuits can be reconfigured by appropriate switching so that the field current control method can be continued to be used to maintain the level of the motor voltage so as to continue charging the battery down to very low locomotive speeds. As can be appreciated, if the battery becomes charged to a predetermined maximum desirable state of charge ("SOC"), then the charging process can be terminated either by diverting the motor currents to well-known resistance grids (thereby continuing dynamic braking) or by using the field current control to reduce motor voltage below the voltage of the battery pack or by disengaging the power driving circuit from the traction motors. It is the objective of the present invention to disclose several methods for achieving regenerative braking at all locomotive speeds while maintaining independent control of each traction motor and optimal management of the battery pack recharging process. As can be appreciated, the principle is to maintain driving voltage of the power sources higher than motor volts during motoring and to maintain motor voltage (when the motor is acting as a generator) higher than energy storage voltage during braking. The DC motors can be AC motors. A single motor in the above figure can be several motors connected electrically in series or in parallel or in a combination of series and parallel.

FIG. 6, which is prior art, is a schematic circuit diagram showing current flow in motoring as in FIG. 6a and braking mode as in FIG. 6b. FIG. 6a illustrates a battery pack 601 driving a DC traction motor 602 and its separately excited field winding 611. The current 605 through the motor armature circuit is controlled by a chopper circuit comprised of an IGBT 603 and a free wheeling diode 604. The current 615 through the motor field winding circuit is controlled by a separate chopper circuit comprised of an IGBT 612 and a free wheeling diode 613. In motoring mode, the current flows out of the positive terminal of battery pack 601 and into the negative terminal of the battery pack 601, discharging the battery pack 601 while providing power to the motor 602. FIG. 6b illustrates the same battery pack 601 being charged by a DC traction motor 602 in braking mode and acting as a generator. The current 622 through the motor armature is reversed during braking as compared to its direction shown in FIG. 6a and bypasses the IGBT 603 by passing through its internal diode 621. The current level in motor 602 is now controlled by varying the current in the field winding 611. The current 623 through the motor field winding circuit is in the same direction as shown in FIG. 6a and continues to be controlled by its separate chopper circuit. In braking mode, the current flows into the positive terminal of battery pack 601 and out of the negative terminal of the battery pack 601, charging the battery pack 601 by absorbing energy from the motor 602 now acting as a generator. This figure illustrates how current flows through a motor armature in motoring (FIG. 6a) and braking (FIG. 6b) utilizing a motor armature chopper circuit and a separate field chopper circuit wherein the direction of the field current is always the same.

Figure 7:
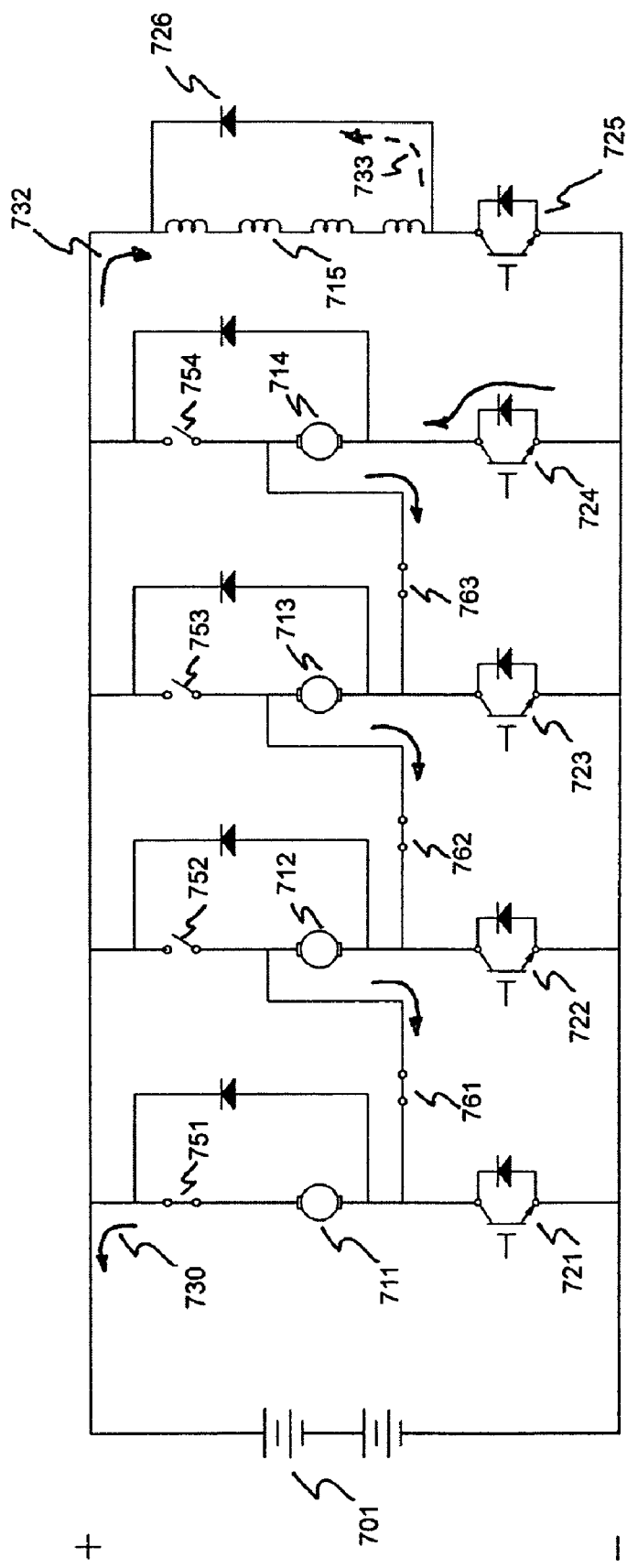
FIG. 7 is schematic circuit diagram showing 4 traction motors in low speed braking mode.

In a first embodiment, a motor switching method is illustrated for three locomotive velocity regimes utilizing a locomotive driving system of four DC traction motors. In the motor switching embodiment of regenerative braking, the traction motors may be switched at appropriate times between parallel and series configurations to maintain sufficiently high voltage to charge the energy storage system. As will be appreciated, the number of motors and velocity regimes can vary but the circuit example represented in the following three figures is representative for a large locomotive (typically about 2,000 to about 6,000 HP depending on the combined power capability of the diesel generator and battery pack). FIG. 7 is schematic circuit diagram showing four traction motors all operating in generator mode appropriate for braking during a low locomotive speed regime. All four motors are connected in series to provide a generating voltage sufficiently high enough to cause a charging current to be delivered to a large battery pack 701. When making a transition from motoring to braking, four motor armatures 711, 712, 713 and 714 are connected in series by leaving switch 751 closed; opening switches 752, 753 and 754; and closing switches 761, 762 and 763. In addition, IGBTs 721, 722, 723 and 724 are turned off. The field windings of all the motors are connected in series and controlled by an excitation chopper circuit comprised of IGBT 725 and free wheeling diode 726. The current 732 through the field coils 715 remains in the same direction whether motoring or braking and is controlled by the chopper circuit comprised of IGBT 725 and free wheeling diode 726. The free wheeling current path 733 for the field chopper circuit remains the same for motoring and braking. The control of current level through the motor armatures during braking is accomplished by varying the current in the field windings. Current flows out of the negative terminal of the battery pack 701 and through the internal diode of IGBT 724, through motor armature 714, motor armature 713, motor armature 712, motor armature 711 and back to the positive terminal of the battery pack 701 as shown by current path 730. As an example, the voltage across the battery pack 701 may be about 700 volts. At low locomotive speeds below for example about 10 mph, each motor may be generating about 275 volts so that the generating voltage capacity across four motor armatures would be substantially higher than the battery voltage and the motors acting as generators in series would cause the battery pack 701 to be charged. In order to properly charge the battery, it is necessary to maintain the charging current of the battery below a first predetermined level, to maintain the battery pack voltage below a second predetermined level, to employ an appropriate charging algorithm and to maintain the SOC of the battery pack below a third predetermined level. These and other conditions can be met by varying the field circuit current 732 so that the battery is charged in a manner consistent with good charging practice, especially practices that tend to maximize battery pack lifetime. The system would continue to provide regenerative energy to the battery pack 701 until the locomotive speed drops to less than about 3 to about 6 mph and the generating voltage drops below the voltage of the battery pack 701. When the motor generating voltage drops below the battery voltage, the internal diode 734 of IGBT 724 prevents the current 731 from reversing. In the event that the third predetermined level for battery pack SOC is exceeded, the motors can be switched out of generating mode or the regenerative current 730 can be switched to a dissipating resistance grid (not shown).

Figure 8:
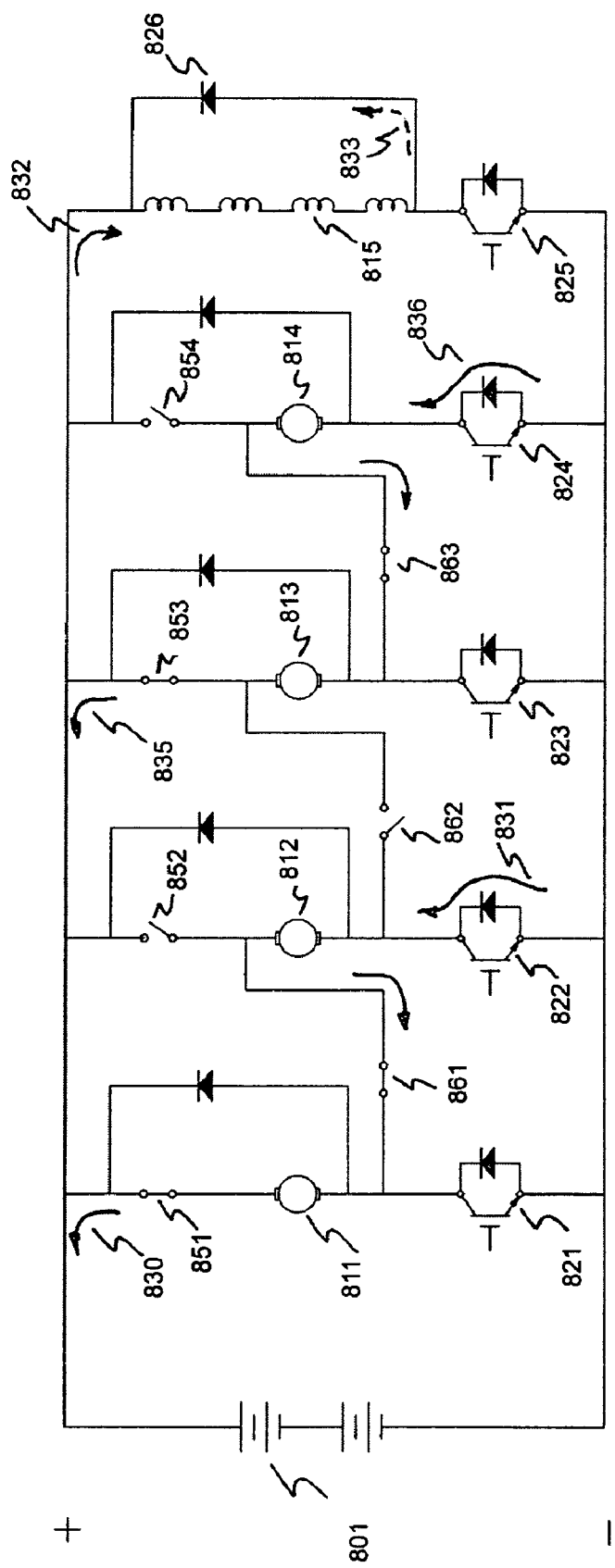
FIG. 8 is schematic circuit diagram showing 4 traction motors in moderate speed braking mode.

FIG. 8 is schematic circuit diagram showing four traction motors all operating in generator mode appropriate for braking during a moderate locomotive speed regime. In this example, two of the four motors are connected in series with each other. The other two of the four motors are connected in series with each other and then the two pairs of series connected motors are connected in parallel with each other. This arrangement can provide a generating voltage sufficiently high enough to cause a charging current to be delivered to a large battery pack 801. When making a transition from motoring to braking, the two motor armatures 811 and 812 are connected in series by leaving switch 851 closed; closing switch 861; and opening switch 852. Simultaneously, the two motor armatures 813 and 814 are connected in series by leaving switch 853 closed; closing switch 863; and opening switch 854. In addition, IGBTs 821, 822, 823 and 824 are turned off. The field windings of all the motors are connected in series and controlled by an excitation chopper circuit comprised of IGBT 825 and free wheeling diode 826. The current 832 through the field coils remains in the same direction whether motoring or braking and is controlled by the chopper circuit comprised of IGBT 825 and free wheeling diode 826. The free wheeling current path 833 for the field chopper circuit remains the same for motoring and braking. The control of current level through the motor armatures during braking is by varying the current in the field windings. Current flows out of the negative terminal of the battery pack 801 and through the internal diode of IGBT 822, through motor armature 812, motor armature 811 and back to the positive terminal of the battery pack 801 as shown by current paths 831 and 830. Simultaneously, current flows out of the negative terminal of the battery pack 801 and through the internal diode of IGBT 824, through motor armature 814, motor armature 813 and back to the positive terminal of the battery pack 801 as shown by current paths 836 and 835. As an example, the voltage across the battery pack 801 may be about 600 volts. At low locomotive speeds below for example about 20 to about 25 mph, each motor may be capable of generating about 550 volts so that the generating voltage across each pair of two motor armatures could be about 1,100 volts and the motors acting as generators in series would cause the battery pack 801 to be charged. In order to properly charge the battery, it is necessary to meet several battery charging conditions such as described in FIG. 7 by varying the field circuit current 832 so that the battery is charged in a manner consistent with good charging practice, especially practices that tend to maximize battery pack lifetime. In the event that a predetermined level for battery pack SOC is exceeded, the motors can be switched out of generating mode or the regenerative current 830 can be switched to a dissipating resistance grid (not shown). Otherwise, the system would continue to provide regenerative energy to the battery pack 801 until the locomotive speed drops to less than about 12 mph and the generating voltage drops below the voltage of the battery pack 801. Once this condition is sensed, a controller would reconfigure the circuit to that depicted in FIG. 7.

Figure 9:
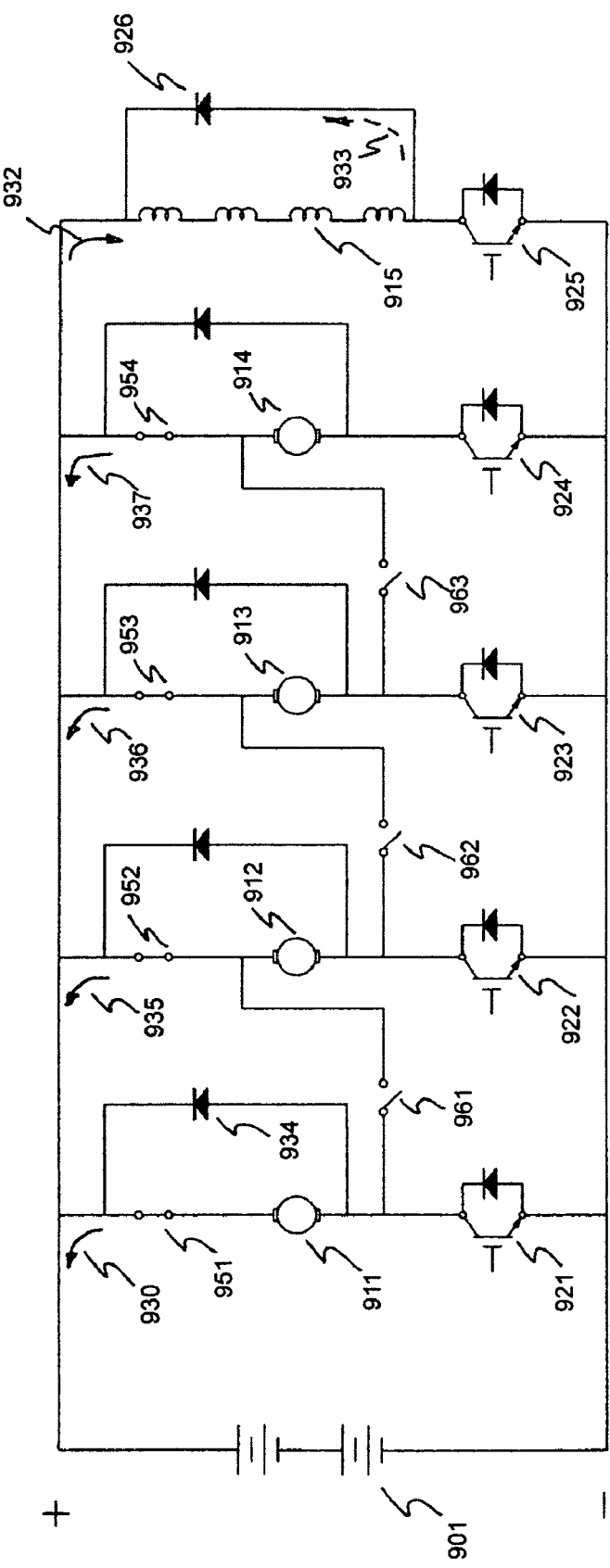
FIG. 9 is schematic circuit diagram showing 4 traction motors in high speed braking mode.

FIG. 9 is schematic circuit diagram showing four traction motors all operating in generator mode appropriate for braking during a high locomotive speed regime. In this example, all four motors are connected in parallel as is in the case of FIG. 4 which depicts all four motors in motoring mode. This arrangement can provide a generating voltage sufficiently high enough to cause a charging current to be delivered to a large battery pack 901. When making a transition from motoring to braking, the switches are not changed with switches 951, 952, 953 and 954 all remaining closed. Switches 961, 962 and 963 remain open. IGBTs 921, 922, 923 and 924 are turned off. The field windings of all the motors are connected in series and controlled by an excitation chopper circuit comprised of IGBT 925 and free wheeling diode 926. The current 932 through the field coils remains in the same direction whether motoring or braking and is controlled by the chopper circuit comprised of IGBT 925 and free wheeling diode 926. The free wheeling current path 933 for the field chopper circuit remains the same for motoring and braking. The control of current level through the motor armatures during braking is by varying the current in the field windings. Current flows out of the negative terminal of the battery pack 901 and is divided approximately equally through the internal diodes of IGBTs 921, 922, 923 and 924. Approximately equal levels of currents therefore also flow through motor armatures 911, 912, 913 and 914 and then are added in the return leg back to the positive terminal of the battery pack 901 as shown by current paths 930, 935, 936 and 937. No current flows through any of the motor armature free wheeling diodes such as diode 934. As an example, the voltage across the battery pack 901 may be 600 volts. At high locomotive speeds above for example about 40 mph, each motor may be capable of generating about 700 volts so that the generating voltage across each of the motor armatures would be enough to cause the battery pack 901 to be charged. In order to properly charge the battery, it is necessary to meet several battery charging conditions such as described in FIG. 7 by varying the field circuit current 932 so that the battery is charged in a manner consistent with good charging practice, especially practices that tend to maximize battery pack lifetime. In the event that a predetermined level for battery pack SOC is exceeded, the motors can be switched out of generating mode or the regenerative current 930 can be switched to a dissipating resistance grid (not shown). Otherwise, the system would continue to provide regenerative energy to the battery pack 901 until the locomotive speed drops to below about 40 to about 45 mph and the generating voltage drops below the voltage of the battery pack 901. Once this condition is sensed, a controller would reconfigure the circuit to that depicted in FIG. 8.

As will be appreciated, the above embodiment can include a separate engine and power conversion apparatus in parallel with the battery pack as shown for example in FIG. 2. During motoring, the engine may provide additional power to the traction motors. During braking, the power conversion apparatus associated with the engine (typically an alternator/rectifier) commonly contains circuitry to prevent power flow back to the engine and the availability of a engine will not influence the operation of the above circuits as described.

Figure 10:
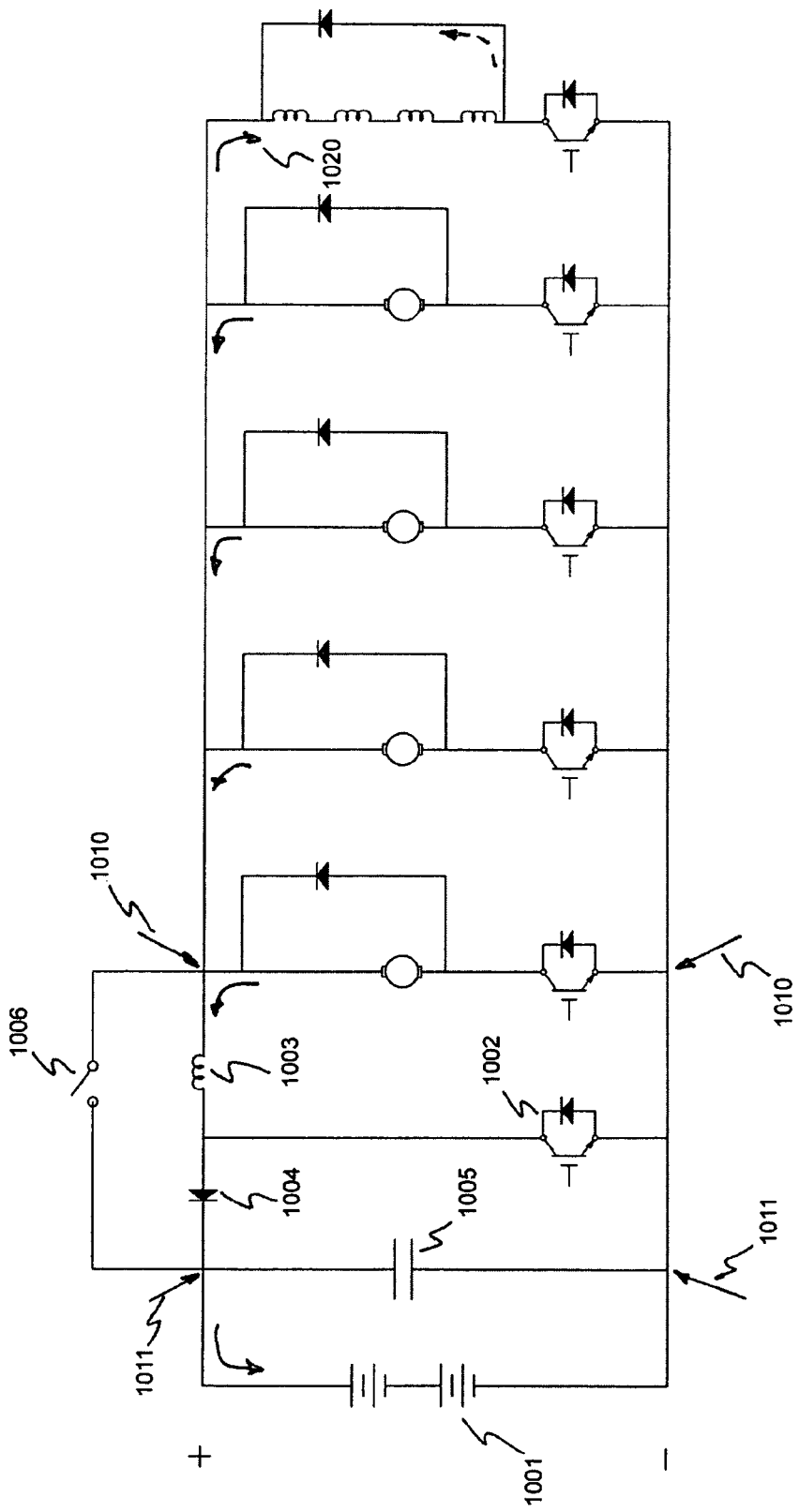
FIG. 10 is schematic circuit diagram showing 4 traction motors with a boost circuit for braking mode.

In a second embodiment, a boost circuit (also known as a step-up circuit) can be used to maintain a desired charging voltage across a battery pack as the source voltage decreases below a predetermined level. Examples of boost circuits may be found on pages 78 and 79 of "Linear/Switchmode Voltage Regulator Handbook" Motorola, Inc. 1982, which is incorporated herein by reference. FIG. 10 is schematic circuit diagram showing four traction motors in a parallel configuration with a boost circuit used only in braking mode. The main circuit, comprised of a battery pack, DC traction motors, their individual chopper circuits and a separate field chopper circuit, is identical to that shown, for example, in FIG. 4 (motoring mode) when switch 1006 is closed to bypass the boost circuit. FIG. 10 also includes a boost circuit comprised of an energy storage inductor 1003, an energy storage capacitor 1005, a diode 1004 and a switch 1002. The switch 1002 may be an IGBT for example that can be regulated to open and close so as to control the amount of voltage boost. When the locomotive goes from motoring to braking mode, the motors change to generating mode and switch 1006 is immediately opened and left open during braking mode. The voltage as measured between points 1010 developed by the motors now acting as generators will be higher than the battery voltage above some locomotive speed. When this is the case, the voltage as measured between points 1010 will be controlled by varying the field circuit current 1020 so that the battery is charged in a manner consistent with good charging practice. Additionally, IGBT 1002 will be completely off (not conducting) so that the boost circuit will not provide any voltage boost. As locomotive speed is reduced, the voltage as measured between points 1010 will drop below that of the battery pack voltage as measured between points 1011. When this condition is sensed, a controller will operate IGBT 1002 so as to control the amount of boost to the voltage as measured between points 1011 so that the battery pack will continue to be charged in a manner consistent with good charging practice. Thus when braking from most locomotive speeds, the motors now acting as generators will act to charge the battery pack 1001. As noted previously, IGBT 1002 may be regulated to open and close so as to maintain a predetermined current and/or charging voltage across battery pack 1001 as the speed of the locomotive, and hence the voltage as measured between points 1010, continues to decrease. In order to properly charge the battery, it is necessary to maintain the charging current of the battery below a first predetermined level, to maintain the battery pack voltage below a second predetermined level, to employ an appropriate charging algorithm and to maintain the SOC of the battery pack below a third predetermined level. These and other conditions can be met by varying the field circuit current 1020 and/or the amount of boost so that the battery is charged in a manner consistent with good charging practice, especially practices that tend to maximize battery pack lifetime. The system would continue to provide regenerative energy to the battery pack 1001 until the locomotive speed drops to less than about 3 to about 6 mph and the voltage as measured between points 1011 drops below the voltage of the battery pack 1001 (when the fully boosted generating voltage cannot be maintained above the battery voltage). In the event that a predetermined level for battery pack SOC is exceeded, the motors can be switched out of generating mode or the regenerative current can be switched to a dissipating resistance grid (not shown). To return to motoring mode, switch 1006 is closed. As will be appreciated, the above embodiment can include a separate engine and power conversion apparatus in parallel with the battery pack as shown for example in FIG. 2. During motoring the engine may provide additional power to the traction motors. During braking, the conversion apparatus associated with the engine typically contains circuitry to prevent power flow back to the engine and the availability of a engine will not influence the operation of the above circuit as described.

In yet another embodiment, the battery pack volt-ampere characteristics can be reconfigured by switching battery pack modules to various series and parallel configurations to maintain the energy storage system at a lower voltage level than the DC bus. For example, a battery pack can be comprised of two modules which can be connected in series or in parallel. As another example, a battery pack can be comprised of four modules which can be connected all in series, all in parallel or two pairs of modules connected in series with the two pairs connected in parallel. The following example shown in FIG. 11 illustrates the principle with a battery pack comprised of two modules. FIG. 11*a* shows a locomotive drive circuit in motoring mode where a battery pack is comprised of two modules 1101 and 1102 which are shown connected in series using switches 1111 and 1112. As can be appreciated, a rectified engine voltage can also be applied in parallel with that of the battery pack to augment voltage input to the motor circuit. The motor circuit shows four DC traction motors connected in parallel with independently controlled field coils similar to the arrangement shown in FIGS. 4 and 9. In motoring mode, the voltage output of the battery pack is higher than the voltage across the motors and field coils and current 1142 flows from the positive terminal of the battery pack to drive the motors as shown by the example of current 1141 and to drive the field coils as shown by current 1151. The free wheeling path for the chopper circuit controlling the field coils is shown as 1152. FIG. 11*b* shows a locomotive drive circuit in braking mode where the battery pack, comprised of two modules 1101 and 1102, is shown with the modules remaining connected in series and switches 1111 and 1112 remaining in the positions used for motoring. If an engine is being used to augment the battery pack as described in FIG. 11*a*, it would typically be disconnected from the motor circuit during braking. In high speed braking mode, the motors now acting as generators would have a voltage greater than the voltage across a battery pack and would act to charge the battery pack. This is indicated by the reversal of currents 1141 and 1142. The current 1151 through the field coils remains in the same direction whether motoring or braking and is controlled by a chopper circuit as described previously. The control of current level through the motor armatures during braking is by varying the current in the field windings, also as described previously. As the locomotive speed drops to lower levels, the voltage developed by the motors now acting as generators will drop below the voltage across a battery pack. When this condition is detected (for example by current measurement indicating that the battery current is approximately zero), switches 1111 and 1112 are changed as shown in FIG. 11*c* to cause battery module 1101 and 1102 to be connected in parallel. Once the modules are in parallel, the voltage across the motors now functioning as generators is greater than the voltage across a battery pack and the motors will continue to charge the battery pack as indicated by current direction 1141 which is shown charging module 1101 by current 1143 and module 1102 by current 1144. As can be appreciated, increasing the number of battery pack modules will increase the ability to charge the battery pack during braking as the locomotive speed drops to lower values. For example, a battery pack comprised of four equal modules that can be switched to any combination of series and parallel configurations will have the same control over the battery charging process as the embodiment described in FIGS. 7, 8 and 9. In order to properly charge the battery, it is necessary to maintain the charging current of the battery below a first predetermined level, to maintain the battery pack voltage below a second predetermined level, to employ an appropriate charging algorithm and to maintain the SOC of the battery pack below a third predetermined level. These and other conditions can be met by varying the field circuit current 1151 so that the battery is charged in a manner consistent with good charging practice, especially practices that tend to maximize battery pack lifetime. The system would continue to provide regenerative energy to the battery pack 1101 until the locomotive speed drops to less than about 3 to about 6 mph and the voltage output of the regeneration system drops below the voltage of the battery pack 1101. In the event that a predetermined level for battery pack SOC is exceeded, the motors can be switched out of generating mode or the regenerative current can be switched to a dissipating resistance grid (not shown). As will be appreciated, the above embodiment can include a separate engine and power and conversion apparatus in parallel with the battery pack as shown for example in FIG. 2. During motoring the engine may provide additional power to the traction motors. During braking, the power conversion apparatus associated with the engine typically contains circuitry to prevent power flow back to the generator and the availability of an engine will not influence the operation of the above circuit as described. As can be further appreciated, a combination of some battery module switching with a boost circuit such as described in FIG. 11 can also be used to control regenerative charging of a battery pack during braking.

Figure 12:
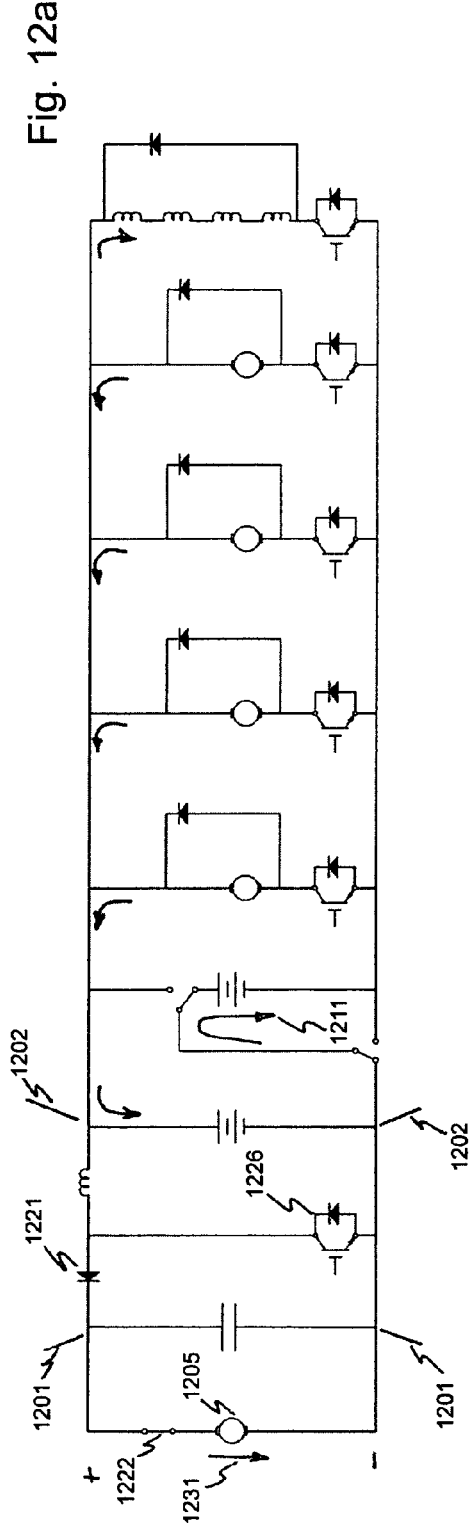
FIGS. 12a and b are schematic circuits diagram showing a boost circuit for maintaining voltage on an auxiliary motor.
Figure 12:
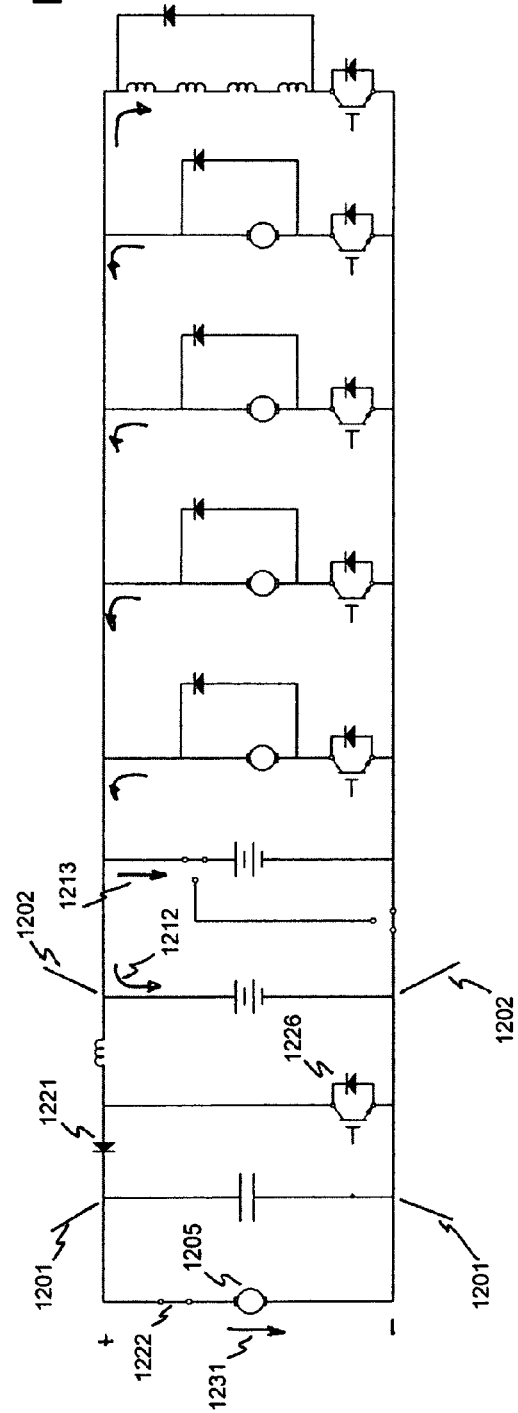

In the third embodiment described above in FIG. 11, the battery pack may be used to drive auxiliary motors that provide auxiliary power for the locomotive and/or other cars in the train. It may be possible to utilize auxiliary motors that can operate while tolerating wide variations in the volt-ampere characteristics of the battery pack such as caused for example by switching battery pack modules from series to parallel configurations as described above in FIG. 11. If this tolerance is not available, then the battery pack output voltage driving the auxiliary power can be maintained by utilizing a boost circuit such as shown for example in FIG. 12. The boost circuit shown in FIG. 12 is the same configuration as that described in FIG. 10.

FIG. 12*a* shows an auxiliary motor 1205 connected across a battery pack. The battery pack is shown as two modules connected in series. The traction motor circuit is shown in braking mode so that it is charging the battery pack by a voltage as measured between points 1202. IGBT 1226 is completely off (not conducting) so that the boost circuit will not provide any voltage boost so that the voltage driving the auxiliary motor 1205 is essentially that of the battery pack. The voltage as measured between points 1201 is about the same as the voltage measured between points 1202. The current in the auxiliary motor 1205 is shown by 1231. A switch 1222 is shown closed to engage the auxiliary motor with the battery pack. Diode 1221 allows the battery pack to continue to provide power to the auxiliary motor 1205 while in motoring mode. FIG. 12*b* shows an auxiliary motor 1205 connected across a battery pack where the battery pack is shown as two modules now connected in parallel. The traction motor circuit is shown in braking mode so that it is charging the battery pack by a voltage as measured between points 1202. When this battery configuration is sensed, a controller will operate IGBT 1226 to control the amount of boost to the voltage as measured between points 1201 so that the voltage across the auxiliary motor will remain within its specified range for proper operation. The current in the auxiliary motor 1205 is shown by 1231. A switch 1222 is shown closed to engage the auxiliary motor with the battery pack.

Figure 13:
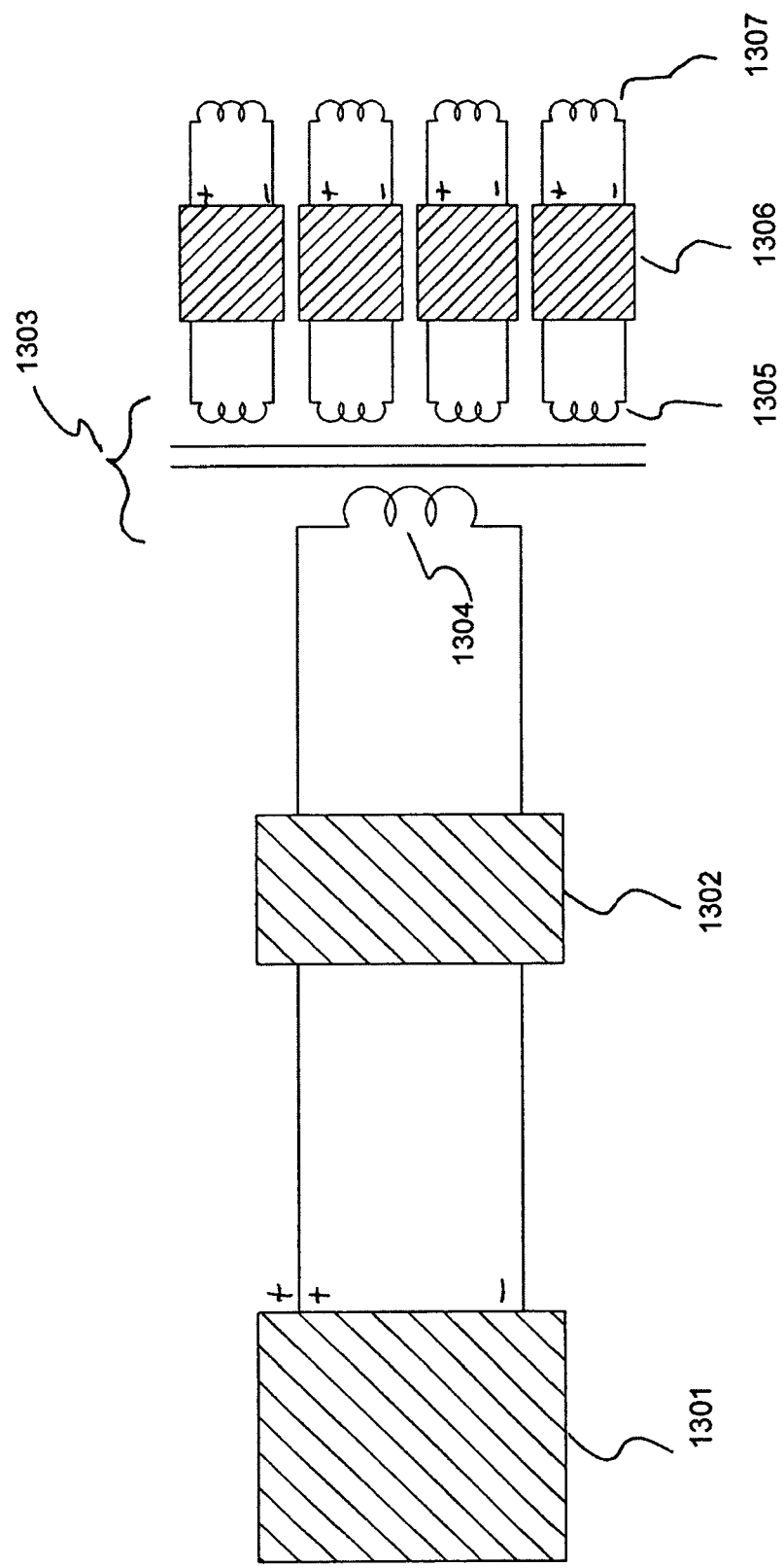
FIG. 13 is a schematic diagram of a method of isolating motor field coils.

FIG. 13 is a schematic diagram of a method of electrically isolating motor field coils. A DC power supply 1301 is shown connected to an inverter 1302 which is controlled by a Pulse Width Modulated ("PWM") apparatus (not shown). This PWM would be the means by which the field currents are controlled as described for example in FIGS. 7 through 11. The DC power source 1301 may be a the main energy storage battery pack, an auxiliary battery pack, or the DC bus from a diesel engine/rectifier apparatus. The output of the inverter 1302 is connected to a transformer 1303 which is comprised of a single primary winding and multiple secondary windings 1305. Each secondary winding is connected to a rectifier which drives a DC traction motor field coil 1307. In the configuration shown, each field coil is electrically isolated from each other field coil and electrically isolated from the motor armatures (not shown). In an alternative configuration (also not shown), the transformer can have a single secondary connected to a single rectifier which would, in turn, be connected to all the field coils connected in series. Although this alternative configuration would not have electrical isolation of the field coils from one another, it still retains electrical isolation from the motor armatures and its single rectifier would generate less heat than the configuration with the multiple separate rectifiers and field coil circuits shown in FIG. 13.

FIG. 14 is a schematic diagram showing independently controlled field windings which are in series with their armature windings. FIG. 14*a* shows a single DC chopper controlled traction motor circuit. As can be appreciated their can be two or more traction motor circuits in parallel as, for example, shown in FIG. 4. A battery pack 1401 is shown connected across a traction motor 1402 and its field coil 1403. The field coil is also connected to a variable voltage DC power source 1405. This can be a separate auxiliary power source with a DC output or the DC power can be derived from the main battery pack 1401 using a well-known buck/boost chopper control circuit. The power source 1405 for the field coil 1403 is preferably electrically isolated from the field coil 1403 by a means such as for example a transformer such as transformer 1303 in FIG. 13. FIG. 14*a* illustrates motoring mode in which a current 1410 flows from the battery 1401 and current 1420 flows through the motor armature 1402 and in the same direction as the current 1430 through the field coil 1403. FIG. 14*b* illustrates braking mode with regeneration in which a current 1411 flows to the battery pack 1401, in part from the current 1421 from the motor armature 1402. The output from the variable voltage DC power source 1405 must be increased so as to maintain the field current 1431 in the same direction as in motoring. Thus the DC circuit 1405 must be capable of providing enough power to supply a current 1431 to the field coil 1403 that is the sum of the required field current and the regeneration current 1421.

FIG. 15 shows one of a number of ways in which the polarity of field windings may be reversed to allow traction motors to reverse output shaft rotation direction. This figure represents prior art and was disclosed previously for example in FIG. 9 of U.S. patent application Ser. No. 10/650,011. FIG. 15*a* illustrates a motoring current 1503 passing through a field coil 1501 in direction 1502 as determined by the contactor settings shown. FIG. 15*b* illustrates a motoring current 1503 passing through a field coil 1501 in the opposite direction 1504 from that shown in FIG. 15*a*. As can be seen, this is caused by breaking the contacts shown in FIG. 15*a* and making the contacts shown open in FIG. 15*a*. The purpose of FIG. 15 is to illustrate a well known method using contact switches to reverse the direction of the traction motor output torque by reversing the direction of the field current. This method can be used on the field coil circuits shown for example in FIGS. 4 and 7 through 11. This method can also be applied to the traction motor armature windings instead of the field windings to cause the motor to reverse output shaft rotation direction. It is noted that the contactors 1501 are illustrative only and in practical application would be opened in both directions for a brief time period to minimize or eliminate arcing during resetting.

The various embodiments of the present invention can be viewed as a straightforward method of controlling the flow of power between the prime mover, the energy storage system and the regenerative braking system. The control can be quite seamless by controlling the voltage output of the prime mover through controlling the excitation of the prime mover; utilizing independent chopper control of the DC traction motor field windings; utilizing independent chopper control of the currents in the motor armature windings; and unitizing chopper control of the boost circuit (if used) activated during regenerative braking.

As can be seen, the control of power flow from the prime mover; the flow of power to and from the energy storage apparatus; and the flow of power to the motors or from the motors acting as generators is controlled by varying the voltage output of the prime mover and/or varying the current in the motor field windings. This general mode of voltage control operation is applicable to all embodiments of the present invention including the preferred embodiment which is described below.

Figure 16:
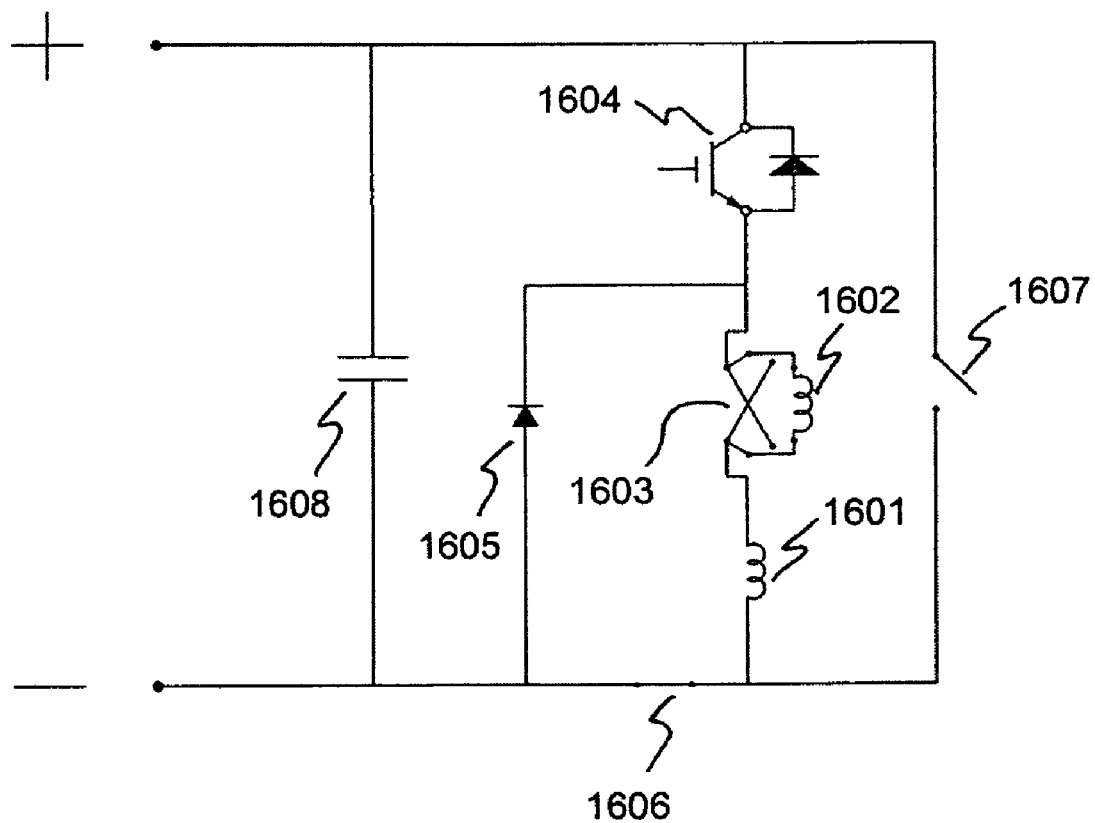
FIG. 16 illustrates the principal circuit elements of an alternate regenerative braking system using traction motor energy storage.

FIG. 16 illustrates the principal circuit elements of a preferred configuration of an alternate regenerative braking system in which the inductance of DC traction motor is used to temporarily store energy during braking mode until motor voltage levels are sufficiently high enough to charge the energy storage system. In this embodiment, energy is stored for brief periods in the motor armature and field windings and then discharged to an energy storage system, such as for example a battery pack, as will be discussed in subsequent figures. In this circuit configuration, a field coil 1601 and an armature winding 1602 are shown connected in series. A switchable contact reverser 1603 allows the current to be switched in opposite directions through the armature 1602 while maintaining the same current flow direction in the field coil 1601. The field coil 1601 and armature winding 1602 are typically contained inside a DC traction motor. The current to the DC traction motor is controlled by a chopper circuit which is comprised of an IGBT 1604 and a free-wheeling diode 1605. Two switches 1606 and 1607 are shown along with a filter capacitor 1608. One of switches 1606 and 1607 is always open when the other is closed. As an alternate circuit configuration, it is possible to place the contact reverser 1603 across the field coil 1601 instead of across the armature 1602.

FIG. 17 illustrates the four modes of operation of the circuit shown in FIG. 16. In motoring mode (FIG. 17*a* and FIG. 17*b*), switch 1701 is closed and switch 1702 is open. The polarity of the motor back emf across the reverser switch terminals is positive on IGBT side of the reverser switch terminals. When IGBT 1703 is on as shown in FIG. 17*a*, current flows from the positive terminal of the circuit through the armature and field coils and returns to the negative terminal of the circuit as indicated by the current flow arrows. When IGBT 1703 is off as shown in FIG. 17*b*, current flows through the armature and field coils and continues to circulate through the free wheeling path current as indicated by the arrows. In generating mode (FIG. 17*c* and FIG. 17*d*), switch 1701 is now opened while switch 1702 is closed and the reverser switch across the armature is changed over as shown. The polarity of the back emf across the reverser switch terminals is now positive on field winding side of the reverser switch terminals. When IGBT 1703 is on as shown in FIG. 17*c*, current flows through the armature and field coils and continues to circulate through an alternate free wheeling path as indicated by the current flow arrows. However, the current in the armature flows in the opposite direction compared to its direction during motoring mode. When IGBT 1703 is off as shown in FIG. 17*d*, current flows from the negative terminal of the circuit through the armature and field coils and returns to the positive terminal of the circuit as indicated by the arrows. The current in the armature continues to flow in the opposite direction compared to its direction during motoring mode. In FIG. 17*a*, power flows from the positive terminal of the circuit and is delivered to the armature of the traction motor to provide power to the driving axles. The average level of power to the armature is controlled by the on/off time ratio (also called the duty cycle) of IGBT 1703. In FIG. 17*b*, the IGBT 1703 is off, current continues to flow through the armature but no power is delivered by the circuit power source to the motor. When braking, the traction motor becomes a generator. As shown in FIG. 17*c*, IGBT 1703 is on, current flows through the armature and alternate free wheeling path but no power is delivered to the positive terminal of the circuit. Once the level of current increases to a predetermined level, IGBT 1703 is switched off and, as shown in FIG. 17*d*, power can now flow from the armature to the positive terminal of the circuit. As can be seen, if the positive and negative terminals of the circuit are connected to a storage battery, the storage battery will be charged when the voltage across the positive and negative terminals is greater than the voltage across the battery terminals. When dynamic braking is applied at any speed, IGBT 1703 in FIGS. 17*c* and 17*d* is controlled to ensure that sufficient current is developed in the motor windings before switching the stored energy in the windings to a battery, another energy storage unit or a dissipating resistance grid. Especially when dynamic braking is applied at high speeds, IGBT 1703 in FIGS. 17*c* and 17*d* is controlled to ensure that the current in the motor windings does not increase beyond a predetermined level.

In motoring mode, the voltage from the locomotive power source drives a current through the traction motor when its chopper IGBT is on. At low motor rpms, the average motor current is high and the armature back emf is relatively low. At high motor rpms, the average motor current is reduced since the back emf increases with increasing rpms. However, the back emf remains lower than the driving voltage from the power source and power continues to flow to the motor. When the IGBT switches off, the motor current begins a relatively slow L/R decay through its free wheeling path (where L is total inductance in the free wheeling path and R is total resistance in the free wheeling path).

The motor volts can be expressed as:

$$V_{motor} = V_{emf} + IR_m + L_m di/dt$$

where:
$V_{emf}$ is the back emf
I is the motor current
$R_m$ is the total motor resistance
$L_m$ is the total motor inductance Typically, the inductive voltage component $L_m di/dt$ is transient in nature, arising when the motor circuit is switched back and forth between driven and free wheeling.

Figure 17A:
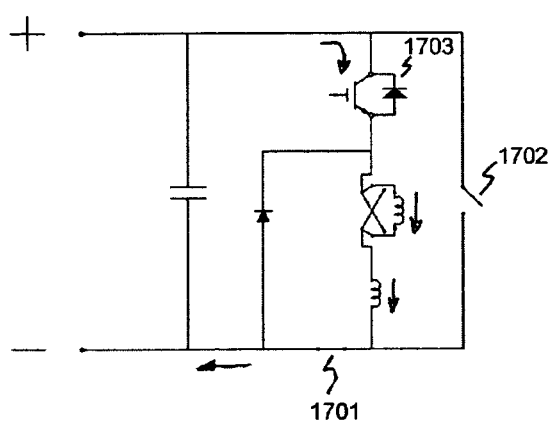
FIG. 17 illustrates the four modes of operation of the circuit shown in FIG. 16.
Figure 17C:
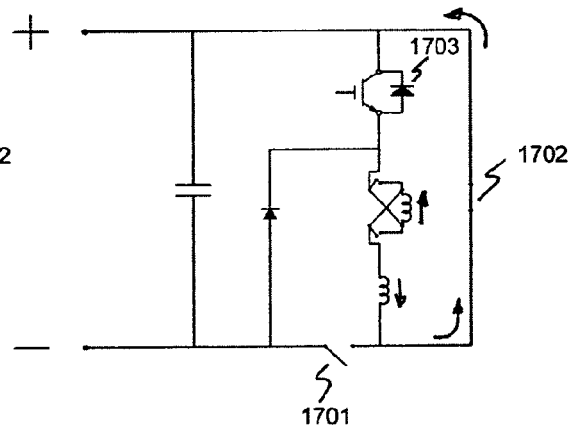
Figure 17B:
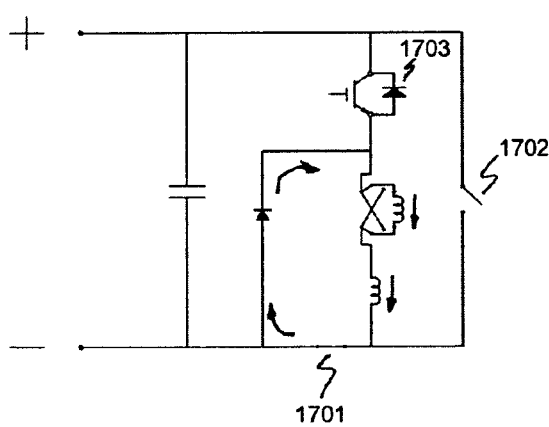
Figure 17D:
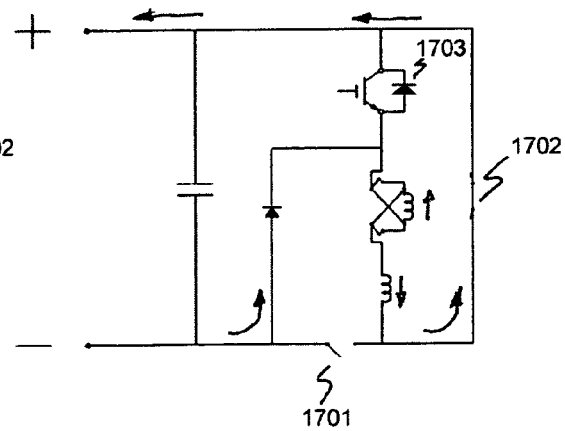

In regenerative braking mode, the motor emf becomes the driving voltage and, when the chopper IGBT is on, drives a current through the traction motor and its free-wheeling path as shown in FIG. 17*c*.

The braking mode, the motor volts can be expressed as:

$$V_{motor} = V_{emf} - IR_m - L_m di/dt$$

The impedance of the free-wheeling circuit shown in FIG. 17*c* is low and the current rises rapidly. When the current reaches a predetermined limit, the IGBT is switched off. Now, the current through the motor drops rapidly since the emf voltage is typically lower than the bus voltage opposing it. The motor voltage component due to the motor $L_m di/dt$ rises rapidly (di/dt is negative) until the motor voltage exceeds the bus voltage and current flows to the positive terminal of the bus transferring the inductive energy in the motor ($\frac{1}{2} L_m i^2$) to the bus and hence either into an energy storage unit or a dissipating resistance grid. When braking at high motor rpms, the emf is relatively high. When the controlling IGBT is switched off, the $L_m di/dt$ voltage component required to cause current flow to the positive terminal of the bus is relatively modest. As motor rpms decrease, the emf is reduced, and, when the controlling IGBT is switched off, the $L_m di/dt$ voltage component required to cause current flow to the positive terminal of the bus is increased. The importance of the motor $L_m di/dt$ voltage component in the braking mode cycle is that it is more than a switching transient. In braking mode, it is key to boosting the motor voltage to a level sufficient to cause current to flow to the positive terminal of the driving circuit. It allows energy from braking in this embodiment to be efficiently transferred to a DC bus and hence to an energy storage system or dissipating resistance grid. This circuit is effective at all locomotive speeds where the emf is lower than the bus voltage.

Figure 18:
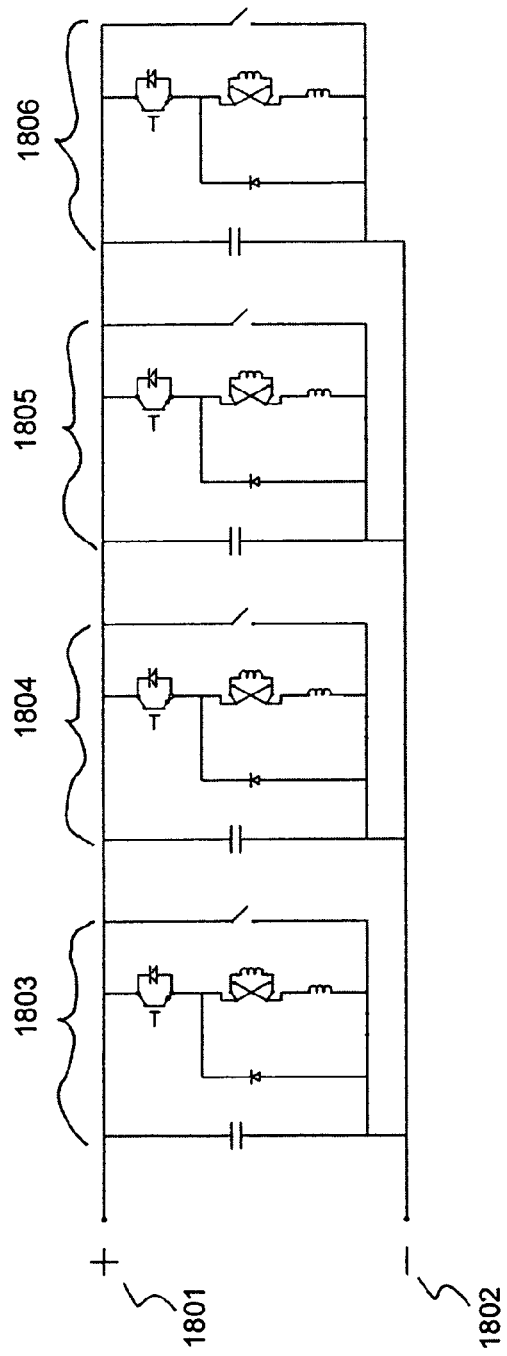
FIG. 18 illustrates 4 traction motors utilizing the circuit shown in FIG. 16 where the 4 circuits are connected in parallel.
Figure 18:
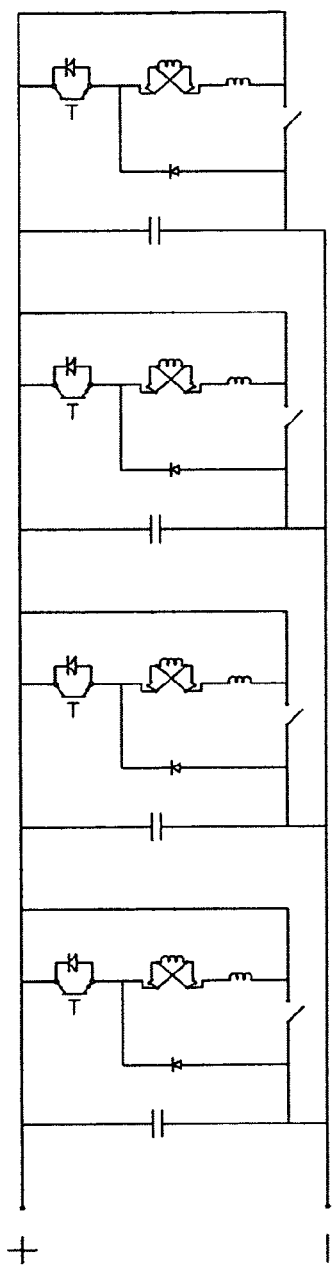

FIG. 18 illustrates 4 traction motor circuits, each the same as shown in FIG. 16. All 4 traction motor circuits are connected in parallel to a positive terminal 1801 and a negative terminal 1802. The traction motor circuits 1803, 1804, 1805 and 1806 are each comprised of a chopper circuit described in FIG. 16. Each circuit operates in the modes for motoring (FIG. 18*a*) and braking (FIG. 18*b*) as described in FIG. 17. As applied to charging an energy storage device such as a battery pack or capacitor bank, the regenerative braking method described in the above circuits is preferably implemented by prescribing time-sequenced power pulses from individual chopper/DC traction motor circuits.

A preferred method of controlling power from each individual motor circuit while in braking mode where the motors are now acting as generators consists of the following steps:
a. determining the current level in each regeneration circuit while the circuit is in free-wheeling mode;
b. ensuring that the current level does not exceed a first predetermined level;
c. when the current reaches a second predetermined level no greater than the first predetermined level, switching the circuit from free-wheeling mode to provide power flow from the motor/generator circuit to an energy storage device and/or power dissipating circuit;
d. when the current reaches a third predetermined level which is substantially lower than the second predetermined level, switching the motor/generator circuit back to free-wheeling mode;
e. determining the power capacity of the energy storage device and/or power dissipating circuit at each of a number of successive time intervals;
f. determining the necessary effective power pulse width to achieve the desired power flow from each motor so as to control the power flow apportioned the energy storage device and power dissipating circuit;
g. sequentially pulsing power from each motor to the energy storage device and/or power dissipating circuit for a duration necessary to achieve the above power flow to each at the above successive time intervals.

Power pulses from each motor are increased by increasing pulse width while maintaining pulse frequency constant. Power delivered to the battery is therefore input at different times from different motors by starting the power pulses from each motor at an offset from the power pulses of neighboring motors, which are acting as generators. The offsets of power pulses from each motor are preferably the maximum possible. This spacing of the power pulses results in individual instantaneous current inputs to the energy storage device that are not additive. In the case of a battery pack, especially a lead-acid battery pack, this leveling out of recharge power pulses results in significantly better charging practice and allows more energy to be returned to the battery without exceeding a desired recharge voltage of the battery pack. This non-additive approach results in lower battery internal heating ($I^2R$) which results in longer battery life and less frequent battery failure and maintenance.

Figure 19:
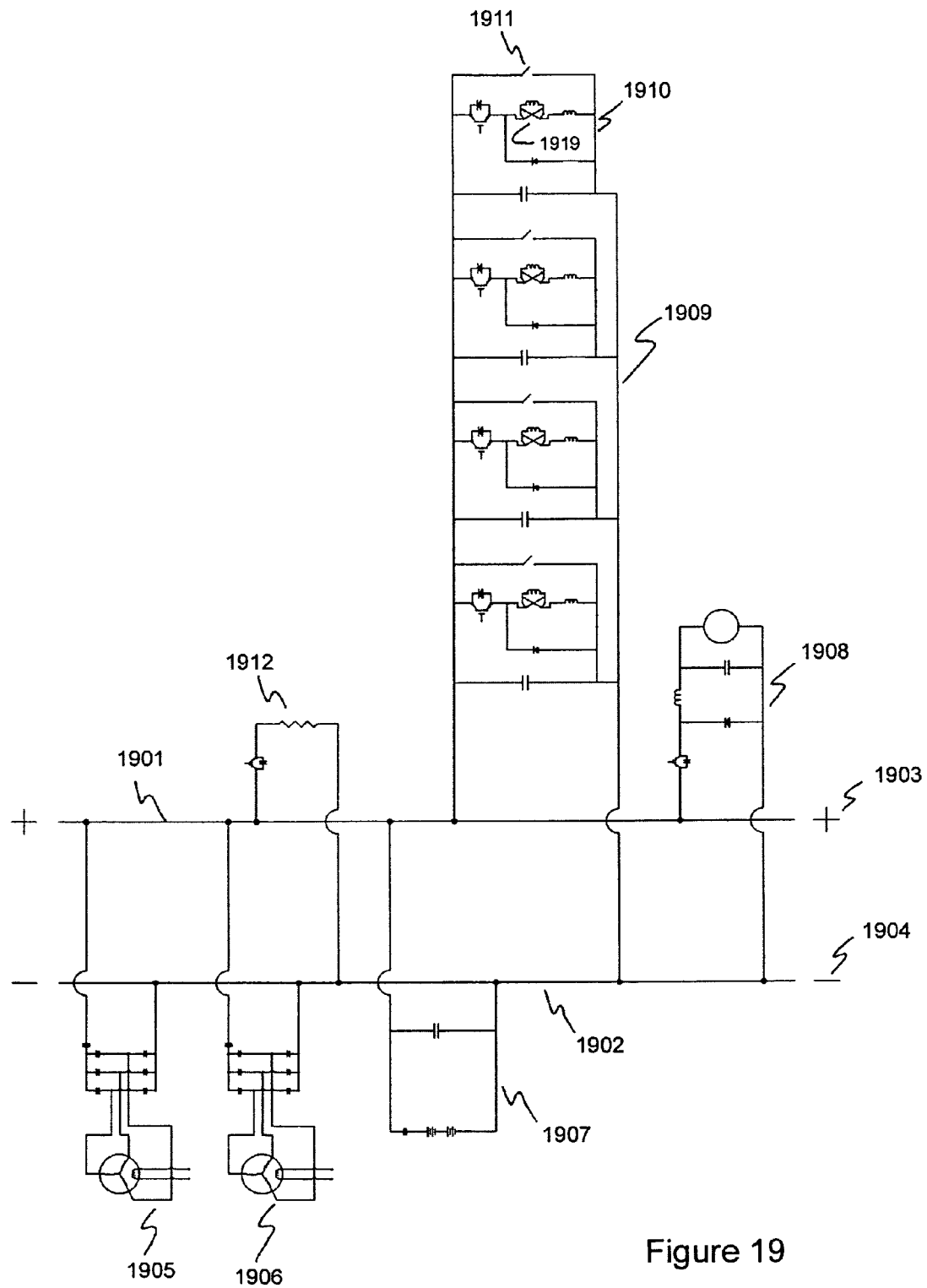
FIG. 19 illustrates a preferred embodiment of the principal power circuit elements of a hybrid locomotive using a regenerative braking circuit in motoring mode.

FIG. 19 illustrates a simplified electrical architecture of principal power train elements of a typical hybrid locomotive using the regenerative braking circuit of FIG. 16 in motoring mode. The configuration of FIG. 19 illustrates two engines and an energy storage unit but, as can be appreciated, the locomotive can be comprised of one or more engines and one or more energy storage systems. The architecture is built around a DC bus comprised of a positive conductor 1901 at a positive voltage 1903 and a negative bus conductor 1902 at a negative voltage 1904. Two alternator/rectifier apparatuses 1905 and 1906, which may be power conversion apparatuses associated with diesel and/or gas turbine engines, for example, are shown attached to the DC bus along with a battery pack 1907. The battery pack is shown connected directly to the DC (in parallel with a capacitor for surge control). In this configuration, the DC bus voltage is principally controlled by the voltage output of the battery pack. The engines and battery pack may be used to provide power to a number of DC traction motors and auxiliary power supplies.

FIG. 19 shows an auxiliary power circuit 1908 and four DC traction motor circuits 1909 with dynamic and regenerative braking capability. In motoring mode, the traction motor switches 1911 are always open and switches 1910 are always closed. In motoring mode, power flows from the generators and/or the battery to the traction motors and to the auxiliary power unit. It is also possible in motoring mode for the generator to provide power for charging the battery pack. A dissipating resistance grid 1912 that is part of a dynamic braking system is also shown.

Figure 20:
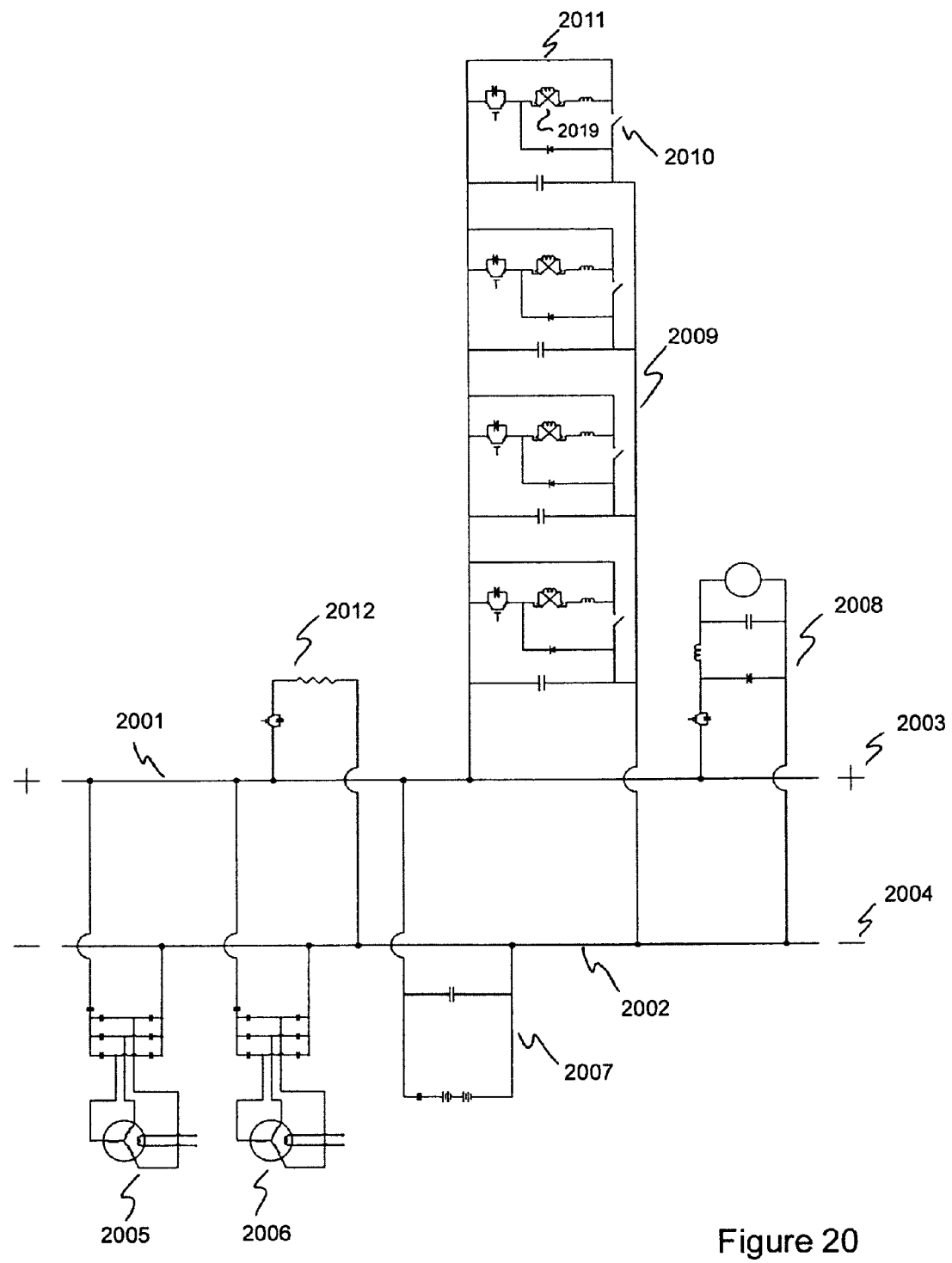
FIG. 20 illustrates a preferred embodiment of the principal power circuit elements of a hybrid locomotive using a regenerative braking circuit in braking mode.

FIG. 20 illustrates a simplified electrical architecture of principal power train elements of a hybrid locomotive using the regenerative braking circuit of FIG. 16 in braking mode. The architecture is built around a DC bus comprised of a positive conductor 2001 at a positive voltage 2003 and a negative bus conductor 2002 at a negative voltage 2004. Two alternator/rectifier apparatuses 2005 and 2006 are shown attached to the DC bus along with a battery pack 2007. The battery pack is shown connected directly to the DC and can allow power flow to the DC bus or receive charging power from the DC bus. FIG. 20 shows an auxiliary power circuit 2008 and four DC traction motor circuits 2009 with dynamic and regenerative braking capability. In braking mode, the traction motor switches 2011 are always closed and switches 2010 are always open. In braking mode, the DC motors, now acting as generators, may provide power for charging the battery pack. As shown in this example, blocking diodes in the alternator/rectifiers prevent power flow back to the engines during braking. If the DC motors now acting as generators provide braking energy at too high a power level to be accommodated by the energy storage battery pack, excess braking energy may be switched to a dissipating resistance grid 2012 so that dynamic braking may continue.

An important feature of the architecture described in FIGS. 19 and 20 is the use of a DC electrical bus whose predetermined bus voltage level controls the amount of power flow from the various prime mover and/or energy storage power supplies to the motors and from the dynamic and/or regenerative braking circuits to the energy storage devices and/or power dissipating circuits. In addition, the power flow to or from the DC bus by the motor circuits may be controlled independently of the DC bus voltage by one or more power control units between the bus and the motors. In motoring mode, the output voltage level of the bus is controlled by the power source or power sources that generate the highest DC voltage. Each power supply has its own well-known means of regulating its output voltage so that each can be controlled by well known means to provide an output voltage that allows it to be engaged or disengaged at will from the power flow to the DC bus. In the configuration shown in FIGS. 19 and 20, the energy storage system is connected directly to the DC bus. In this case, the bus voltage is controlled primarily by the output voltage across the battery pack. For a hybrid system with a large energy storage system, this is a preferred configuration. The power flow from the DC bus to the motors driving the wheels is regulated by independent control of the voltage supplied to the motors using for example inverters or choppers. This architecture therefore does not require synchronization of power supplies nor are the power supplies used to regulate the power required by the wheel driving motors. This architecture therefore permits the use of various numbers and types of power supplies (both prime power and energy storage apparatuses) to be used in conjunction with various types of motors and drive train configurations without special modification to the power supplies, the drive motors or the control circuitry.

By using the same voltage control principal in braking mode, the flow of power from the motor/generator circuits to the energy storage devices and/or dissipating dynamic braking resistance grids can be controlled. For example, power will only flow from the motor/generator circuits to the DC bus when the motor/generator circuit voltages exceed the bus voltage which will tend to be stable at or near the battery pack voltage when a battery pack is used as the he energy storage device. When the amount of power from the motor/generator circuit is too large to be absorbed by the energy storage device (such as determined by the SOC level, current flow or voltage level of a battery pack), the switch to the dissipating resistance grid can be opened (for example when a predetermined DC bus voltage is exceeded or when a predetermined battery pack SOC and/or current level is exceeded) and the excess power will be dissipated in the resistance grid.

In U.S. Pat. No. 6,812,656 "Sequenced Pulse Width Modulation Method and Apparatus for Controlling and Powering a Plurality of Direct Current Motors", the time sequencing of power pulses to individual traction motors during motoring is disclosed. This time sequencing minimizes the current draw on the energy storage system over a significant portion of the operating range since instantaneous current requirements from individual motors are not additive. This independence of individual current requirements can have the positive effect of reducing the internal resistive losses sustained in the energy storage unit and reducing the size of the filtering apparatus associated with the energy storage system. In braking mode as shown for example in FIG. 20, this same time sequencing principle can be applied in reverse to provide the same benefits. A pulse sequencer is provided to pulse electrical energy generated by one or more traction motors during braking to the energy storage system. Providing generated electrical energy discontinuously, rather than continuously, to the energy storage system can provide substantial benefits, including more optimal battery charging, longer battery life, and smaller filtering apparatuses. The pulse sequencer typically includes an intelligent or unintelligent control architecture to control the delivery of pulses from one traction motor or sets of traction motors to the DC bus. Pulse sequencing may be performed by pulsing generated electrical energy at timed intervals from a motor or a selected set of traction motors without regard to other parameters. Pulse sequencing may also be performed in response to measurement parameters, such as the state of charge of the energy storage system, the magnitude and/or length of the pulse, the DC bus voltage, a voltage associated with the energy storage system, an output voltage of the traction motor(s) and the speed of the locomotive at a selected point in time. In a preferred mode of pulse sequencing, pulses are generated from different motors during discrete (nonoverlapping) time periods. In other words, during a selected first time period (which is a subset of a time interval) a first electrical pulse is generated from a first traction motor but not from a second (different) traction motor, and, during a selected second time period, a second electrical pulse is generated from a second traction motor and not from the first traction motor. Thus, during the selected first time period the first traction motor is in a generating mode while the second traction motor is in a free-wheeling energy accumulation mode and during the selected second time period the first traction motor is in a free-wheeling mode energy accumulation while the second traction motor is in a generating mode.

Figure 21:
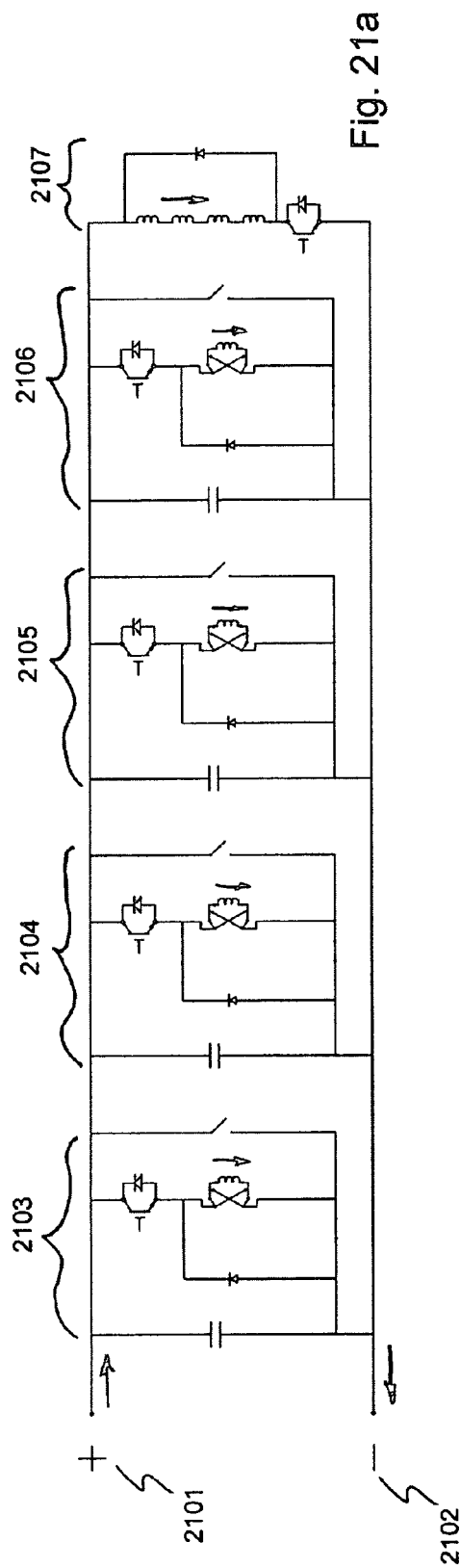
FIG. 21 illustrates 4 traction motors utilizing an alternate circuit for the field coils.
Figure 21:
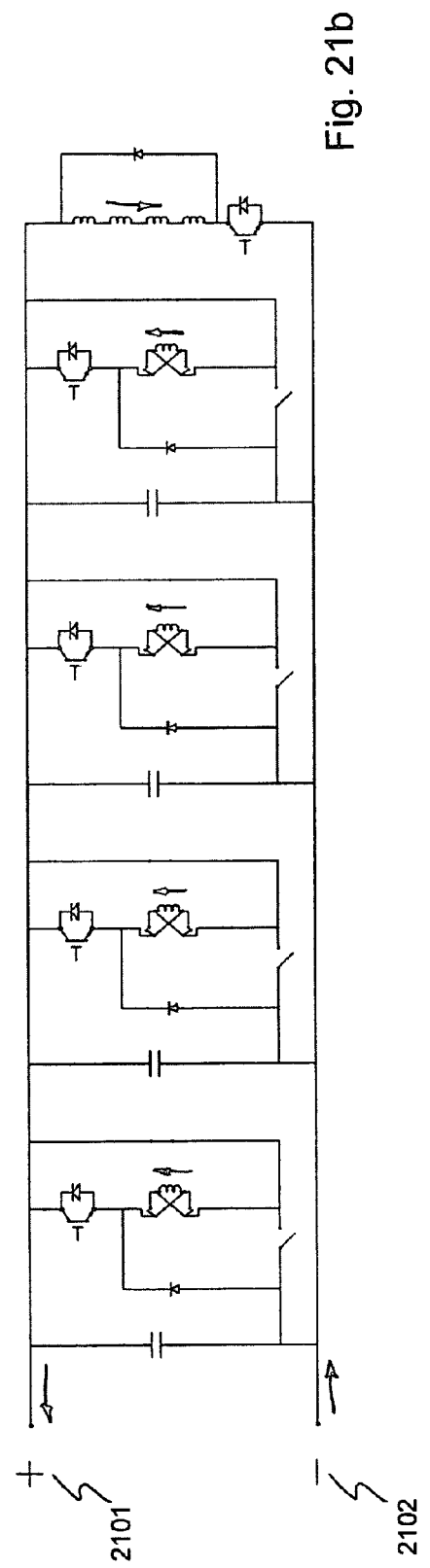

FIG. 21 illustrates and alternate version of 4 traction motor circuits with a separate circuit for the 4 field coils of the 4 traction motors. All 4 traction motor circuits are connected in parallel to a positive terminal 2101 and a negative terminal 2102. The traction motor circuits 2103, 2104, 2105 and 2106 are each comprised of a chopper circuit described in FIG. 20 but without the field coils. Each circuit operates in the modes for motoring and braking (generating). In either case the current direction through the separate field coil circuit 2107 is the same. This alternate embodiment of the circuit shown in FIG. 21 has all the advantages as described for the circuit in FIG. 19. One advantage of separately excited field coils is that the emf can be more readily controlled during both motoring and braking modes.

An important variant of the circuit shown in FIG. 21 is to eliminate the individual reversers on each armature in the traction motor circuits and add a single reverser switch across all the field coils in the separate field coil circuit.

Figure 22:
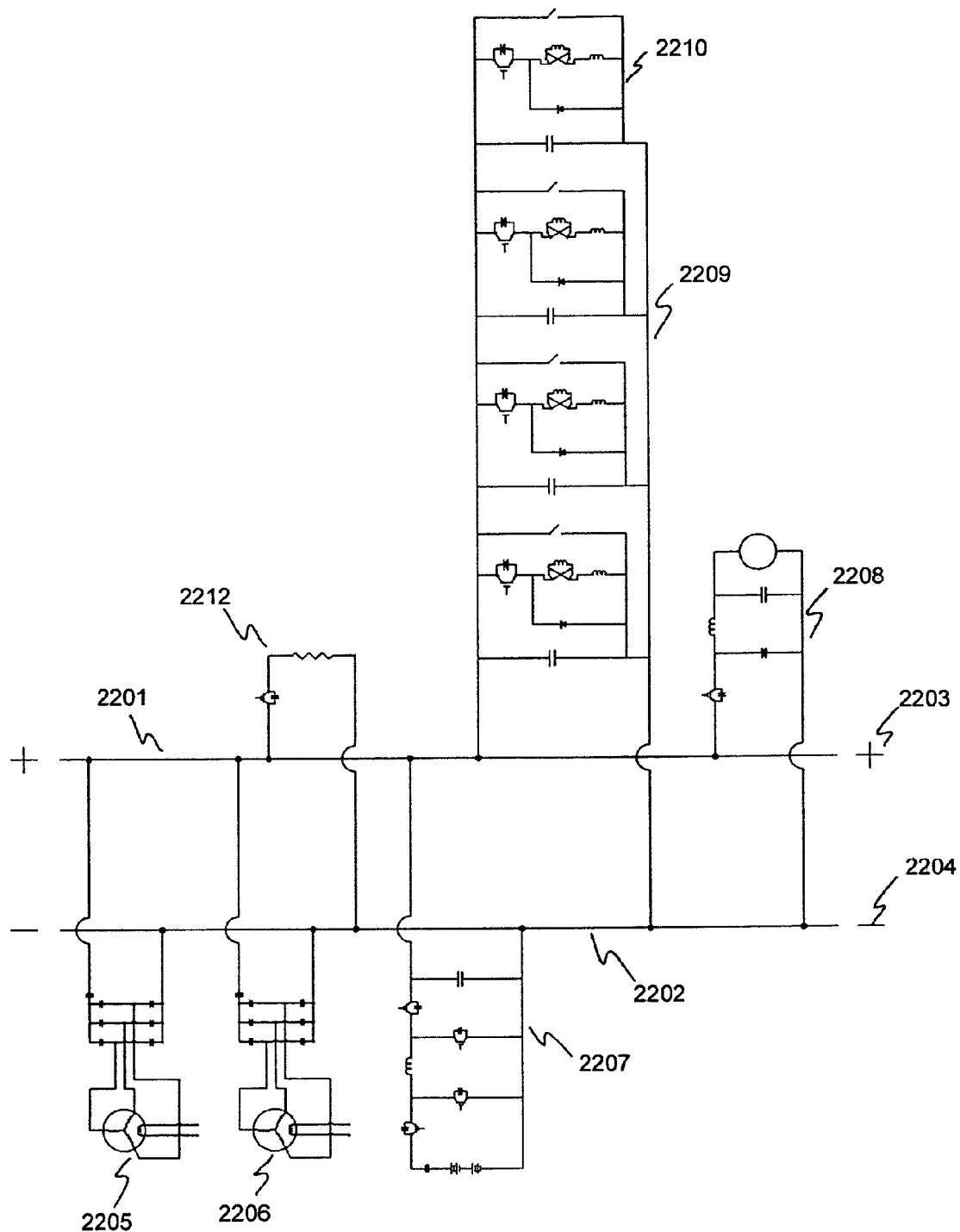
FIG. 22 illustrates an alternate embodiment of the principal power circuit elements of a hybrid locomotive using a regenerative braking circuit in motoring mode.

FIG. 22 illustrates an alternate electrical architecture of principal power train elements of a hybrid locomotive using the regenerative braking circuit of FIG. 16 in motoring mode. The battery pack 2007 is shown connected to the bus using a buck/boost circuit that will allow full control over power flow to the DC bus or charging power from the DC bus. While this configuration is more complex than that shown in FIG. 19, it can be utilized if it is important to maintain the DC bus voltage at a predetermined level.

FIG. 23 illustrates the four modes of operation of an alternate configuration of circuits shown in FIG. 17. In this configuration, the switches shown in FIG. 17 are replaced by IGBTs, otherwise the operation of the circuits is the same as described for the 4 modes described in FIG. 17. FIG. 23*a* illustrates motoring mode with IGBT 2301 always off and IGBT 2302 intermittently on. Current flows from the positive terminal of a DC bus (which carries power to an energy storage system such as a battery pack, or a dissipating resistance grid) through the armature coil and field coil of a motor, returning to the negative terminal of the DC bus as indicated by the current flow arrows. FIG. 23*b* illustrates motoring mode with IGBT 2301 always off and IGBT 2302 always off. Current continues to flow through the armature coil and field coil of the motor, free wheeling through the bypass diode of IGBT 2301 as indicated by the current flow arrows. FIG. 23*c* illustrates braking (generating) mode with IGBT 2301 always off and IGBT 2302 intermittently on. Current flows from the negative terminal of the DC bus through the armature coil and reversed field coil, returning to the positive terminal of the DC bus as indicated by the current flow arrows. FIG. 23*d* illustrates braking mode with IGBT 2301 always on and IGBT 2302 always off. Current continues to flow through the armature coil and reversed field coil, free wheeling through IGBT 2301 as indicated by the current flow arrows. As can be seen, if the positive and negative terminals of the circuit are connected to an energy storage battery via a DC bus, the battery pack will be charged when the voltage across the positive and negative terminals is greater than the voltage across the battery pack terminals. When dynamic braking is applied at any speed, IGBT 2301 in FIGS. 23*c* and 23*d* is controlled to ensure that sufficient current is developed in the motor windings before switching the stored energy in the windings to a battery pack, another energy storage unit or a dissipating resistance grid. Especially when dynamic braking is applied at high speeds, IGBT 2301 in FIGS. 23*c* and 23*d* is controlled to ensure that the current in the motor windings does not increase beyond a predetermined level.

In various embodiments of the present invention, at least one of five methods is used for controlling voltage levels while charging an energy storage system during regenerative braking over different locomotive speed ranges. These are:
1. Switching traction motors between parallel and series configurations to maintain sufficiently high voltage to increase the voltage on a DC bus to charge an energy storage system and/or dissipate energy in an energy dissipating system;
2. Boosting the output voltage of the motor circuit when the motors are acting as generators to maintain sufficiently high voltage on a DC bus to charge an energy storage system and/or dissipate energy in an energy dissipating system;
3. Switching battery modules between series and parallel configurations to maintain an energy storage and/or energy dissipating system at a lower voltage level than the voltage on a DC bus;
4. Boosting the input voltage from a DC bus to an energy storage system and/or energy dissipating system to provide a sufficiently high voltage to charge the energy storage system and/or dissipate energy in the energy dissipating system; and
5. Temporarily storing inductive energy in the traction motors until voltage levels are sufficiently high enough to charge an energy storage system and/or dissipate energy in an energy dissipating system.

In all these methods, the voltage, current and power from the motors during braking is controlled so that the energy storage system and energy dissipation system is operated in a manner consistent with good management. In general, either the output voltage of the motor circuit can be increased to raise the voltage level of the DC bus; or the input to the energy storage or energy dissipating system can be increased over the voltage level of the DC bus so that energy from braking will flow from the motor circuit via the DC bus to the energy storage and/or energy dissipating system.

Figure 24:
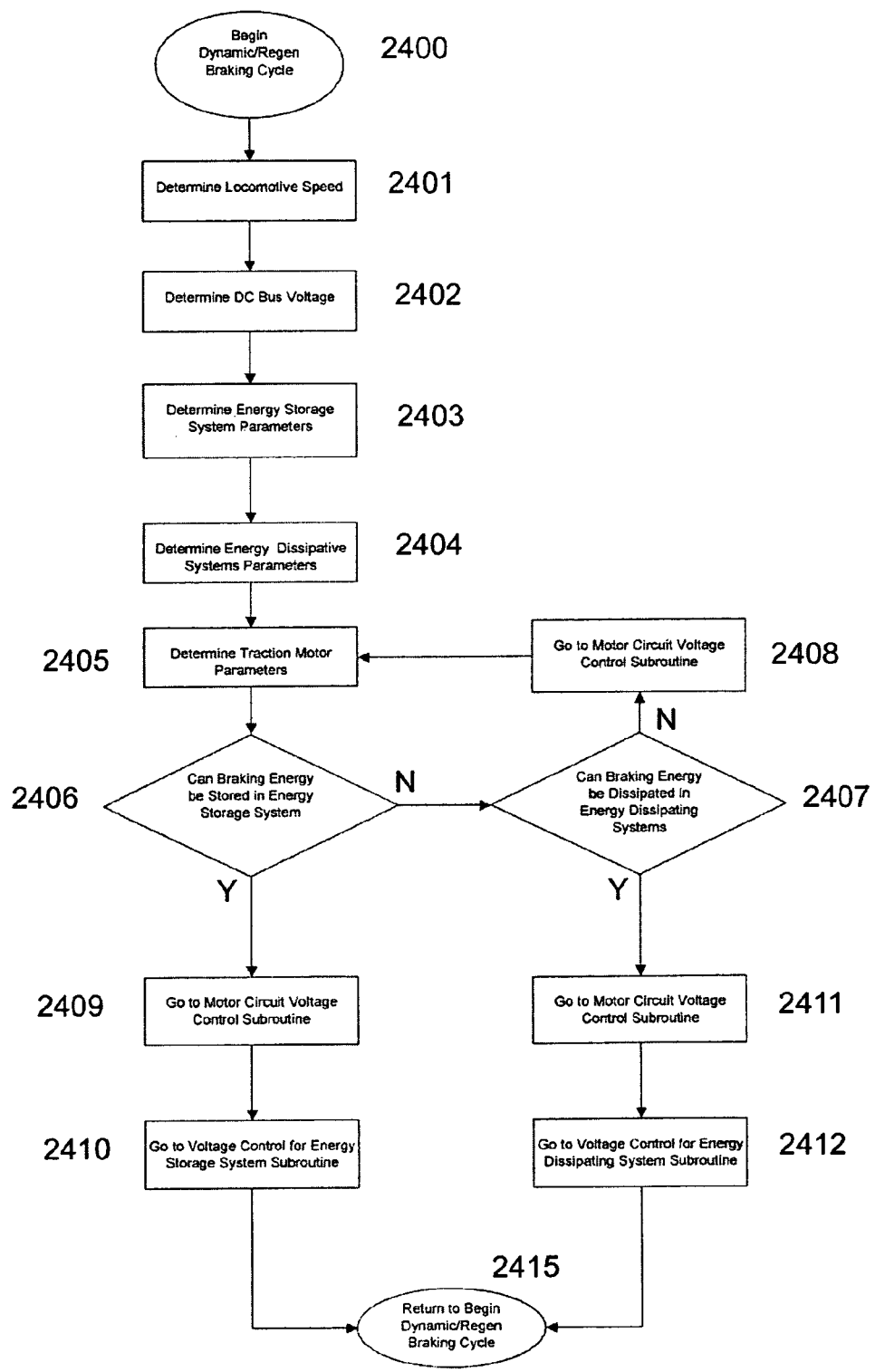
FIG. 24 is a flow chart illustrating a general control strategy for regenerative braking.

A general control strategy for regenerative braking is illustrated in the flow chart of FIG. 24. The cycle of decisions can be executed continuously (for example every millisecond) or intermittently (for example every 1 second) or at intervals in between by a predetermined computer program or by a computer program that adapts, such as for example, a program based on neural network principles. The following is an example of an automated computer-controlled dynamic and regenerative braking cycle. As can be appreciated, many of the steps can be carried out in different sequences and some of the steps may be optional. As shown in the example of FIG. 24, an automated cycle begins 2400. The first step 2401 is to determine the locomotive speed. The second step 2402 is to determine the DC bus voltage. The third step 2403 is to determine the energy storage system parameters. In the case of a battery pack, these may include the open circuit voltage, output voltage and current as well as the state-of-charge ("SOC") of the battery pack. The fourth step 2404 is to determine the energy dissipating system parameters. In the case of a resistive grid, this may be the operating temperature of the grid network. The fifth step 2405 is to determine the individual traction motor parameters. These may include motor voltage, current, motor back emf and operating temperature. The next step 2406 is to determine from the information obtained in steps 2401 through 2405 whether the energy storage system can absorb additional energy from the braking system, typically by determining whether the SOC of the energy storage system is below a first predetermined level and/or whether the open circuit voltage of the energy storage system is above a second a predetermined level. If the energy storage system cannot absorb additional energy, then the next step 2407 is to determine from the information available whether the energy dissipating system can absorb the energy from the braking system, typically by determining whether the temperature of the grid network is below a third predetermined level. If the energy dissipating system cannot absorb additional energy, then the next step 2408 is to access the traction motor circuit control system subroutine to reduce the total power generated by the motors during braking. If the energy storage system can absorb additional energy, then the next step 2409 is to access the traction motor circuit control system subroutine to optimize the voltage generated by the motors during braking and then to the next step 2410, to access the energy storage system voltage control system subroutine to optimize the current and voltage to the energy storage system. Thereupon, the final step 2415 is to return to the beginning of the automated cycle 2400. If the energy storage system cannot absorb additional energy but the energy dissipating system can absorb additional energy, then the next step 2411 is to access the traction motor circuit control system subroutine to optimize the voltage generated by the motors during braking and then to the next step 2412 to access the energy dissipating system voltage control system subroutine to optimize the current and voltage to the energy dissipating system. Thereupon, the final step 2415 is to return to the beginning of the automated cycle 2400. As can be appreciated, the control routine can contain logic to apportion braking energy between the energy storage and energy dissipating systems.

Figure 25:
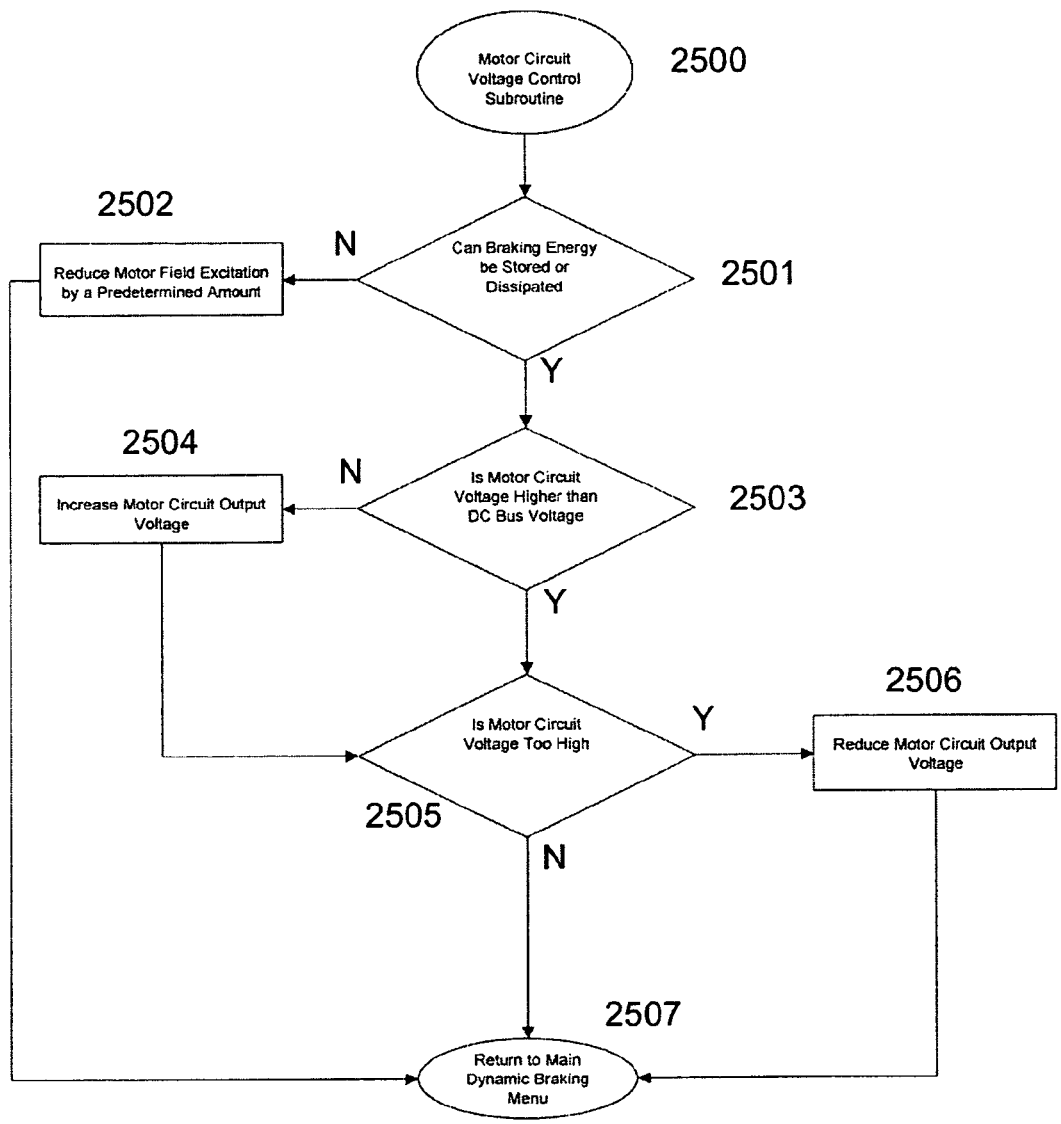
FIG. 25 is a flow chart illustrating control procedures for traction motors.

FIG. 25 is a flow chart illustrating a subroutine for control procedures for traction motors during braking. The subroutine starts 2500 and the first step 2501 is to determine if energy from braking can be stored or dissipated. If energy cannot be stored or dissipated, then step 2502 reduces the output voltage from the traction motor circuit by decreasing the excitation current to all of the traction motors so that less power is generated by the dynamic braking system. This may be done in predetermined increments until the power generated can be absorbed by the energy storage and/or energy dissipating systems. After this step, the subroutine returns 2507 to the main flow chart of FIG. 24. If energy can be stored or dissipated, then step 2503 checks to ensure that the motor circuit voltage controls the voltage on the DC bus. If the motor circuit output voltage is not high enough, then the motor voltage is increased, depending on the specific methods available. Typically, the voltage may be increased by increasing the excitation current to all of the traction motors. If this is not sufficient, then the output voltage may be increased by switching traction motors from parallel to series configuration, if this method is available. Alternately, the output voltage may be increased by boosting the output voltage of the motor circuit, if this method is available. Once output voltage is increased, step 2505 checks to ensure that the output voltage is not too high. If it is, then motor circuit output voltage is reduced typically by decreasing the excitation current to all of the traction motors. This may be done in predetermined increments until the voltage is within an acceptable predetermined operating range. After this step, the subroutine returns 2507 to the main flow chart of FIG. 24.

Figure 26:
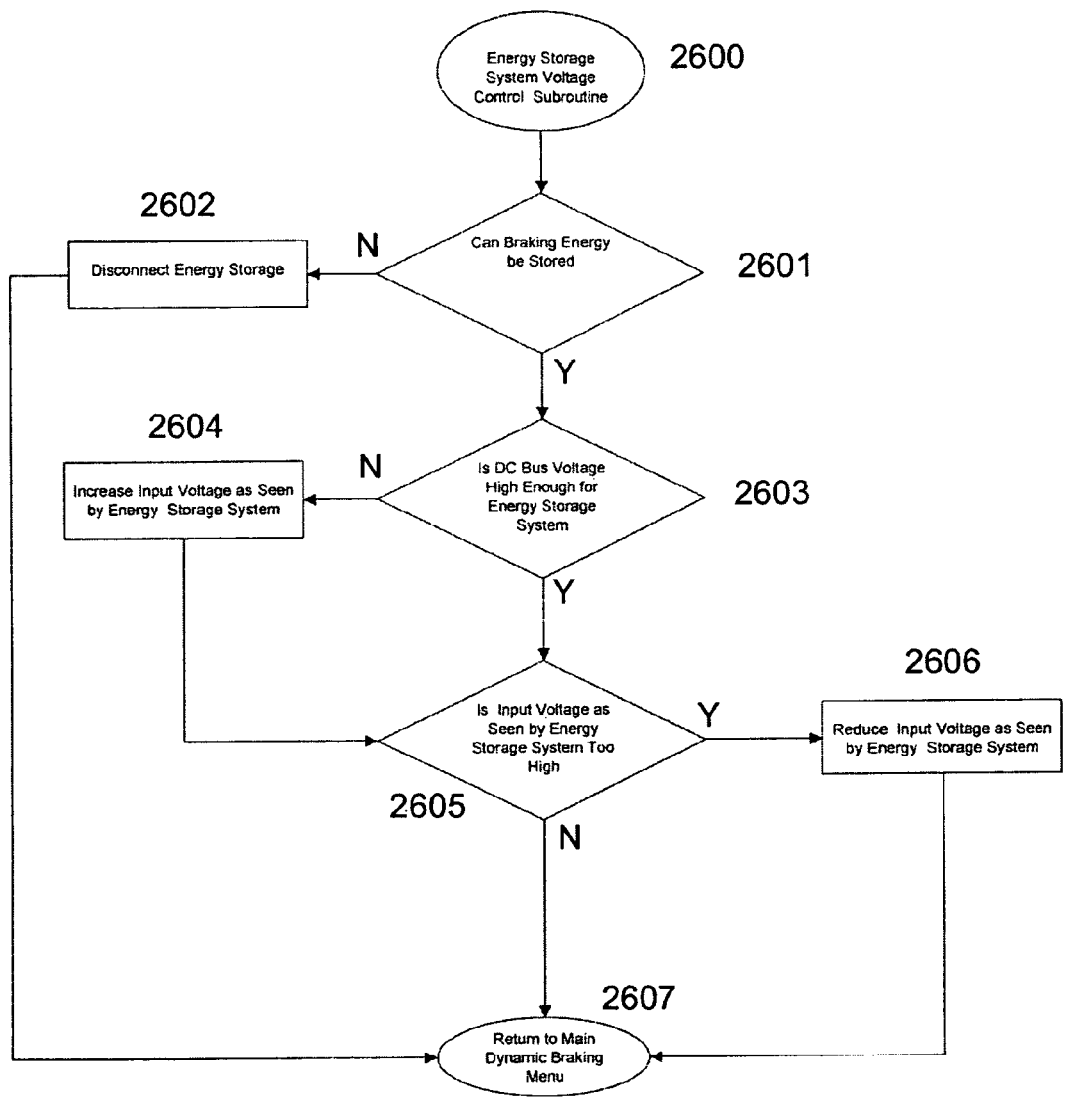
FIG. 26 is a flow chart illustrating control procedures for an energy storage system.

FIG. 26 is a flow chart illustrating a subroutine for control procedures for an energy storage system during braking. The subroutine starts 2600 and the first step 2601 is to determine if energy from braking can be stored. If energy cannot be stored, then step 2602 disconnects the energy storage system from the DC bus. After this step, the subroutine returns 2607 to the main flow chart of FIG. 24. If energy can be stored, then step 2603 checks to ensure that the DC bus voltage is high enough to charge the energy storage system. If the DC bus voltage is not high enough, then the voltage input to the energy storage system is increased so that power flows into the energy storage system, depending on the specific methods available. In one method, the voltage may be increased by switching energy storage modules from series to parallel, if this method is available. Alternately, the input voltage may be increased by increasing the input voltage across the energy storage system by a boost circuit, if this method is available. Once input voltage is increased, step 2605 checks to ensure that the input voltage is not too high. If it is, then energy storage system input voltage is increased typically by increasing the amount of voltage increase by the boost circuit. After this step, the subroutine returns 2607 to the main flow chart of FIG. 24.

Figure 27:
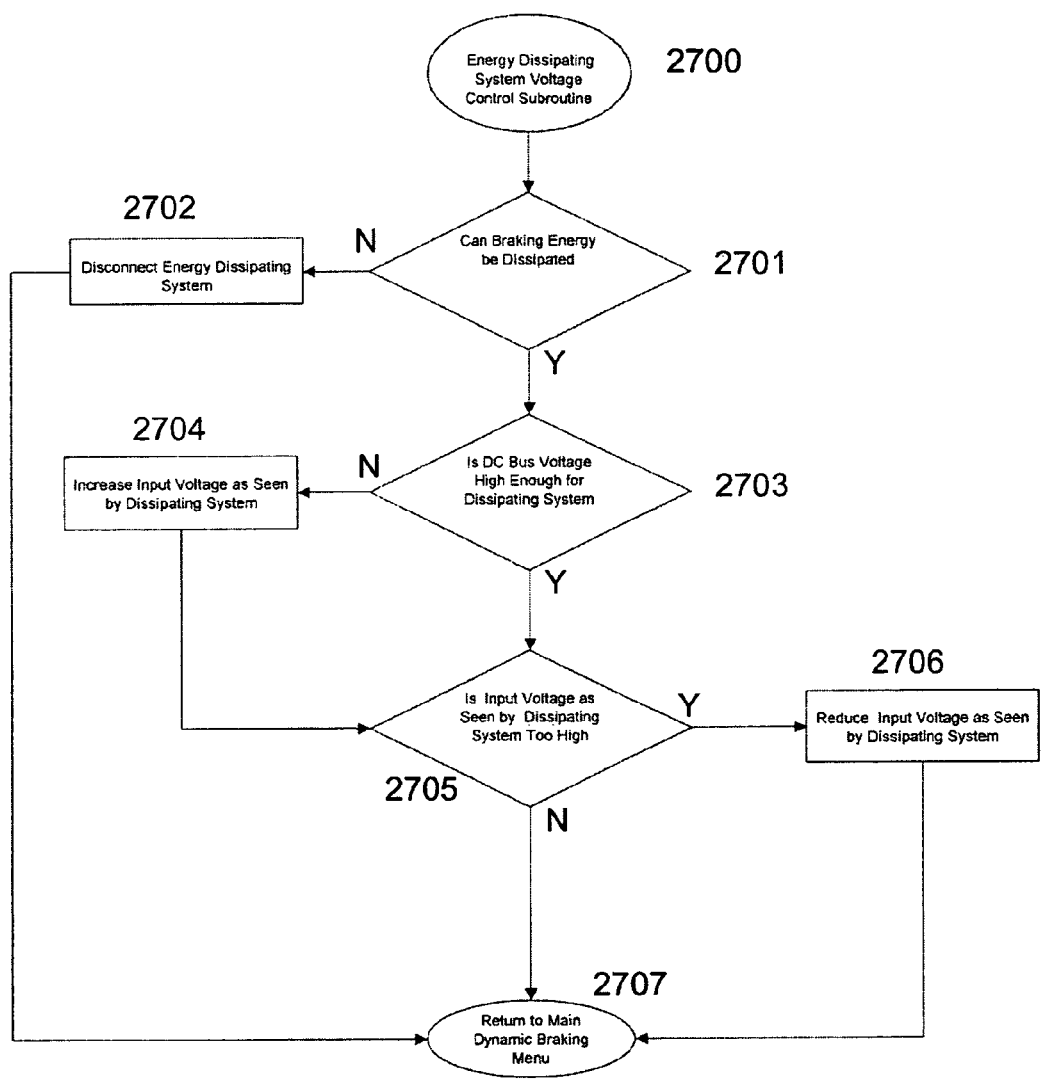
FIG. 27 is a flow chart illustrating control procedures for an energy dissipating system.

FIG. 27 is a flow chart illustrating a subroutine for control procedures for an energy dissipating system during braking. The subroutine starts 2700 and the first step 2701 is to determine if energy from braking can be dissipated. If energy cannot be dissipated, then step 2702 disconnects the energy dissipating system from the DC bus. After this step, the subroutine returns 2707 to the main flow chart of FIG. 24. If energy can be dissipated, then step 2703 checks to ensure that the DC bus voltage is high enough to deliver energy to the dissipating system. If the DC bus voltage is not high enough, then the voltage input to the energy dissipating system is increased so that power flows into the energy dissipating system. Typically, the input voltage may be increased by increasing the input voltage across the energy dissipating system by a boost circuit, if this method is available. Once input voltage is increased, step 2705 checks to ensure that the input voltage is not too high. If it is, then energy dissipating system input voltage is reduced typically by decreasing the amount of voltage increase by the boost circuit. After this step, the subroutine returns 2707 to the main flow chart of FIG. 24.

The present invention, in various embodiments, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, includes providing devices and processes in the absence of items not depicted and/or described herein or in various embodiments hereof, including in the absence of such items as may have been used in previous devices or processes, e.g., for improving performance, achieving ease and\or reducing cost of implementation.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments for the purpose of streamlining the disclosure. This method of disclosure is not to be interpreted as reflecting an intention that the claimed invention requires more features than are expressly recited in each claim. Rather, as the following claims reflect, inventive aspects lie in less than all features of a single foregoing disclosed embodiment. Thus, the following claims are hereby incorporated into this Detailed Description, with each claim standing on its own as a separate preferred embodiment of the invention.

Moreover, though the description of the invention has included description of one or more embodiments and certain variations and modifications, other variations and modifications are within the scope of the invention, e.g., as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. An off road vehicle, comprising:
    (a) at least one motor operable to displace the off road vehicle and generate electrical energy when the vehicle is decelerating;
    (b) an energy storage system operable to store electrical energy and provide electrical energy to the at least one motor;
    (c) a prime power source operable to provide electrical energy to at least one of the energy storage system and at least one motor;
    (d) a direct current (DC) bus interconnecting the at least one motor, energy storage system, and prime power source; and
    (e) a pulse sequencer operable to provide, to the energy storage system, pulsed electrical energy generated by a selected motor;
    wherein the at least one motor is configured, in a braking mode, to alternately store electrical energy in and discharge energy from a winding of the at least one motor, wherein electrical energy generated by first and second motors is pulsed to provide first and second sets of pulses, respectively, and wherein the first and second sets of pulses are temporally offset from one another.

2. The off road vehicle of claim 1, wherein the winding comprises a field coil and an armature coil, the field and armature coils being connected in series, and wherein the at least one motor comprises a switchable contact reverser operable to switch electrical energy in opposite directions of flow through the one of the armature and field coils while maintaining a same flow direction in the other of the armature and field coils.

3. The off road vehicle of claim 2, further comprising a power control apparatus, the power control apparatus controlling electrical energy in the at least one motor, wherein, in a motoring mode, electrical energy flows in a first direction through at least one of the armature and field coils, wherein, in a braking mode, electrical energy flows in a second opposite direction through the at least one of the armature and field coils, and wherein, in a first braking mode configuration, electrical energy flows through a free wheeling path and is substantially blocked from flowing to the energy storage system and, in a second braking mode configuration, electrical energy flows is permitted to flow to the energy storage system.

4. The off road vehicle of claim 2, wherein, in the motoring mode, a voltage of the at least one motor is provided by the equation:

$$V_{motor} = V_{emf} + IR_m + L_m di/dt$$

where:
$V_{emf}$ is a back emf across the reverser;
I is the electrical energy flowing through the at least one motor;
$R_m$ is the total internal resistance of the at least one motor; and
$L_m$ is the total inductance of the at least one motor.

5. The off road vehicle of claim 4, wherein, in the braking mode, a voltage of the at least one motor is provided by the equation:

$$V_{motor} = V_{emf} - IR_m - L_m di/dt.$$

6. The off road vehicle of claim 1, wherein the winding comprises a field coil and an armature coil and further comprising:

an auxiliary power supply providing, in the braking mode, a field current to the field coil of the at least one motor, wherein, in a motoring mode, electrical energy flows through the armature and field coils in a common direction, wherein, in the braking mode, electrical energy generated by the at least one motor flows through the armature and field coils in different directions, and wherein the field current is opposite to the direction of flow of the electrical energy generated by the at least one motor.

7. An off road vehicle, comprising:
    (a) a plurality of motors to displace the off road vehicle and generate electrical energy when the vehicle is decelerating, each of the plurality of motors having an armature and a field coil;
    (b) an energy storage system operable to store electrical energy and provide electrical energy to the at least one motor;
    (c) a prime power source operable to provide electrical energy to at least one of the energy storage system and at least one motor;
    (d) a direct current (DC) bus interconnecting the at least one motor, energy storage system, and prime power source; and
    (e) a plurality of power control apparatuses, (1) wherein the field coils of the motors are connected in series, (2) wherein the armature coils are connected in parallel to the field coils, (3) wherein a field coil power control apparatus varies a field current passing through series-connected field coils to control an armature current passing through the armature coils during vehicular deceleration and (4) wherein each of the armature coils are connected in series and each has a corresponding armature power control apparatus and the armature power control apparatuses are different from the field coil power control apparatus; and
    wherein at least one of the following is true:
        (I) in a motoring mode, the plurality of traction motors are connected in parallel relative to the DC bus and are at a lower voltage than the energy storage system and, in a braking mode, at least two of the traction motors are connected in series relative to the DC bus, whereby the motors have a higher voltage than a voltage of the energy storage system so that electrical energy provided by the series-connected motors is provided to the energy storage system;
        (ii) in a motoring mode, the traction motors are at a lower voltage than the energy storage system, and, in a braking mode, a traction motor boost circuit steps up an output voltage of at least one of the traction motors, whereby the stepped up output voltage is higher than the voltage of the energy storage system so that electrical energy provided by the motors is provided to the energy storage system;
        (iii) the energy storage system comprises a plurality of battery modules, wherein, in a motoring mode, the plurality of battery modules are connected in series and are at a higher voltage than the at least one motor, and, in a braking mode, at least two of the plurality of battery modules are connected in parallel, whereby the voltage of the parallel-connected battery modules is lower than an output voltage of the at least one motor; and
        (iv) an energy storage system boost circuit, positioned between the DC bus and the energy storage system, wherein, in a braking mode, the energy storage system boost circuit steps up an input voltage to the energy storage system, whereby the stepped up input voltage is higher than the voltage of the DC bus and the voltage of the energy storage system so that electrical energy provided by the motors is provided to the energy storage system.

8. The off road vehicle of claim 7, wherein (I) is true.

9. The off road vehicle of claim 8, wherein electrical energy flows through the field coils is in the same direction in both the motoring and braking modes, wherein at least one power control apparatus is interposed between the motors and the DC bus, and wherein the interposed power control apparatus maintains a charging current flow to the energy storage system below a first predetermined level, a voltage of the energy storage system below a second predetermined level, and a state of charge of the energy storage system below a third predetermined level.

10. The off road vehicle of claim 8, wherein a first pair of motors is connected in series, a second pair of motors is connected in series, and the first and second pairs of motors are connected in parallel.

11. The off road vehicle of claim 7, wherein (ii) is true.

12. The off road vehicle of claim 11, wherein the boost circuit comprises an energy storage inductor, an energy storage capacitor, a diode, and a switch, wherein the switch is connected in parallel with the energy storage inductor, and diode, and wherein the energy storage capacitor is connected in series with the energy storage inductor, diode, and switch.

13. The off road vehicle of claim 12, wherein, in a motoring mode, the switch is closed to bypass the diode and energy storage inductor and, in a braking mode, the switch is opened to direct electrical energy through the diode and energy storage inductor.

14. The off road vehicle of claim 7, wherein the field coil power control apparatus, in the braking mode, varies the flow of electrical energy through the field coils to vary a voltage associated with the motors and an amount of energy provided by the motors to the energy storage system.

15. The off road vehicle of claim 7, wherein (iii) is true.

16. The off road vehicle of claim 15, wherein, in the braking mode, a first set of battery modules are series connected and a second set of battery modules are parallel connected.

17. The off road vehicle of claim 16, wherein the first set of battery modules comprises first and second series connected battery modules and third and fourth series connected battery modules and wherein the second set of battery modules comprises the first and second series connected battery modules connected in parallel with the third and fourth series connected battery modules.

18. The off road vehicle of claim 7, wherein (iv) is true.

19. A method for operating an off road vehicle, the off road vehicle including a plurality of traction motors to displace the off road vehicle and generate electrical energy when the vehicle is decelerating, an energy storage system to store electrical energy and provide electrical energy to the motors, a prime power source to provide electrical energy to at least one of the energy storage system and at least one motor, and a direct current (DC) bus interconnecting the at least one motor, energy storage system, and prime power source, the method comprising:
    (a) decelerating the vehicle; and
    (b) while the vehicle is decelerating, the energy storage system receiving, in discrete time intervals, electrical energy generated by a selected motor;
    wherein at least one motor is configured, in a braking mode, to alternately store electrical energy in and discharge energy from a winding of the at least one motor, whereby electrical energy provided by the motor is provided discontinuously to the energy storage system by the at least one motor.

20. The method of claim 19, wherein the winding comprises a field coil and an armature coil, the field and armature coils being connected in series, and wherein the at least one motor comprises a switchable contact reverser operable to switch electrical energy in opposite directions of flow through the one of the armature and field coils while maintaining a same flow direction in the other of the armature and field coils.

21. The method of claim 19, wherein electrical energy generated by first and second motors is pulsed to provide first and second sets of pulses, respectively, and wherein the first and second sets of pulses are temporally offset from one another.

22. The method of claim 19, further comprising a power control apparatus, the power control apparatus controlling electrical energy in the at least one motor, wherein, in a motoring mode, electrical energy flows in a first direction through at least one of the armature and field coils, wherein, in a braking mode, electrical energy flows in a second opposite direction through the at least one of the armature and field coils, and wherein, in a first braking mode configuration, electrical energy flows through a free wheeling path and is substantially blocked from flowing to the energy storage system and, in a second braking mode configuration, electrical energy flows is permitted to flow to the energy storage system.

23. The method of claim 22, further comprising:
when in the first braking configuration, determining a magnitude of the electrical energy flowing through the free wheeling path;
when the determined magnitude is at least a second predetermined level but is less than a first predetermined level, switching to the second decelerating configuration;
when the determined magnitude is no more than a third predetermined level, switching to the first braking configuration, wherein the first predetermined level is more than the second predetermined level and the second predetermined level is more than the third predetermined level.

24. The method of claim 23, wherein the at least one motor comprises a plurality of traction motors and further comprising:
determining a power capacity of the energy storage system at each of a number of successive time intervals;
determining an effective pulse width to achieve a desired energy flow from each motor to control the energy flow to the energy storage system; and
sequentially pulsing power from each motor to the energy storage system for a duration necessary to achieve a selected energy flow to the energy storage system during each of the successive time intervals.

25. The method of claim 24, wherein power pulses from each motor are increased by increasing pulse width while maintaining a pulse frequency substantially constant.

26. The method of claim 24, wherein first and second motors provide energy to the energy storage system at different times by starting a first power pulse from the first motor at an offset from a second temporally adjacent power pulse from the second motor.

27. The method of claim 26, wherein the first and second power pulses are nonoverlapping, whereby the first and second power pulses are not additive when inputted into the energy storage system.

28. The method of claim 23, wherein the at least one motor comprises a plurality of traction motors and further comprising:
determining a power capacity of the power dissipating circuit at each of a number of successive time intervals;
determining an effective pulse width to achieve a desired energy flow from each motor to control the energy flow to the power dissipating circuit; and
sequentially pulsing power from each motor to the power dissipating circuit for a duration necessary to achieve a selected energy flow to the power dissipating circuit during each of the successive time intervals.

29. The method of claim 19, wherein, in the motoring mode, a voltage of at least one motor is provided by the equation:

$$V_{motor} = V_{emf} + iR_m + L_m di/dt$$

where:
$V_{emf}$ is a back emf across the reverser;
i is the electrical energy flowing through the at least one motor;
$R_m$ is the total internal resistance of the at least one motor; and
$L_m$ is the total inductance of the at least one motor.

30. The method of claim 29, wherein, in the braking mode, a voltage of the at least one motor is provided by the equation:

$$V_{motor} = V_{emf} - IR_m - L_m di/dt.$$

31. A method, comprising:
(a) providing an off road vehicle comprising:
(i) a plurality of motors to displace the off road vehicle and generate electrical energy when the vehicle is decelerating, each of the plurality of motors having an armature and a field coil, the field coils of at least first and second motors being connected in series;
(ii) an energy storage system operable to store electrical energy and provide electrical energy to the at least one motor;
(iii) a prime power source operable to provide electrical energy to at least one of the energy storage system and at least one motor;
(iv) a direct current (DC) bus interconnecting the at least one motor, energy storage system, and prime power source; and
(v) a plurality of power control apparatuses; and
(b) when the vehicle is decelerating, varying a field current passing through series-connected field coils to control an armature current passing through the armature coils during vehicular deceleration;
wherein the field coils of the motors are connected in series, wherein the armature coils are connected in parallel to one another and to the field coils, and wherein a field coil power control apparatus varies the field current; and
wherein, in step (b), one or more the following steps is performed:
(i) switching at least two of the traction motors from parallel to series connection relative to the DC bus, whereby the series-connected motors have a higher voltage than a voltage of the energy storage system so that electrical energy provided by the series-connected motors is provided to the energy storage system;
(ii) stepping up an output voltage of at least one of the traction motors, whereby the stepped up output voltage is higher than the voltage of the energy storage system so that electrical energy provided by the series-connected motors is provided to the energy storage system;

(iii) switching at least two battery modules of the energy storage system from series to parallel connection, whereby the series connected battery modules are at a higher voltage than one or more of the motors and the parallel connected battery modules are at a lower voltage than one or more of the motors; and (iv) stepping up an input voltage from the DC bus to the energy storage system, whereby the stepped up input voltage is higher than the voltage of the DC bus and the voltage of the energy storage system so that electrical energy provided by the motors is provided to the energy storage system.

32. The method of claim 31, wherein step (1) is performed.

33. The method of claim 32, wherein each of the motors comprises a field coil and an armature coil, wherein the field coil of the series-connected motors are connected in series and armature coils are connected in parallel to one another and the series-connected field coils.

34. The method of claim 33, wherein the series-connected motors are controlled by a common excitation chopper circuit, wherein electrical energy flow through the field coils is in the same direction when the vehicle is both accelerating and decelerating, wherein at least one power control apparatus is interposed between the motors and the DC bus, and wherein the chopper circuit maintains a charging energy flow to the energy storage system below a first predetermined level, a voltage of the energy storage system below a second predetermined level, and a state of charge of the energy storage system below a third predetermined level.

35. The method of claim 32, wherein a first pair of motors is connected in series, a second pair of motors is connected in series, and the first and second pairs of motors are connected in parallel.

36. The method of claim 31, wherein step (ii) is performed.

37. The method of claim 36, wherein the output voltage is stepped up by a boost circuit, the boost circuit comprising an energy storage inductor, an energy storage capacitor, a diode, and a switch, wherein the switch is connected in parallel with the energy storage inductor and diode, and wherein the energy storage capacitor is connected in series with the energy storage inductor, diode, and switch.

38. The method of claim 37, wherein, when the vehicle is accelerating, the switch is closed to bypass the diode and energy storage inductor and, when decelerating, the switch is opened to direct electrical energy through the diode and energy storage inductor.

39. The method of claim 38, wherein each traction motor has a corresponding field coil and armature coil, wherein the field coils are connected in series with one another, wherein the series-connected field coils are connected in parallel with one another and with the armature coils, wherein the armature coils are connected in parallel with one another, and wherein the vehicle further includes a chopper circuit and further comprising when the vehicle is decelerating:

varying the flow of electrical energy through the field coils to vary a voltage associated with the motors and an amount of energy provided by the motors to the energy storage system.

40. The method of claim 31, wherein step (iii) is performed.

41. The method of claim 40, wherein, when the vehicle is decelerating, a first set of battery modules are series connected and a second set of battery modules are parallel connected.

42. The method of claim 41, wherein the first set of battery modules comprises first and second series connected battery modules and third and fourth series connected battery modules and wherein the second set of battery modules comprises the first and second series connected battery modules connected in parallel with the third and fourth series connected battery modules.

43. The method of claim 31, wherein step (iv) is performed.

44. A method, comprising:
   (a) providing an off road vehicle comprising:
      (i) a plurality of motors to displace the off road vehicle and generate electrical energy when the vehicle is decelerating, each of the plurality of motors having an armature coil and a field coil, the field coils of at least first and second motors being connected in series;
      (ii) an energy storage system operable to store electrical energy and provide electrical energy to the at least one motor;
      (iii) a prime power source operable to provide electrical energy to at least of the energy storage system and at least one motor;
      (iv) a direct current (DC) bus interconnecting the at least one motor, energy storage system, and prime power source; and
      (v) a plurality of power control apparatuses;
   (b) when the vehicle is decelerating, allowing at least a portion of the electrical energy generated by the motors to flow back to an alternator of the prime power source, wherein, in response to the flow of electrical energy, the alternator turns a crank shaft of the prime power source, thereby dissipating electrical energy;
   (c) when step (b) is not performed, directing the electrical energy generated by the motors to the energy storage system;
   (d) when at least one of a state of charge of the energy storage system, a rate of charge of the energy storage system, and an electrical energy level flowing into the energy storage system exceeds a selected threshold, thereafter performing step (b).

45. The method of claim 44, further comprising:
   (c) when step (b) is not performed, directing at least some of the electrical energy generated by the motors to a dissipating resistive grid;
   (d) when the dissipating resistive grid has a temperature above a selected threshold, thereafter performing step (b).

46. A method for controlling an off road vehicle, comprising:
   (a) when the vehicle is decelerating, determining a current level in each of a plurality of armature windings when each of a plurality of traction motors is in a freewheeling mode, the current being generated by the traction motors;
   (b) when each of the measured current levels does not exceed a first predetermined level and when each of the measured current levels exceeds a second predetermined level less than the first predetermined level, switching from the freewheeling mode to a regeneration mode in which electrical energy is provided by the traction motors to an energy storage system; and
   (c) when the current level is less than a third predetermined level less than the second predetermined level, switching back to the free-wheeling mode.

47. The method of claim 46, further comprising:
   (d) determining a power capacity of the energy storage system at each of a number of successive time intervals;
   (e) determining a necessary effective power pulse width to achieve a desired flow of electrical energy from each motor so as to apportion an energy flow between the energy storage system and a dissipating device; and (f) sequentially pulsing power from each motor to at least one of the energy storage system and dissipating device to achieve the determined effective power pulse width over each of the successive time intervals.

48. The method of claim 47, wherein power pulses from each motor are increased by increasing pulse width while maintaining pulse frequency substantially constant.

49. The method of claim 47, wherein electrical energy provided to the energy storage system is input at different times from different motors by starting power pulses from each motor at an offset relative to temporally adjacent power pulses from other motors.

50. The method of claim 49, wherein the offsets are substantially maximized.

51. The method of claim 46, further comprising:
(d) determining a speed of the vehicle;
(e) determining a Direct Current (DC) bus voltage of a bus interconnecting the energy storage system and motors;
(f) determining a voltage of the energy storage system and a State-Of-Charge (SOC) of the energy storage system;
(g) determining whether at least one of the energy storage system voltage and SOC is below a fourth predetermined level;
(h) when the at least one of the energy storage system voltage and SOC is not below the fourth predetermined level, not performing step (b) and decreasing an excitation current to each of the traction motors; and
(i) when the at least one of the energy storage system voltage and SOC is not below the fourth predetermined level, performing step (b).

* * * * *